(12) United States Patent
Cutler

(10) Patent No.: US 11,232,592 B2
(45) Date of Patent: Jan. 25, 2022

(54) DYNAMIC DETECTION AND CORRECTION OF LIGHT FIELD CAMERA ARRAY MISCALIBRATION

(71) Applicant: MICROSOFT TECHNOLOGY LICENSING, LLC, Redmond, WA (US)

(72) Inventor: Ross Garrett Cutler, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/516,187

(22) Filed: Jul. 18, 2019

(65) Prior Publication Data
US 2021/0019912 A1 Jan. 21, 2021

(51) Int. Cl.
*G06T 7/80* (2017.01)
*G06T 5/00* (2006.01)
*H04N 7/14* (2006.01)
*H04N 17/00* (2006.01)

(52) U.S. Cl.
CPC .............. *G06T 7/80* (2017.01); *G06T 5/006* (2013.01); *H04N 7/142* (2013.01); *H04N 17/002* (2013.01); *G06T 2207/10052* (2013.01)

(58) Field of Classification Search
CPC combination set(s) only.
See application file for complete search history.

(56) References Cited

U.S. PATENT DOCUMENTS

| | | | |
|---|---|---|---|
| 6,259,470 B1 | 7/2001 | Koizumi et al. |
| 7,139,767 B1 | 11/2006 | Taylor et al. |
| 8,432,432 B2 | 4/2013 | Cutler |
| 8,619,082 B1 | 12/2013 | Ciurea et al. |

(Continued)

FOREIGN PATENT DOCUMENTS

| | | | |
|---|---|---|---|
| EP | 3493533 A1 | 6/2019 |
| WO | 2016054089 A1 | 4/2016 |

(Continued)

OTHER PUBLICATIONS

"Final Office Action Issued inn U.S. Appl. No. 15/955,669", dated Apr. 26, 2019, 16 Pages.

(Continued)

*Primary Examiner* — Phung-Hoang J Nguyen
(74) *Attorney, Agent, or Firm* — NovoTechIP International PLLC

(57) ABSTRACT

Techniques in connection with a light field camera array are disclosed, involving obtaining a first image data from a first image camera included in the light field camera array for a first time, obtaining a second image data from the first image camera included in the light field camera array for a second time before the first time, obtaining a third image data from a second image camera included in the light field camera array at a different position than the first image camera and having a field of view overlapping a field of view of the first imaging camera, detecting an inconsistency in a view of a scene between the first image data and the second image data and/or the third image data, automatically attempting to generate, in response to the detection of the inconsistency, correction data for the first image camera to reduce or eliminate the detected inconsistency.

15 Claims, 40 Drawing Sheets

(56) References Cited

U.S. PATENT DOCUMENTS

| | | | |
|---|---|---|---|
| 9,055,216 | B1 | 6/2015 | Taylor |
| 9,681,096 | B1 | 6/2017 | Motta et al. |
| 9,928,655 | B1 | 3/2018 | Alston |
| 9,942,513 | B1 | 4/2018 | Aarrestad et al. |
| 10,122,969 | B1 | 11/2018 | Lim et al. |
| 10,291,907 | B2 | 5/2019 | Huber et al. |
| 2003/0197779 | A1 | 10/2003 | Zhang et al. |
| 2005/0117034 | A1 | 6/2005 | Cutler et al. |
| 2010/0329358 | A1 | 12/2010 | Zhang et al. |
| 2011/0199497 | A1* | 8/2011 | Motta .......... H04N 7/144 348/218.1 |
| 2011/0255844 | A1* | 10/2011 | Wu .......... G11B 27/034 386/278 |
| 2011/0292051 | A1 | 12/2011 | Nelson et al. |
| 2012/0249586 | A1 | 10/2012 | Wither et al. |
| 2013/0057642 | A1 | 3/2013 | Catchpole |
| 2013/0201276 | A1 | 8/2013 | Pradeep et al. |
| 2013/0258044 | A1 | 10/2013 | Betts-lacroix et al. |
| 2013/0271452 | A1 | 10/2013 | Kumar et al. |
| 2014/0022415 | A1* | 1/2014 | Kitaya .......... H04N 5/23293 348/239 |
| 2014/0125771 | A1 | 5/2014 | Grossmann et al. |
| 2014/0139694 | A1* | 5/2014 | Grandin .......... H04N 5/23248 348/208.12 |
| 2014/0362170 | A1* | 12/2014 | Walker .......... H04N 19/176 348/14.08 |
| 2015/0009277 | A1* | 1/2015 | Kuster .......... G06T 5/50 348/14.07 |
| 2015/0022669 | A1 | 1/2015 | Hall |
| 2015/0054913 | A1 | 2/2015 | Annau et al. |
| 2015/0178923 | A1 | 6/2015 | Liang et al. |
| 2016/0099429 | A1 | 4/2016 | Bruder et al. |
| 2016/0105608 | A1 | 4/2016 | Pettegrew et al. |
| 2016/0105640 | A1 | 4/2016 | Travis et al. |
| 2016/0203607 | A1 | 7/2016 | Muller et al. |
| 2016/0366365 | A1 | 12/2016 | Iyer et al. |
| 2016/0381336 | A1* | 12/2016 | Akahane .......... H04N 5/265 348/239 |
| 2016/0381345 | A1* | 12/2016 | Wu .......... G06T 7/85 348/36 |
| 2017/0072563 | A1 | 3/2017 | Anderson-sprecher |
| 2017/0127051 | A1 | 5/2017 | Chavez et al. |
| 2017/0132253 | A1 | 5/2017 | Mckinnon et al. |
| 2017/0187933 | A1* | 6/2017 | Duparre .......... H04N 5/247 |
| 2017/0244960 | A1 | 8/2017 | Ciurea et al. |
| 2018/0020201 | A1* | 1/2018 | Motta .......... G06F 3/011 |
| 2018/0096494 | A1 | 4/2018 | Zhou |
| 2018/0222476 | A1 | 8/2018 | Ishii et al. |
| 2018/0249274 | A1 | 8/2018 | Lyren et al. |
| 2018/0332317 | A1 | 11/2018 | Song et al. |
| 2019/0128670 | A1* | 5/2019 | Chen .......... G06T 7/579 |
| 2019/0179509 | A1 | 6/2019 | Daie et al. |
| 2019/0320135 | A1 | 10/2019 | Cutler |
| 2019/0320142 | A1 | 10/2019 | Cutler |
| 2021/0021748 | A1 | 1/2021 | Cutler |
| 2021/0021784 | A1 | 1/2021 | Cutler |
| 2021/0021785 | A1 | 1/2021 | Cutler |

FOREIGN PATENT DOCUMENTS

| | | |
|---|---|---|
| WO | 2018039071 A1 | 3/2018 |
| WO | 2018116253 A1 | 6/2018 |

OTHER PUBLICATIONS

"Non Final Office Action Issued in U.S. Appl. No. 15/955,669", dated Dec. 3, 2018, 14 Pages.

Chen, Milton, "Leveraging the Asymmetric Sensitivity of Eye Contact for Videoconferencing", In Proceedings of the SIGCHI Conference on Human Factors in Computing Systems, Apr. 20, 2002, 8 Pages.

Lin, et al., "A Geometric Analysis of Light Field Rendering", In International Journal of Computer Vision, vol. 58, Issue 2, Jul. 1, 2004, pp. 121-138.

Stokes, Rembert R., "Human Factors and Appearance Design Considerations of the Mod II Picturephone Station Set", In Proceedings of IEEE Transactions on Communication Technology, vol. 17, Issue 2, Apr. 1969, pp. 318-323.

Tan, et al., "ConnectBoard: Enabling Genuine Eye Contact and Accurate Gaze in Remote Collaboration", In Journal of IEEE Transactions on Multimedia, vol. 13, Issue 3, Jun. 1, 2011, pp. 466-473.

Vertegaal, et al., "Explaining Effects of Eye Gaze on Mediated Group Conversations: Amount or Synchronization?", In Proceedings of the ACM Conference on Computer Supported Cooperative Work, Nov. 16, 2002, pp. 41-48.

Yang, et al., "Eye Gaze Correction with Stereovision for Video Tele-Conferencing", In Proceedings of 7th European Conference on Computer Vision, May 28, 2002, 16 Pages.

Yang, et al., "Interactive 3D Teleconferencing with User-Adaptive Views", In Proceedings of the ACM SIGMM workshop on Effective telepresence, Oct. 15, 2004, pp. 50-51.

Adhikarla, et al., "Fast and Efficient Data Reduction Approach for Multi-Camera Light Field Display Telepresence Systems", In Proceedings of 3DTV Conference on Vision Beyond Depth, Oct. 7, 2013, pp. 1-4.

Graziosi, et al., "Introduction to Tiled Full Parallax Light Field Display and Requirements for FTV Discussion", In Publication of Motion Picture Expert Group, Feb. 23, 2016, 15 Pages.

"International Search Report and Written Opinion Issued in PCT Application No. PCT/US19/025270", dated Jun. 28, 2019, 13 Pages.

"International Search Report and Written Opinion Issued in PCT Application No. PCT/US19/025271", dated Jun. 28, 2019, 13 Pages.

"Non Final Office Action Issued In U.S. Appl. No. 15/955,672", dated Jan. 8, 2020, 9 pages.

"Non Final Office Action Issued In U.S. Appl. No. 16/516,182", dated Jan. 29, 2020, 10 Pages.

"Non Final Office Action Issued In U.S. Appl. No. 16/516,193", dated Jan. 30, 2020, 8 Pages.

"Non Final Office Action Issued in U.S. Appl. No. 15/955,672", dated Sep. 11, 2020, 12 Pages.

"Final Office Action Issued in U.S. Appl. No. 16/516,193", dated Jul. 27, 2020, 10 Pages.

"Final Office Action Issued In U.S. Appl. No. 16/516,193", dated Jun. 10, 2020, 11 Pages.

Bajpayee, et al., "Real-Time Light Field Processing for Autonomous Robotics", In Proceedings of the IEEE/RSJ International Conference on Intelligent Robots and Systems, Oct. 1, 2018, pp. 4218-4225.

"International Search Report and Written Opinion Issued in PCT Application No. PCT/US20/034464", dated Jul. 24, 2020, 13 Pages.

"International Search Report and Written Opinion Issued in PCT Application No. PCT/US20/034589", dated Jul. 24, 2020, 16 Pages.

"International Search Report and Written Opinion Issued in PCT Application No. PCT/US20/034762", dated Jul. 24, 2020, 15 Pages.

Tsai, Roger Y., "A Versatile Camera Calibration Techniaue for High-Accuracy 3D Machine Vision Metrology Using Off-the-shelf TV Cameras and Lenses", In IEEE Journal on Robotics and Automation, vol. 3, Issue 4, Aug. 1987, pp. 323-344.

Zhang, Zhengyou, "Flexible Camera Calibration by Viewing a Plane From Unknown Orientations", In Proceedings of the Seventh IEEE International Conference on Computer Vision, Sep. 20, 1999, 8 Pages.

"International Search Report and Written Opinion Issued in PCT Application No. PCT/US20/035496", dated Sep. 7, 2020, 17 Pages.

"Non Final Office Action Issued in U.S. Appl. No. 16/516,193", dated Nov. 16, 2020, 9 Pages.

"Non Final Office Action Issued in U.S. Appl. No. 16/516,196", dated Mar. 22, 2021, 28 Pages.

* cited by examiner

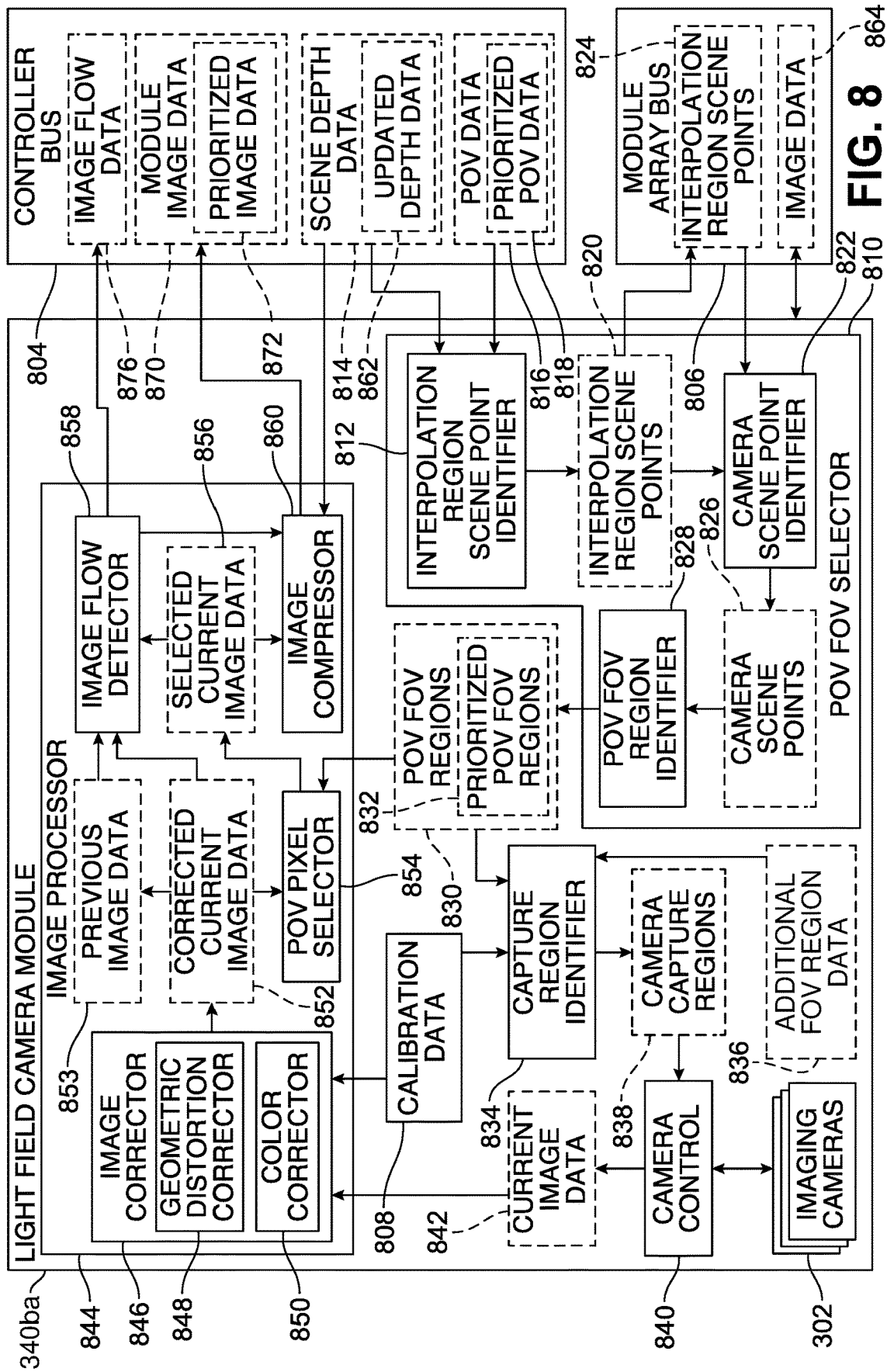

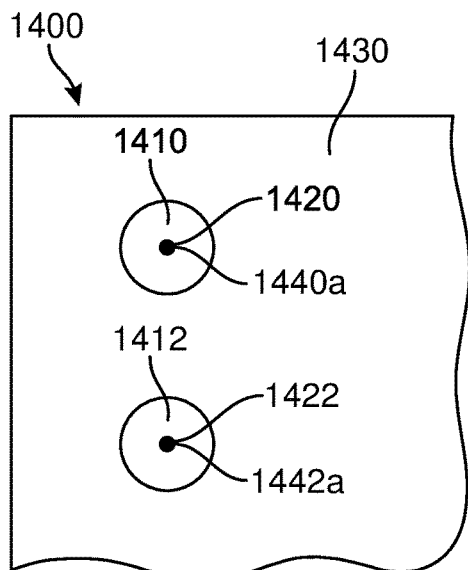
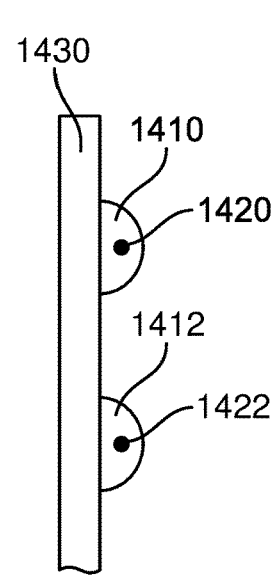
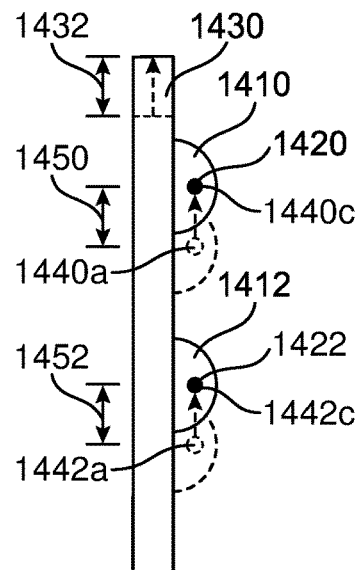
FIG. 14A  FIG. 14B  FIG. 14C
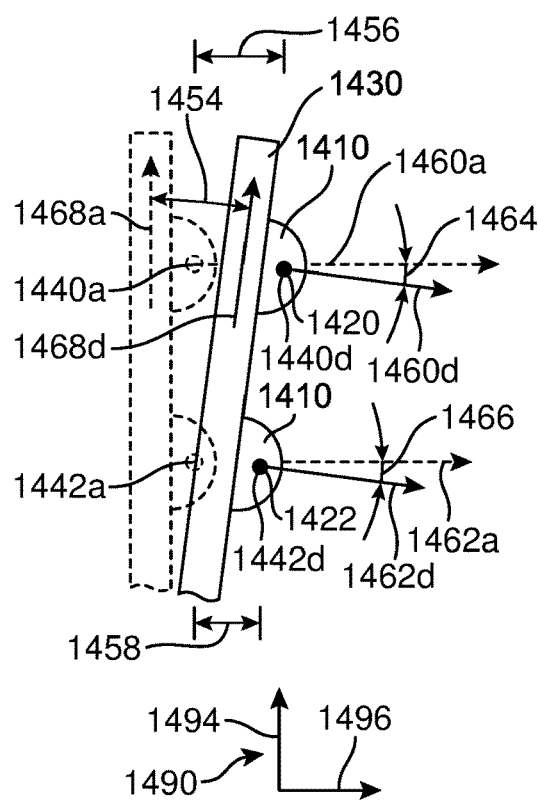
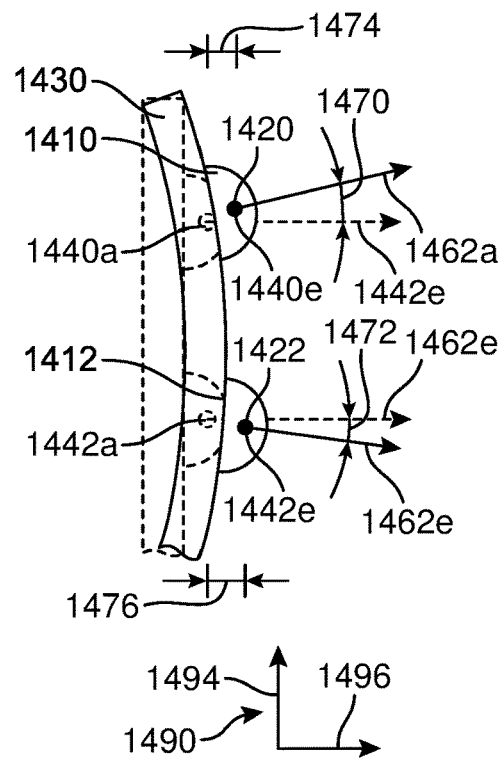
FIG. 14D  FIG. 14E

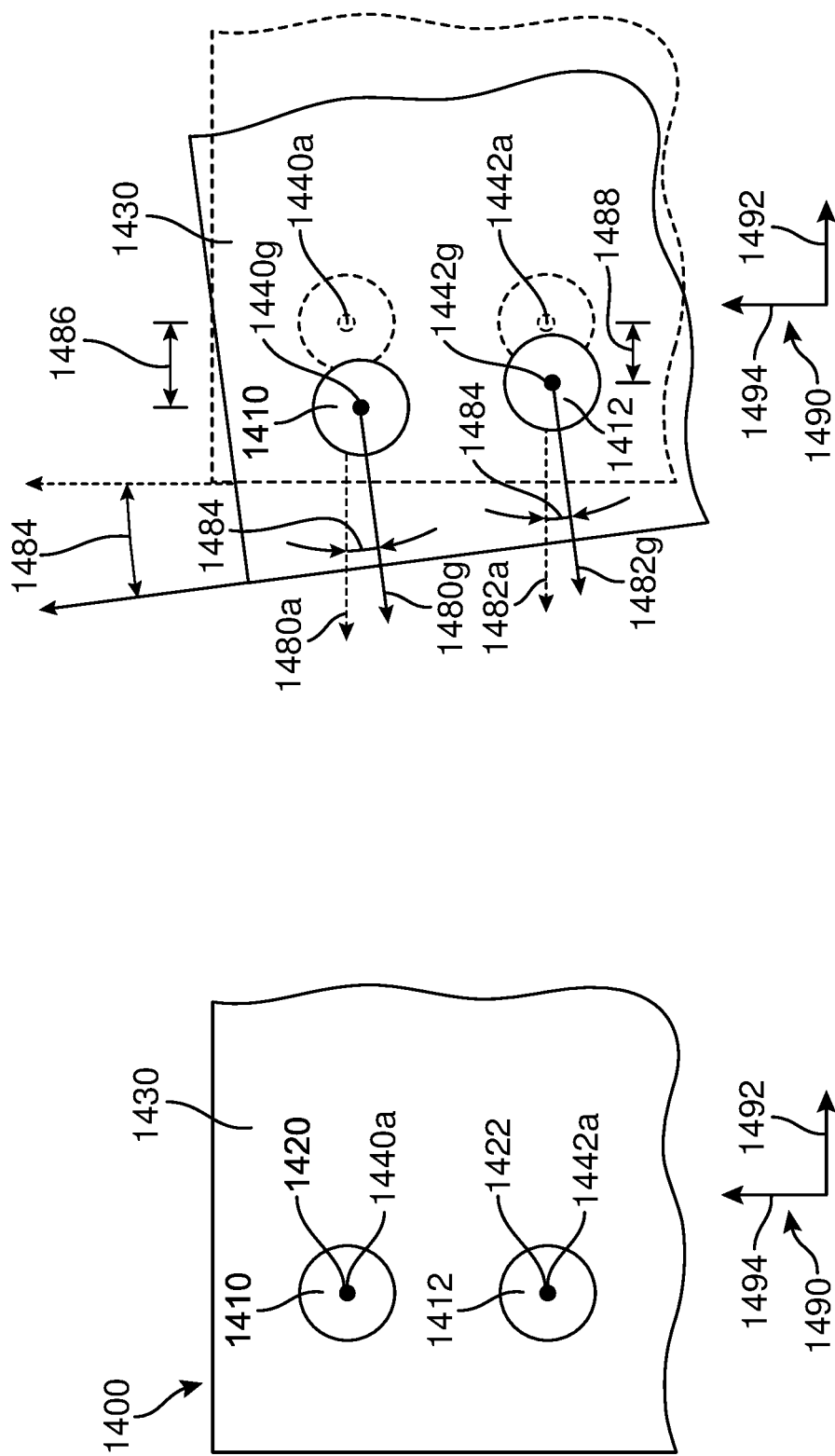

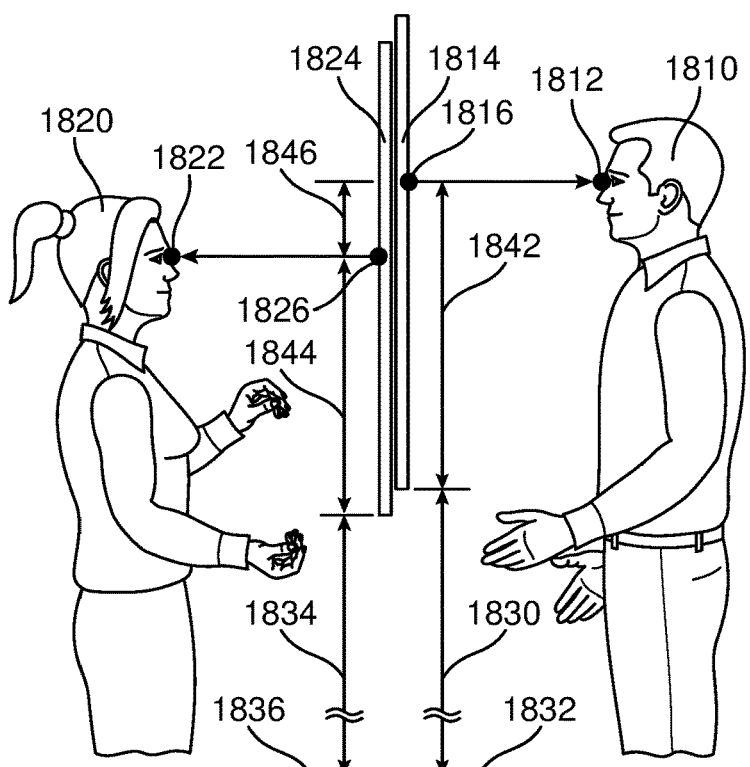
FIG. 18A
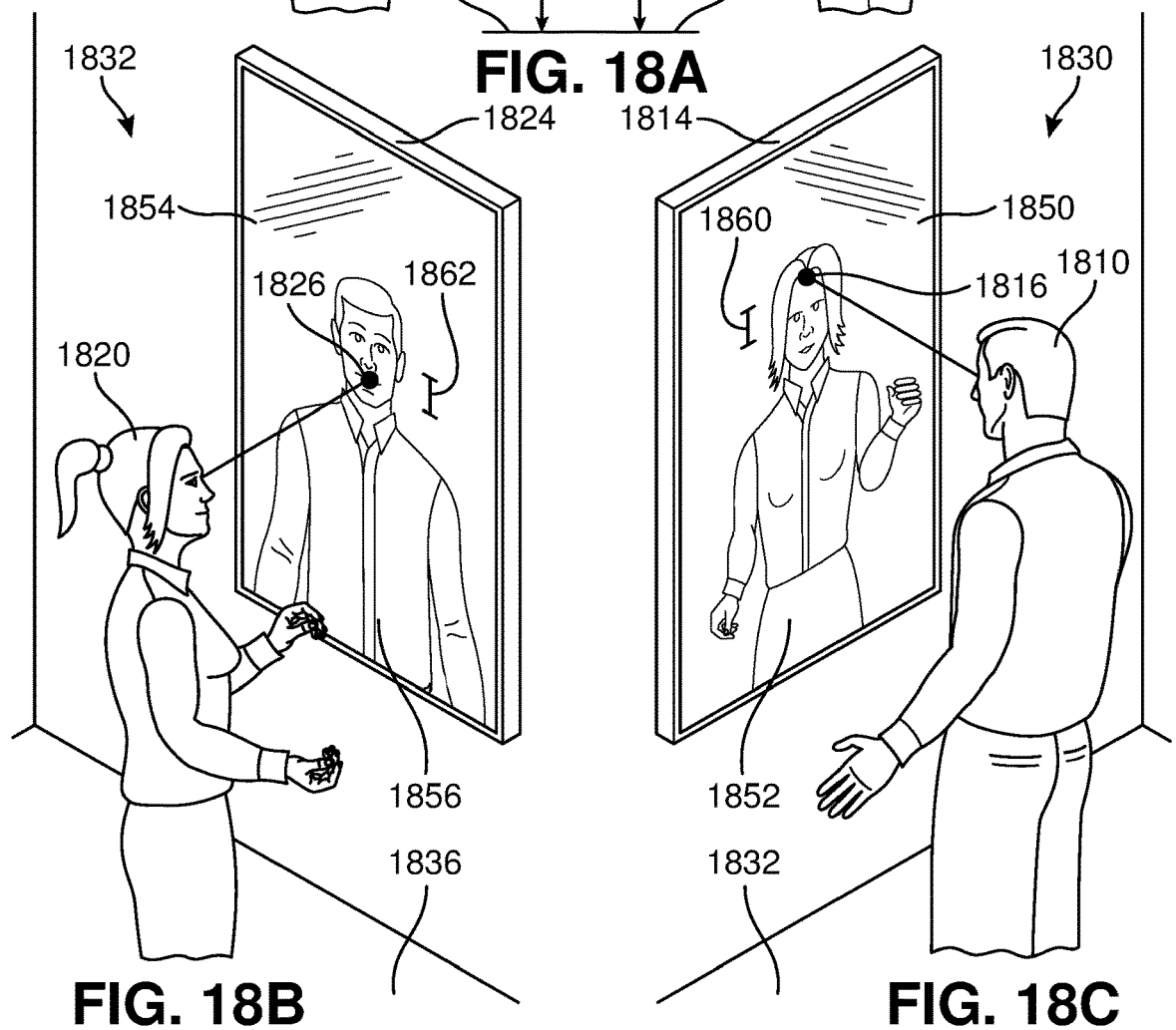
FIG. 18B  FIG. 18C

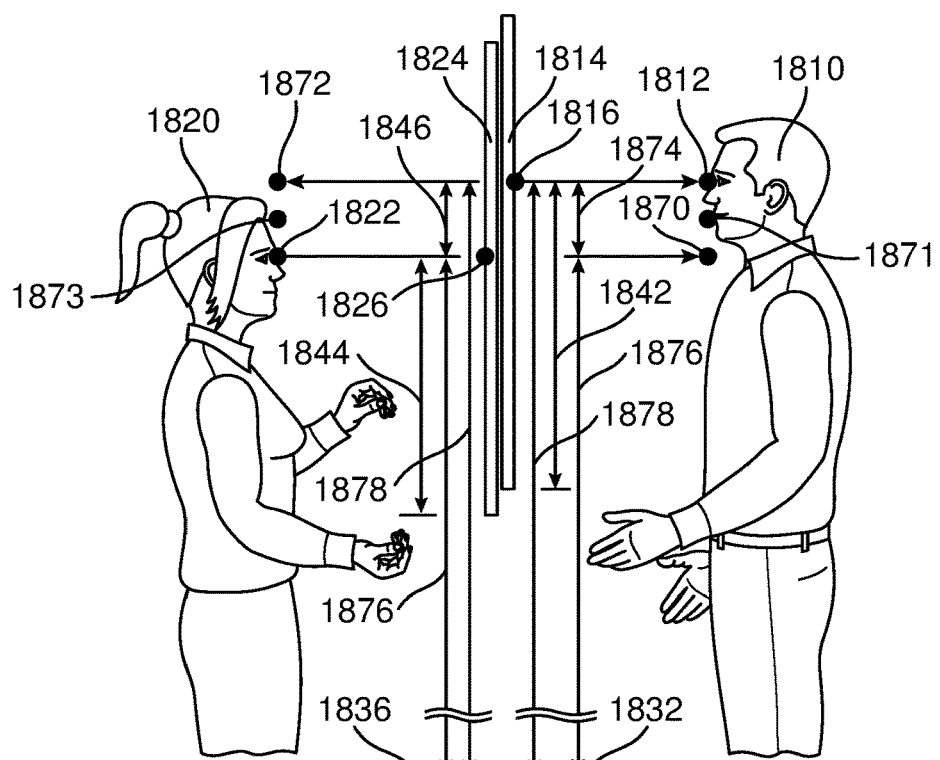
FIG. 18D
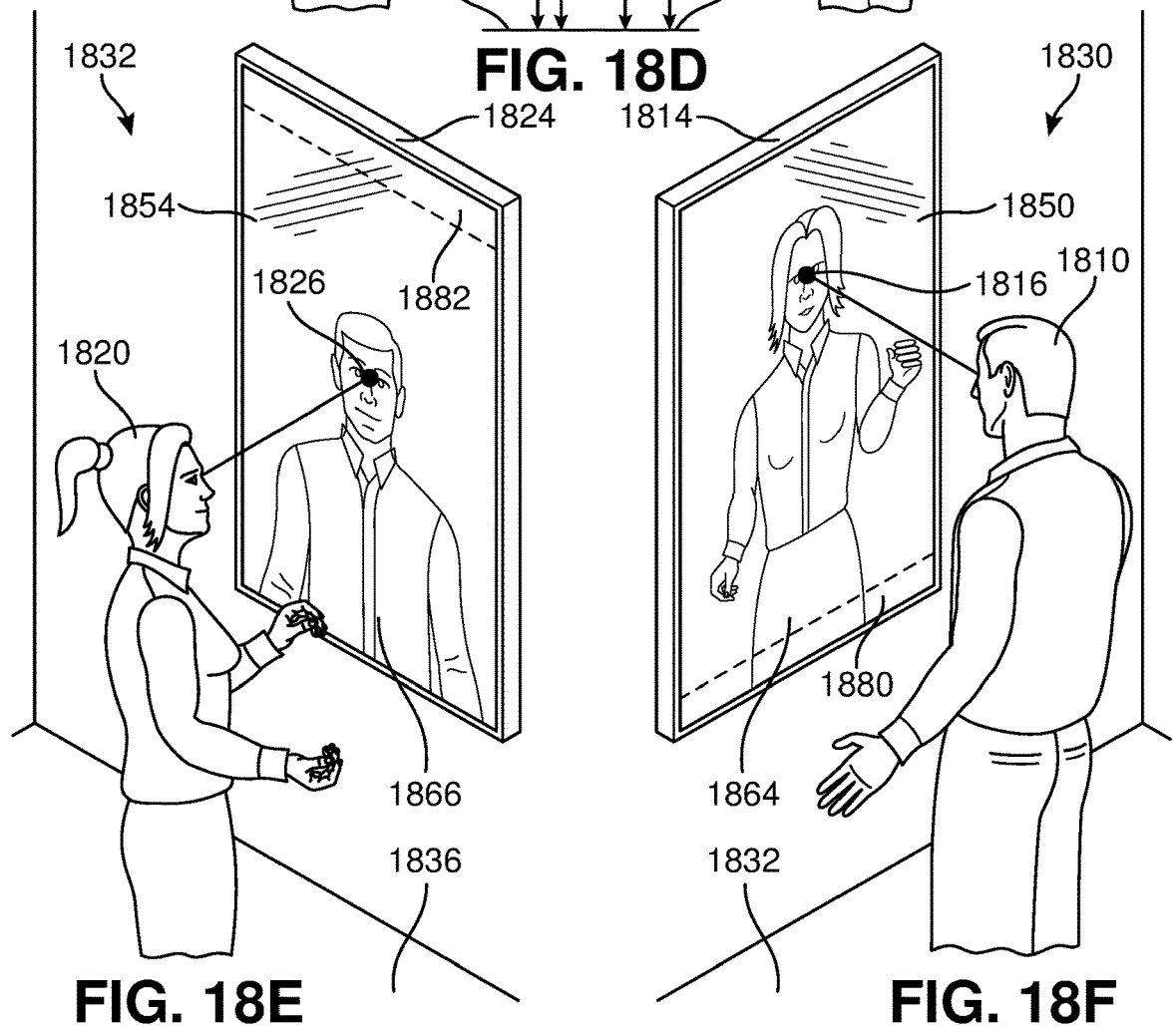
FIG. 18E  FIG. 18F

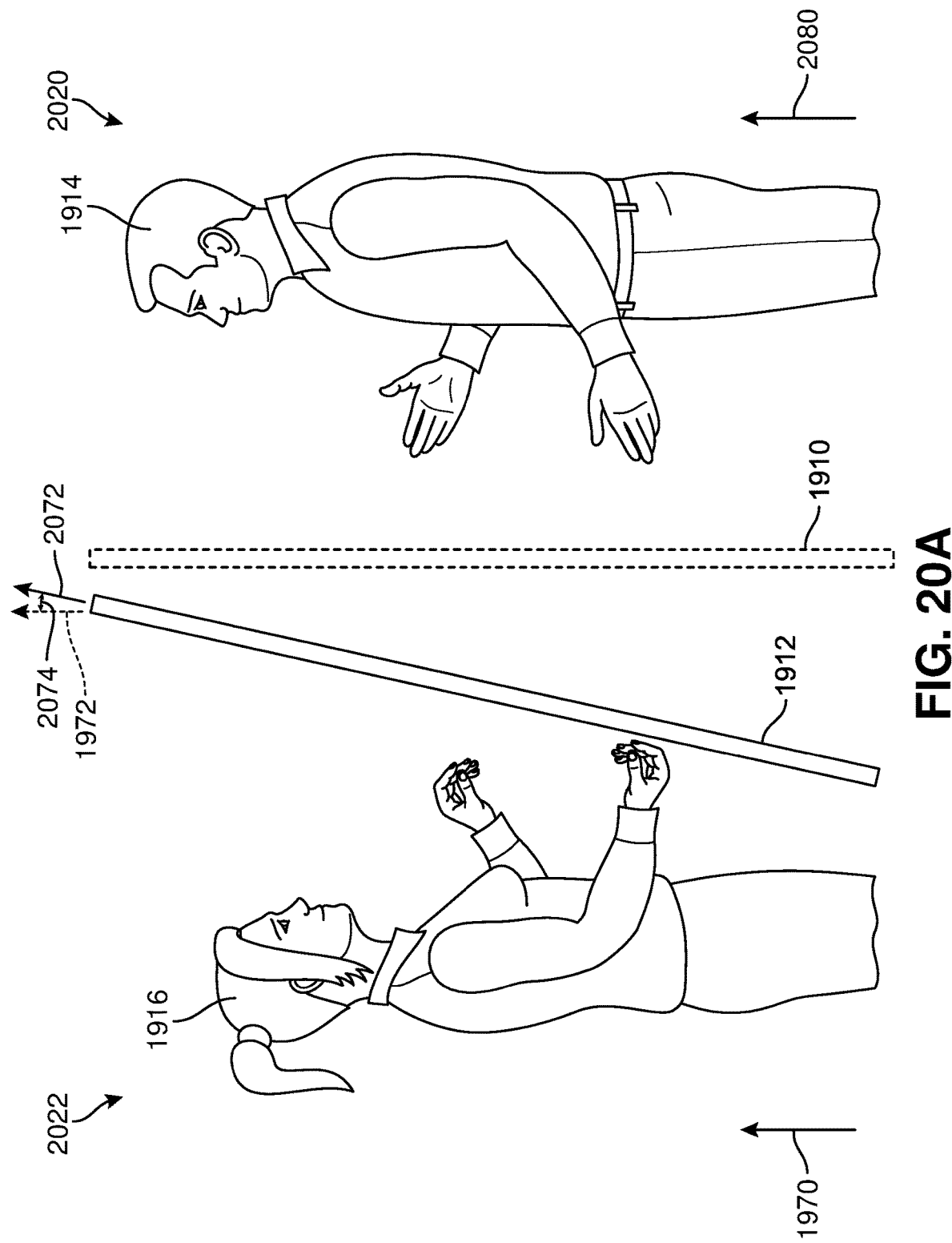

DYNAMIC DETECTION AND CORRECTION OF LIGHT FIELD CAMERA ARRAY MISCALIBRATION

BACKGROUND

Video conferencing technologies have become increasingly commonplace. Such technologies are now being used worldwide for a wide variety of both personal and business communications. For example, during a teleconference or other video conferencing session, individuals may "interact" and engage in face-to-face conversations through images and sound captured by digital cameras and transmitted to human participants ("participants"). In an attempt to provide more engaging video conferencing experiences, a set of technologies called "telepresence" have been introduced, which aim to allow participants at different geographical locations to feel as if they were present at the same location. The telepresence has provided certain enhancement to conventional video conferencing schemes, but there still remain significant areas for new and improved ideas for more immersive video conferencing experiences.

SUMMARY

In one general aspect, the instant application discloses light field camera systems. A light field camera system can include a light field camera array, and a controller configured to obtain a first image data from a first image camera included in the light field camera array for a first time, obtain a second image data from the first image camera included in the light field camera array for a second time before the first time, and obtain a third image data from a second image camera included in the light field camera array at a different position than the first image camera and having a field of view overlapping a field of view of the first imaging camera. The controller may be further configured to detect an inconsistency in a view of a scene between the first image data and the second image data and/or between the first image data and the third image data. In addition, the controller can be configured to automatically attempt generating, in response to the detection of the inconsistency, correction data for the first image camera to reduce or eliminate the detected inconsistency.

In another aspect, a light field camera system can include a light field camera array, means for obtaining a first image data from a first image camera included in the light field camera array for a first time, means for obtaining a second image data from the first image camera included in the light field camera array for a second time before the first time, and means for obtaining a third image data from a second image camera included in the light field camera array at a different position than the first image camera and having a field of view overlapping a field of view of the first imaging camera. The light field camera system may include means for detecting an inconsistency in a view of a scene between the first image data and the second image data and/or between the first image data and the third image data. In addition, the light field camera system can include means for attempting to generate, in response to the detection of the inconsistency, correction data for the first image camera to reduce or eliminate the detected inconsistency.

In another aspect, methods of operating a light field camera array are disclosed. A method can include obtaining a first image data from a first image camera included in the light field camera array for a first time, obtaining a second image data from the first image camera included in the light field camera array for a second time before the first time, and obtaining a third image data from a second image camera included in the light field camera array at a different position than the first image camera and having a field of view overlapping a field of view of the first imaging camera. The method may include detecting an inconsistency in a view of a scene between the first image data and the second image data and/or between the first image data and the third image data. In addition, the method can include automatically attempting to generate, in response to the detection of the inconsistency, correction data for the first image camera to reduce or eliminate the detected inconsistency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 8 is a block diagram illustrating an example architecture and operations of a camera module.

FIGS. 14A and 14B illustrate a portion of a camera module including an imaging camera in an initial position and orientation. FIGS. 14C, 14C, 14D, and 14E illustrate examples in which the imaging camera has deviated from its initial position and/or orientation, such as due to temperature effects or mechanical shock. FIG. 15A again illustrates the view of FIG. 14A, and FIG. 15B illustrates an example in which the imaging camera has deviated from its initial position and/or orientation.

FIGS. 18A, 18B, 18C, 18D, 18E, and 18F illustrate examples in which image data selection and image rendering processes are adapted to change an apparent height of the second participant and/or the first participant to better align the eye levels of the first and second participants.

FIG. 20A illustrates an example in which the second telepresence device of FIG. 19 is in a pose having a non-vertical pitch.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

This description is directed to a telepresence device that provides enhanced and more immersive experiences to videoconferencing participants located in different geographical locations. Through the resulting immersive experiences, the participants may feel essentially a same level of trust and empathy as being face-to-face to each other at a same location, which may reduce or eliminate the need to travel to a same location for a face-to-face meeting. To provide more immersive experiences, the telepresence device, where a second participant is also using a similarly capable telepresence device, displays life-like images of a second participant that are dynamically responsive in real-time to movement of the first participant, present a life-like geometry, and preserve eye gaze. The telepresence device provided at the other location, if similarly capable, may provide the same immersive telepresence experience to the second participant.

Figure 1A:
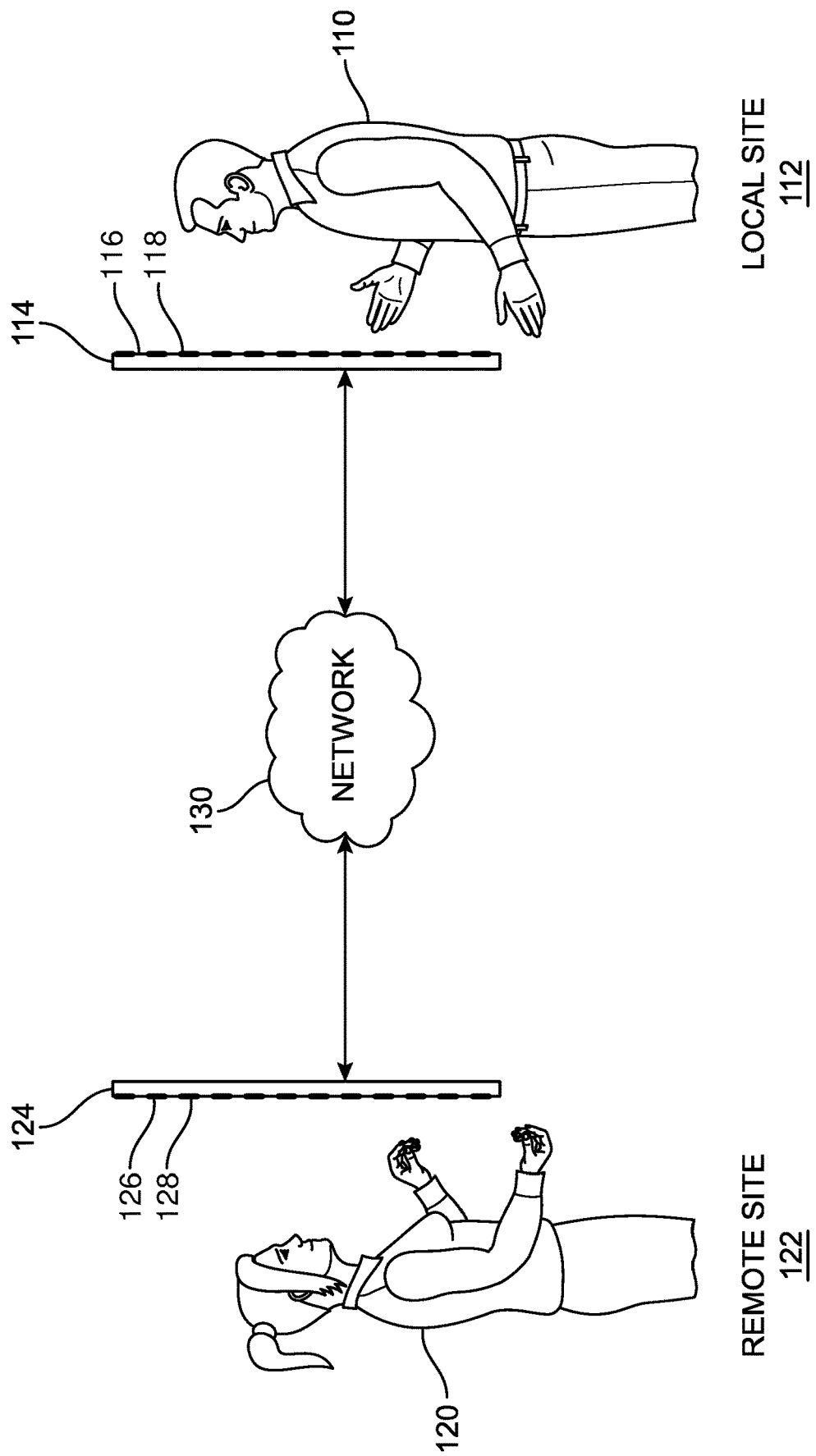
FIG. 1A illustrates first and second participants located at geographically different locations and conducting a telepresence session using first and second telepresence devices.

Referring now to FIGS. 1A-1D, an overview of an implementation of the proposed systems is provided. In FIG. 1A, a representation of an arrangement of a second participant 120 relative to a first participant 110 ("local participant") is shown, whereby the two participants 110 and 120 communicate via a network 130. It can be understood the first participant 110 accesses a telecommunication system ("system") 100 via a first telepresence device ("first device") 114 located at a first (local) site 112, while the second participant 120 ("remote participant") accesses the system 100 via a second telepresence device ("second device") 124 located at a second (remote) site 122. A "site" may also be referred to as a "location," "scene," or "environment." In other words, the first device 114 renders, at a first rendering surface 116 (which may be referred to as a "display surface"), a visual presence of the second participant 120 for the first participant 110, and the second device 124 renders, at a second rendering surface 126, a visual presence of the first participant 110 for the second participant 120. In some examples, the rendering surfaces 116 and 126 correspond to respective display devices 118 and 128 included in respective telepresence devices 114 and 124. In this example, and for purposes of discussion, the second participant 120 is using a telepresence device that is essentially the same as the telepresence device of first participant 110, though in other implementations they may differ.

In the example of FIG. 1A, the first participant 110 and the second participant 120 are depicted as being located at two geographically different locations, for example, at the first site 112 where the first device 114 is located and the second site 122 where the second device 124 is located, respectively. The first and second telepresence devices 112 and 122 may be communicatively linked via the network 130, which may be a wired network, a wireless network, or a combination of any numbers thereof. As will be described in more detail in later examples, the telepresence devices 112 and 122 may be constructed such that images of the second participant 120 are displayed on the first device 112. Similarly, the second device 122 may be arranged and configured to display images of the first participant 110. The images displayed by the telepresence devices 112 and 122 may, from the perspectives of first participant 110 and second participant 120 respectively, preserve and present visual features such as life-size geometry, motion parallax, depth cues from motion, eye gaze, and visual perspective that are responsive to real-time movements of the participants. Examples of similar telepresence devices are described in U.S. patent application Ser. No. 15/955,669 (filed on Apr. 17, 2018 and entitled "Telepresence Device") and Ser. No. 15/955,672 (filed on Apr. 17, 2018 and entitled "Telepresence Devices Operation Methods"), which are each incorporated herein by reference in their entireties.

Figure 1B:
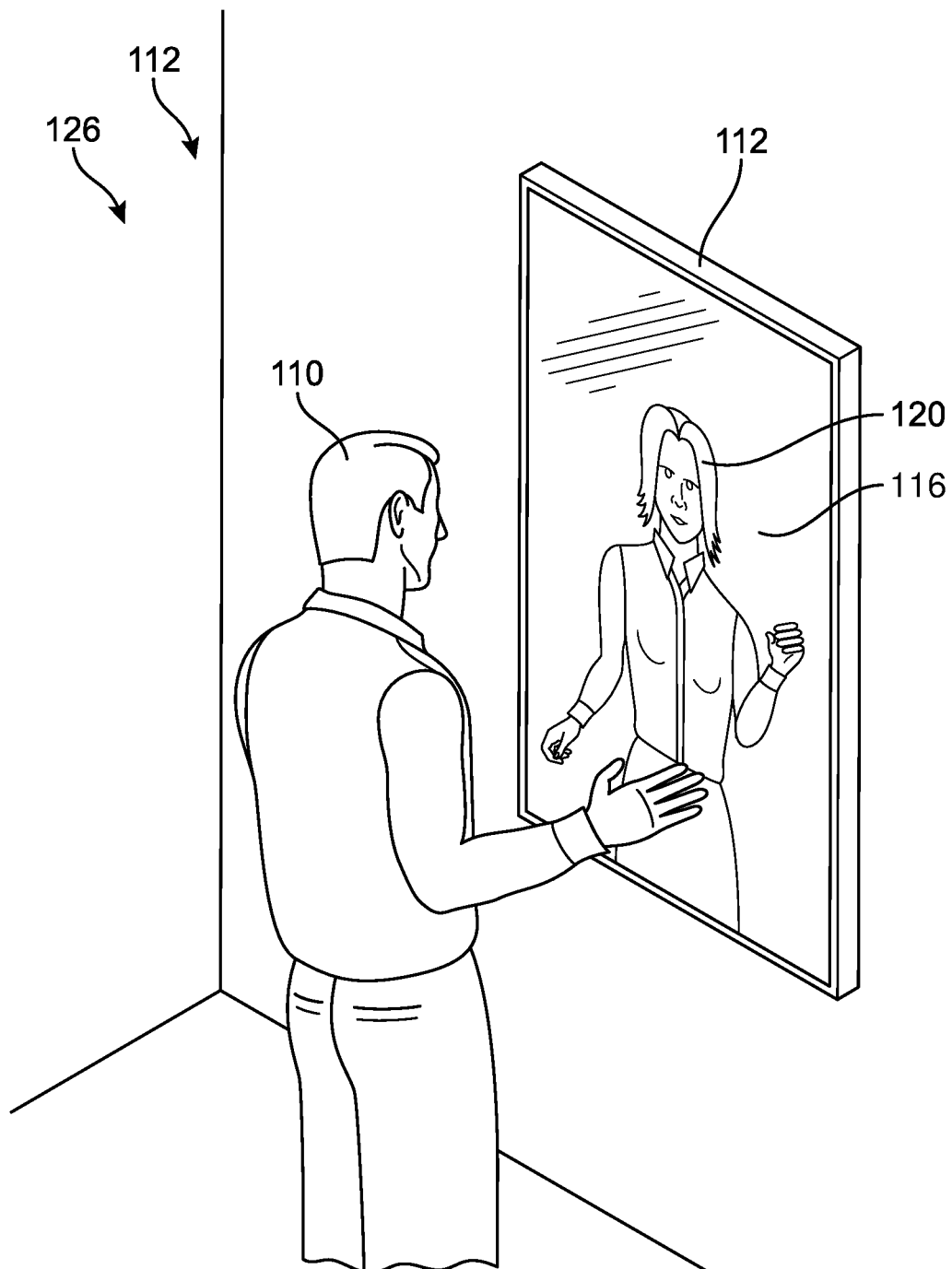
FIG. 1B illustrates an example of a telepresence conferencing environment of the first participant during the telepresence session shown in FIG. 1A.

Referring next to FIG. 1B, a possible example of a telepresence conferencing environment 126 is shown, in this case for the first site 112. The first device 114 is presented in an isometric view and, as shown in FIG. 1B, may be installed on a wall in a fixed manner at a height that generally corresponds to an expected or average eye height of a first participant 110. The first device 114 can be arranged and operating to provide a telepresence communication session with the second participant 120 (shown in an image displayed by the first device 110) located at a geographically different location.

In the example shown in FIG. 1B, the first telepresence device 114 is installed at a height suitable for the first participant 110 to engage in a session while standing, although in other examples the telepresence device may be installed at other heights, such as a height suitable for a seated subject. Due to its similarity in appearance to a window, such a telepresence device may also be referred to as a "telewindow." The first telepresence device 114 may be implemented in different shapes and sizes and positioned at different heights. For example, although the first device 114 is shown installed in a portrait orientation in FIG. 1B, which can enhance the sense of immersion between standing subjects, in other examples, such as for a seated subject, the first device 114 may instead be installed in a landscape orientation. In some examples, the telepresence device 100 may be constructed to be height-adjustable (for example, to better accommodate participants of different heights), be configured for movement along the horizontal axis (i.e., from left to right), and/or mobile, including man-portable provisions.

In some implementations, the first telepresence device 114 may be configured to provide a user interface (not shown in FIG. 1) enabling the first participant 110 to control various operations of the telepresence device 100, including, for example, sending, receiving, and/or accepting invitations for conferencing sessions, conferencing session initiation and/or termination, volume and display adjustment, and/or recording. The user interface may be presented via a main display device of the first device 114 or via an external unit, such as an external unit located next to the first device 114 on the same wall. Alternatively, the user interface may be presented via a remote controller (not shown in FIG. 1) or via a mobile app executing on a mobile computing device such as a smartphone or tablet (not shown in FIG. 1) that the first participant 110 carries or is otherwise readily accessible to the first participant 110. The user interface may be configured to be responsive to voice commands (in some examples, with assistance of a digital assistant) and/or movements (for example, via gesture recognition) by the first participant 110.

Figure 1C:
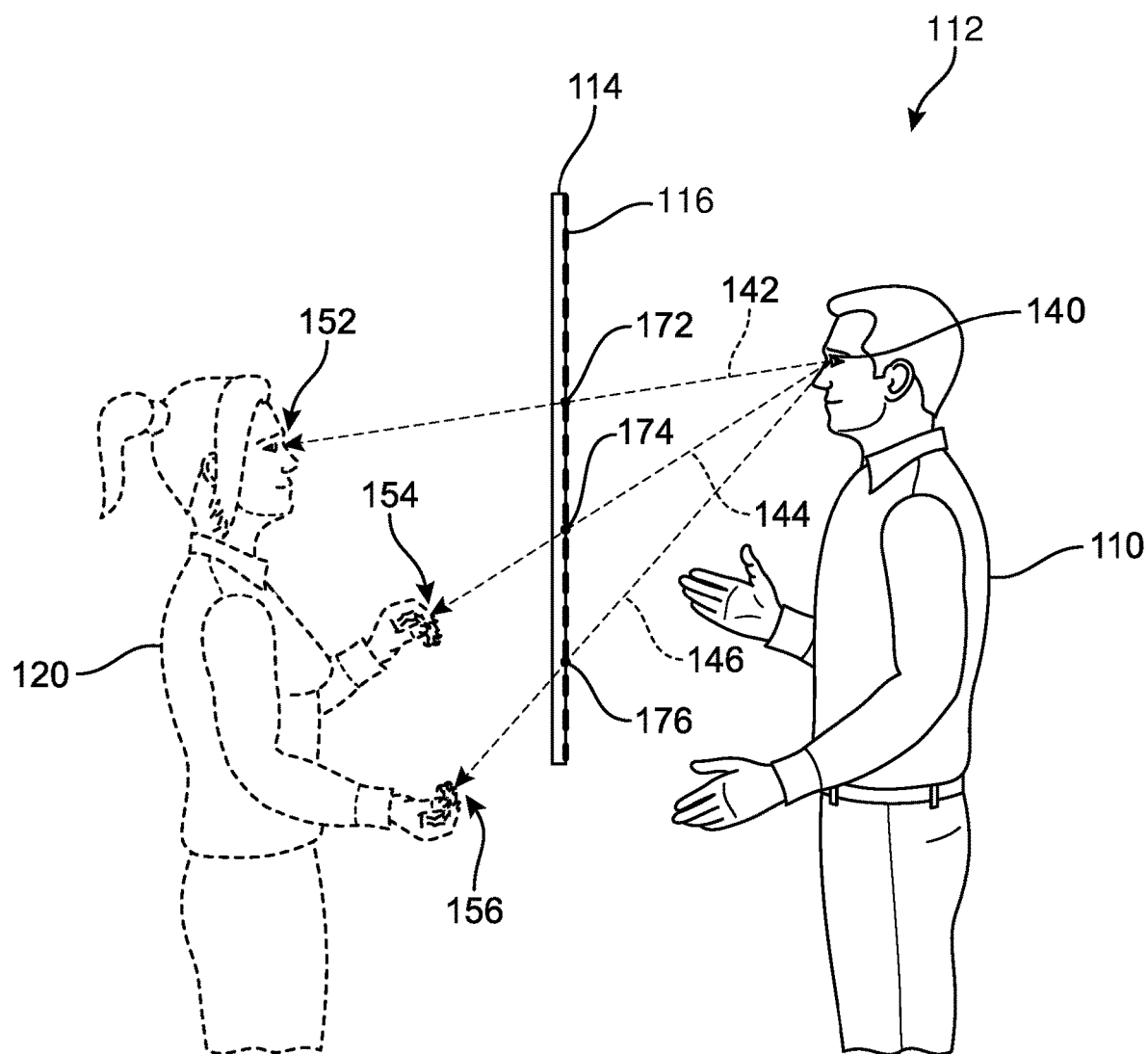
FIGS. 1C and 1D present a simplified depiction of the experience of the first participant and operation of the second telepresence device during the telepresence session shown in FIGS. 1A and 1B.
Figure 1D:
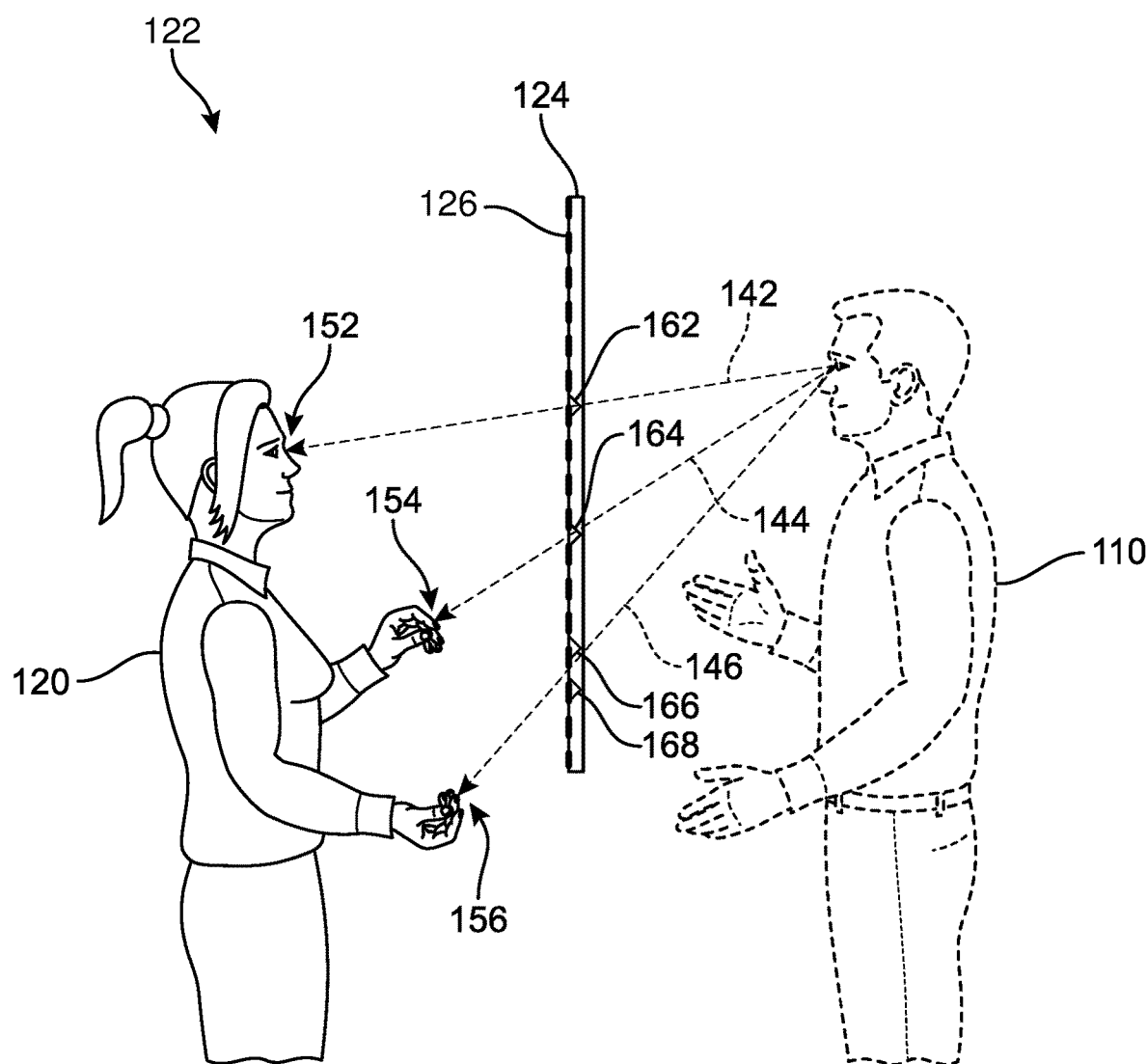

For purposes of clarity, a simplified depiction of the experience of the first participant 110 is provided with reference to FIG. 1C and corresponding operation of the second device 126 is provided with reference to FIG. 1D. As an example, it may be appreciated that, for the first participant 110, the appearance of the second participant 120, including real-time responsiveness to movement of the first participant 110, is much as if the first telepresence device 114 were replaced with a hypothetical transparent window corresponding to the rendering surfaces 116 and 126, with the first participant 110 and the second participant 120 standing face to face on opposite sides of the hypothetical window, much as shown in FIGS. 1C and 1D. In operation, the first device 114 displays images of the second participant 120 at the first rendering surface 116 that (from the perspective of the first participant 110) are capable of preserving life-size geometry, presenting motion parallax, providing depth cues from motion, preserving eye gaze, and providing visual perspective that, in combination with real-time responsiveness to movement of the first participant 110, provide a highly engaging and immersive interactive communication experience between the first participant 110 and the second participant 120.

For purposes of context, it might be understood that, for a hypothetical camera arranged at the second site (not shown in FIG. 1C) and oriented toward the second participant 110, images of which would be displayed to the first participant 110 with no or little apparent latency with regard to movement of the first participant 110 (for example, within 50 ms, although 30 ms is less noticeable) to be used to capture such images of the second participant 120, the hypothetical camera would be moved, with little or no latency, to match an eye location of the first participant 110 at a distance well behind the telepresence device used to capture images of the second participant 120. However, no such hypothetical camera or elimination or latency is actually available or practicable. Instead, as will be discussed in greater detail below, imaging cameras (or, more simply, "cameras") used to capture images of the second participant 120 are at fixed positions within the shallow enclosure of the second telepresence device situated at the second site. At that distance from the second participant 120, which is much shorter than the synthetic distance between the first participant 110 (or the above hypothetical camera) and the second participant 120 shown in FIG. 1C, the shortened camera-to-subject distances can distort the image due to changing angles of light entering and recorded by the cameras.

In the example shown in FIGS. 1C and 1D, the rendering surfaces 116 and 126 are both planar rectangles with substantially similar dimensions that for purposes of image capture, selection, and rendering are considered to be coplanar, making the hypothetical window have little or no apparent thickness. It is understood that the rendering surfaces 116 and/or 126 may other shapes (including nonplanar shapes), shaped different from each other, and in various selected poses (including, for example, poses in which they do not intersect). A pose may include a 3D position (or one or more components thereof) and/or a 3D orientation (or one or more components thereof). In some examples, such as examples in which the rendering surfaces 116 and 126 are considered to be coplanar or parallel, there may be a one-to-one correspondence between positions on the first rendering surface 116 and corresponding positions on the second rendering surface 126. In FIG. 1C, for purposes of illustration three virtual rays are depicted extending between the first participant 110 and the second participant 120, passing through the rendering surfaces 116 and 126. For example, a first virtual ray 142 extends from a visual field 140 (i.e., eyes) of the first participant 110 toward a first region 152 (here, the face) of the second participant 120, a second virtual ray 144 extends from the visual field 140 of the first participant 110 toward a second region 154 (here, the left hand) of the second participant 120, and a third virtual ray 146 extends from the visual field 140 of the first participant 110 toward a third region 156 (here, the right hand) of the second participant 120.

In some implementations, the system can be configured to determine which camera or cameras in the second device 124 are positioned to best capture a target region. In some examples, an imaging camera may be located at a position that aligns directly with a virtual ray. For example, in FIG. 1D, the first region 152 is captured by a first imaging camera 162 included in the second device 124 and intersecting or nearly intersecting the first virtual ray 142 and, and the second region 154 is captured by a second imaging camera 164 included in the second device 124 and intersecting or nearly intersecting the first virtual ray 142. In other examples, a virtual ray may not intersect a location of an imaging camera. In such cases, the system may make use of two or more imaging cameras to provide the desired image capture of a target region. For example, in FIG. 1C, an image corresponding to the third region 156 results from reference to data captured by a third camera 166 and a fourth camera 168 disposed near or adjacent to an intersection between the third virtual ray 146 and the second device 124. Such arrangements will be discussed in greater detail below.

Similarly, in different implementations, the images captured by the imaging cameras can be presented to the first participant 110 at specific points along a display device (and corresponding points of the first rendering surface 116) of the first device 114. For example, in FIG. 1C, a first pixel 172 of the first device 114 used to render the first region 152 is located at an intersection between the first virtual ray 142 and the first rendering surface 116. Similarly, a second pixel 174 of the first device 114 used to render the second region 154 is located at an intersection between the second virtual ray 144 and the first rendering surface 116, and a third pixel 176 of the first device 114 used to render the third region 156 is located at an intersection between the third virtual ray 142 and the first rendering surface 116. Thus, the devices 114 and 124 can operate such that the images captured by one device are aligned with a visual gaze of the recipient detected by the corresponding device. Further information regarding this arrangement will be discussed in greater detail below.

Figure 2:
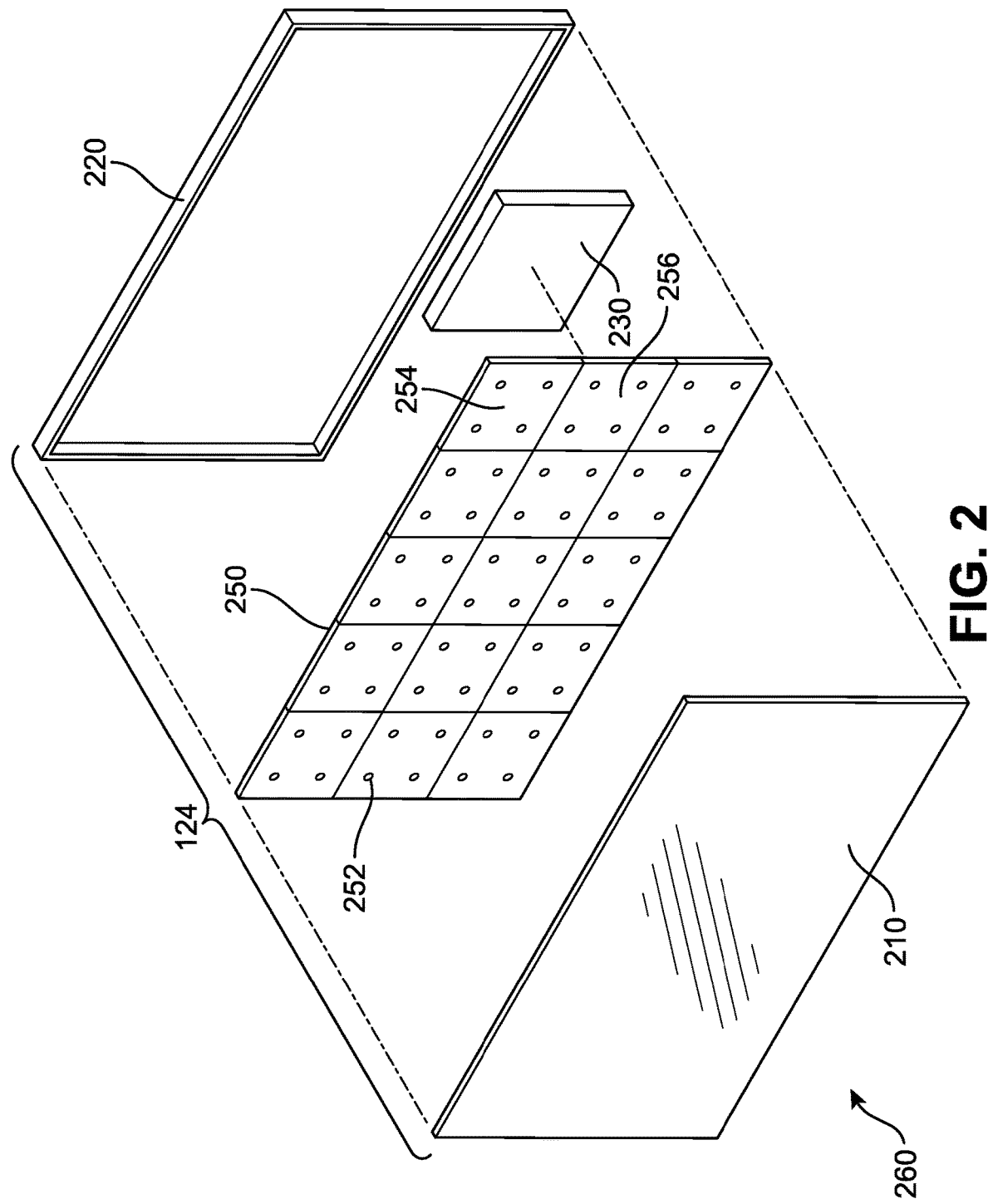
FIG. 2 illustrates an exploded view of an example telepresence device.

Referring now to FIG. 2, an exploded view of an example of the second telepresence device 124 shown in FIGS. 1A-1D is provided. For purposes of discussion, the first telepresence device 114 is constructed in the same manner. The second device 124 may include, for example, an optional display device ("display") 210, a light field camera 250, a telepresence device controller 230, and an optional enclosure 220. The light field camera 250 is arranged and configured to capture and/or measure the radiance of light rays received from an environment 260 (which may be referred to as a "scene") in which the second participant 120 is located. In the example shown in FIG. 2, the environment 260 may be referred to as an "external environment," in view of it being located external to the volume defined by the display 210 and the enclosure 220. The light field camera 250 may be arranged, at least in part, to face the second participant 120. The light field camera 250 includes a plurality of light field camera modules 254 (which may be referred to as "camera modules"), such as a first light field camera module 256. Each of the camera modules 254 includes one or more imaging cameras 252 which are arranged and configured to measure radiance of light rays received from portions of the environment 260 within their respective fields of view. The camera modules 254 will be described in more detail below.

The display 210 may be transparent, semitransparent, or partially opaque such that the light rays from the external environment 260 can pass through the display 210 to the light field camera 250 for capture and/or measurement by the light field camera 250. For example, the display 210 may be a transparent organic light-emitting diode (OLED) display. The display 210 may have front and rear main surfaces, which may in the form of a vertical plane, although in some examples the display 210 may be nonplanar, such as curved or segmented. The front main surface of the display 210 may be arranged to face the second participant 120 (shown in FIGS. 1A-1D) and display video images to the second participant 120.

In the example shown in FIG. 2, in which the light field camera 250 is positioned behind the display 210, each of the camera modules 254 is arranged to capture images through the display 210. However, in other implementations, no display may be included, and the camera modules 254 may be understood to face directly outward in a direction opposite to the telepresence device controller 230. By placing the light field camera 250 behind the display 210, the eye gaze of the second participant 120 may generally be oriented toward the light field camera 250, greater numbers of the imaging cameras 252 may be more easily included in the light field camera 250, the light field camera 250 is arranged to capture images of the second participant 120 providing image data suitable for synthesizing images for camera positions and orientations corresponding to the first participant 110, and an additional non-display user-facing surface (such as a bezel) may not be necessary for the purpose of capturing images of the second participant 120. The imaging cameras 252 included in the light field camera 250 may be positioned such that, when the second telepresence device 124 is operated, the light field camera 250 captures image data for portions of the environment 260 around and/or behind the second participant 120. For example, the imaging cameras 252 may span a horizontal distance that is at least large enough, in most conditions, to capture portions of the environment 260 from around a left and/or right side of the second participant 120. As another example, one or more of the imaging cameras 252 may be positioned at a height that permits capturing portions of the environment 260 from above the second participant 120.

The telepresence device controller 230 may include a logic subsystem, a data holding subsystem, a display controller, and a communications subsystem, and may be communicatively coupled to the display 210 and the light field camera 250. The logic subsystem may include, for example, one or more processors configured to execute instructions and communicate with the other elements of the first telepresence device 114 according to such instructions to realize various aspects of this disclosure involving the first telepresence device 114. Such aspects include, but are not limited to, configuring and controlling the other elements of the second device 124, input and commands, communicating with other computer systems, and/or processing images captured by the light field camera 250. The data holding subsystem may include one or more memory devices (such as, but not limited to, DRAM devices) and/or one or more storage devices (such as, but not limited to, flash memory devices). The data holding subsystem may include one or more media having instructions stored thereon which are executable by the logic subsystem, which cause the logic subsystem to realize various aspects of this disclosure involving the second device 124. Such instructions may be included as part of firmware, an operating system, device drivers, application programs, or other executable programs. The communications subsystem may be arranged to allow the second device 124 to communicate with other computer systems. Such communication may be performed via, for example, wired or wireless data communication. The telepresence device controller 230 includes a light field camera controller configured to coordinate and control the camera modules 254, as discussed in greater detail below.

The telepresence device controller 230 may include, for example, a scene depth data generator, a POV tracker, a telepresence protocol communication manager, and a light field image renderer. The scene depth data generator may generate and output scene depth data of the environment 260, including the first participant 110. In some implementations, the scene depth data generator receive and use depth measurements provided by one or more depth cameras. The POV tracker tracks and estimates movement of one or both of a participant's eyes to identify rendering points of view (POVs) and capture POV volumes for rendering and obtaining light field image data respectively. A POV may also be referred to as a "POV point." The telepresence protocol communication manager is configured to, according to a predetermined telepresence protocol for encoding and exchanging data, transmit light field image data captured and selected by the second device 124 to the first device 114 (for example, as a stream of light field image frames), and receive similar light field image data from the first device 114 for rendering by the light field image renderer according to a POV provided by the POV tracker.

The device 124 may further include additional components necessary for teleconferencing, for example, a sound encoder, a sound decoder, etc. The sound encoder may receive audio captured via microphone to capture a voice from the second participant 120. The sound encoder may encode and send the captured voice signal via the telepresence protocol communication manager. Sound data is received from the first device 114 by the telepresence protocol communication manager and sent to the sound decoder, which outputs a corresponding audio signal via a loudspeaker, to reproduce a voice of the first participant 110.

The enclosure 220 may be arranged to be mechanically coupled to the display 210 and enclose internal components of the first telepresence device 114, including the light field camera 250 and telepresence device controller 230. The enclosure 220 may also be referred to as a "housing." When the first telepresence device 114 is assembled, the light field camera 250 and the telepresence device controller 230 may be all encapsulated by the single enclosure 220 and positioned behind the display 210. Alternatively, various elements and features of the first telepresence device 114 may be implemented across multiple devices. For example, a portion of the telepresence device controller 230 may be provided by a computer system not enclosed by the enclosure 220, at least some of the cameras 252 and/or camera modules 254 may be included in one or more separate devices instead of being positioned behind the display 200.

Figure 3:
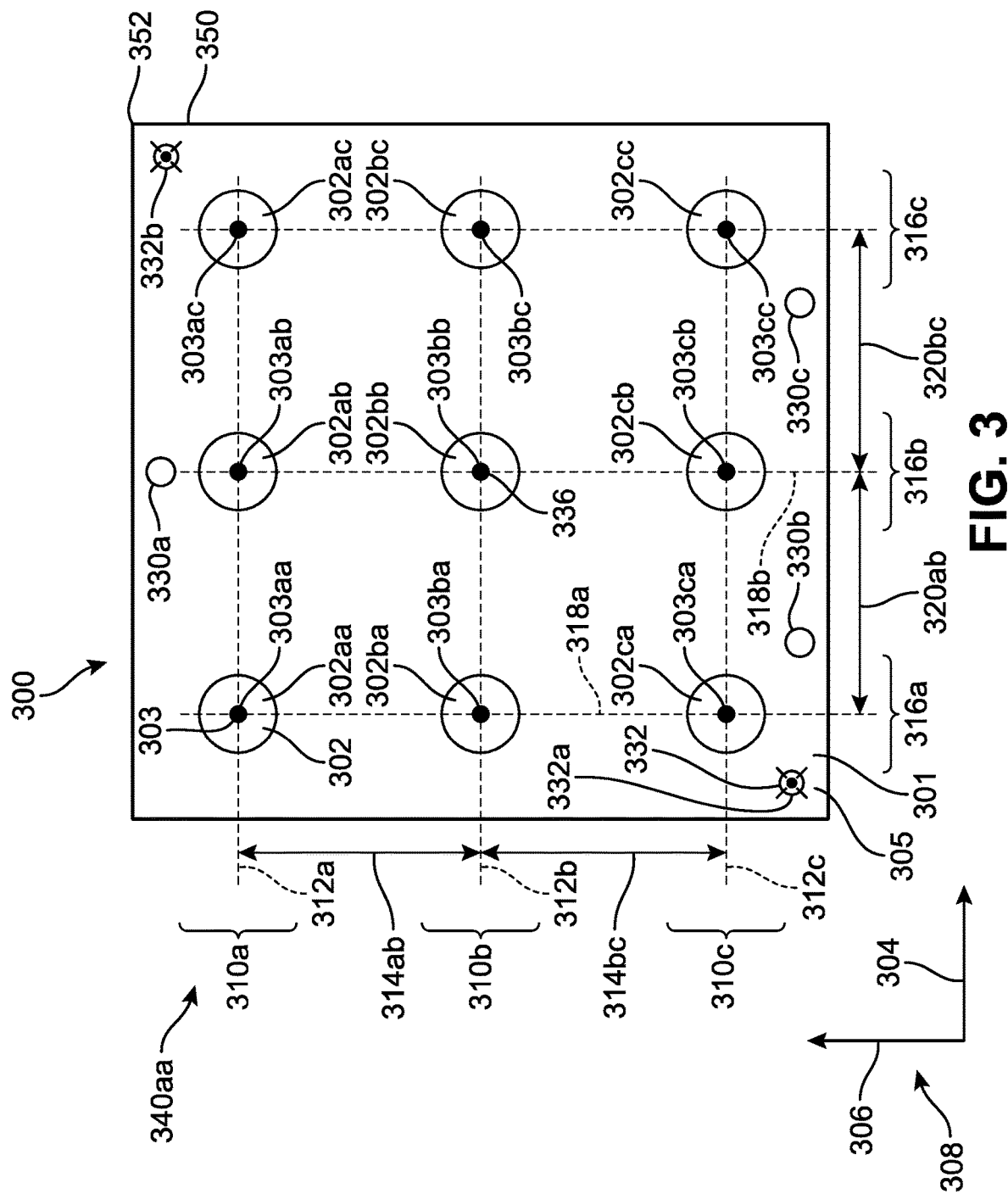
FIGS. 3, 4A, 4B, and 4C illustrate an example light field camera module.

Referring now to FIG. 3, a plan view of a light field camera module 300 is shown. The camera module 300 may include any of the features described for the first light field camera module 256 shown in FIG. 2 or other light field camera modules described herein, and other light field camera modules described herein may include any of the features described for the camera module 300. In this particular example, the camera module 300 includes nine imaging cameras 302 (including imaging cameras 302aa, 302ab, 302ac, 302ba, 302bb, 302bc, 302ca, 302cb, and 302cc) arranged on a substrate 301 in a 3×3 array with 3 rows 310 (including rows 310a, 301b, and 310c) and 3 columns (including columns 316a, 316b, and 316c), although other numbers and arrangements of imaging cameras may be used. Each of the imaging cameras 302 includes a respective optical center 303 (which may be referred to as an "imaging camera position" or a position of an imaging camera), such as an entrance pupil of the imaging camera 302. In some examples, the substrate 301 includes a printed circuit board (PCB) or another rigid material for mounting the imaging cameras 302 at fixed positions on the substrate 301. In some implementations, as shown in FIG. 3, all of the imaging cameras 302 are attached to a same side or surface of the substrate 301 (in FIG. 3, a front side 305 of the substrate 301). In some implementations, the side or surface 305 of the substrate 301 is planar, as shown in FIG. 3 in which the front side 305 lies in a plane substantially parallel to the module axes 304 and 306. Mounting the imaging cameras 302 on a planar surface may permit various assumptions and/or precalculations to be made when capturing and processing image data captured by the imaging cameras 302, and facilitates positioning the camera module 300 and the imaging cameras 302 relative to other such camera modules and imaging cameras included in a light field camera.

FIG. 3 shows a module coordinate space 308 for the camera module 300 in which coordinates are identified with respect to at least a module axis 304 running in a horizontal direction and a module axis 306 orthogonal to the module axis 304 and running in the vertical direction. The row 310a includes the three imaging cameras 302aa, 302ab, and 302ac, with respective optical centers 303aa, 303ab, and 303ac each positioned along (within ordinary assembly tolerances and from the plan view in FIG. 3) a line 312a parallel to the module axis 304. Similarly, optical centers 303ba, 303bb, and 303bc of the respective imaging cameras 302ba, 302bb, and 302bc are positioned along a line 312b parallel to and at a distance 314ab from the line 312a, and the optical centers 303ca, 303cb, and 303cc of the respective imaging cameras 302ca, 302cb, and 302cc are positioned along a line 312c parallel to and at a distance 314bc from the line 312b. In the example shown in FIG. 3, the distance 314ab is substantially equal to the distance 314bc. With the lines 312a, 312b, and 312c being parallel and/or equally spaced, this may permit various assumptions and/or precalculations to be made when capturing and processing image data captured by the imaging cameras 302, and facilitates positioning the imaging cameras 302 relative to imaging cameras included in other such camera modules.

The column 316a includes the three imaging cameras 302aa, 302ba and 302ca, with respective optical centers 303aa, 303ba, and 303ca each positioned along a line 318a parallel to the module axis 306. Similarly, the optical centers 303ab, 303bb, and 303cb of the respective imaging cameras 302ab, 302bb, and 302cb are positioned along a line 318b parallel to and at a distance 320ab from the line 318a, and the optical centers 303ac, 303bc, and 303cc of the respective imaging cameras 302ac, 302bc, and 302cc are positioned along a line 318c parallel to and at a distance 320bc from the line 318b. In the example shown in FIG. 3, the distance 320ab is substantially equal to the distance 320bc. With the lines 318a, 318b, and 318c being parallel, equally spaced, orthogonal to the lines 312a, 312b, and 312c, and/or with distances 314ab, 314bc, 320ab, and 320bc being substantially equal, this may permit various assumptions and/or precalculations to be made when capturing and processing image data captured by the imaging cameras 302, and facilitates positioning the imaging cameras 302 relative to imaging cameras included in other such camera modules.

In the example shown in FIG. 3, the camera module 300 includes mounting holes 330, including mounting holes 330a, 330b, and 330c, for fixedly attaching the camera module 300 to a structure, object, and/or surface for use as part of a light field camera. In some examples, a portion of the mounting holes 330 are adapted to receive screws, bolts, and/or other fasteners for attaching the camera module 300. It is noted that other approaches than, or in addition to, the illustrated mounting holes 330 may be used to attach the camera module 300; for example, brackets and/or adhesive may be used for attachment. In some examples, a portion of the mounting holes 330 and/or other portions of the camera module 300 such as an edge 350 and/or a corner 352 of the substrate 301 are adapted to receive and/or contact positioning structures included in the light field camera. Ensuring that the camera module 300 is fixedly attached facilitates calibration and operation of the camera module 300 as part of the light field camera. In some examples, the camera module 300 includes one or more registration marks 332 such as registration marks 332a and 332b used to indicate respective locations 334a and 334b on the substrate 301. Such registration marks and/or positioning features improve the accuracy and/or precision in positioning the camera module 300.

Although automated assembly techniques facilitate positioning components, such as the imaging cameras 302, with high accuracy in position, various tolerances inherent in manufacturing the imaging cameras 302 and/or attaching them to the substrate 301 result in inaccurate positioning and/or orientation of the imaging cameras 302 with respect to the substrate 301 and/or one another. In order to select light rays captured by the imaging cameras 302 with approximately milliradian precision and accuracy, particularly for a light field camera including multiple camera modules, the actual orientations and/or positions of the imaging cameras 302 are measured.

Figure 4A:
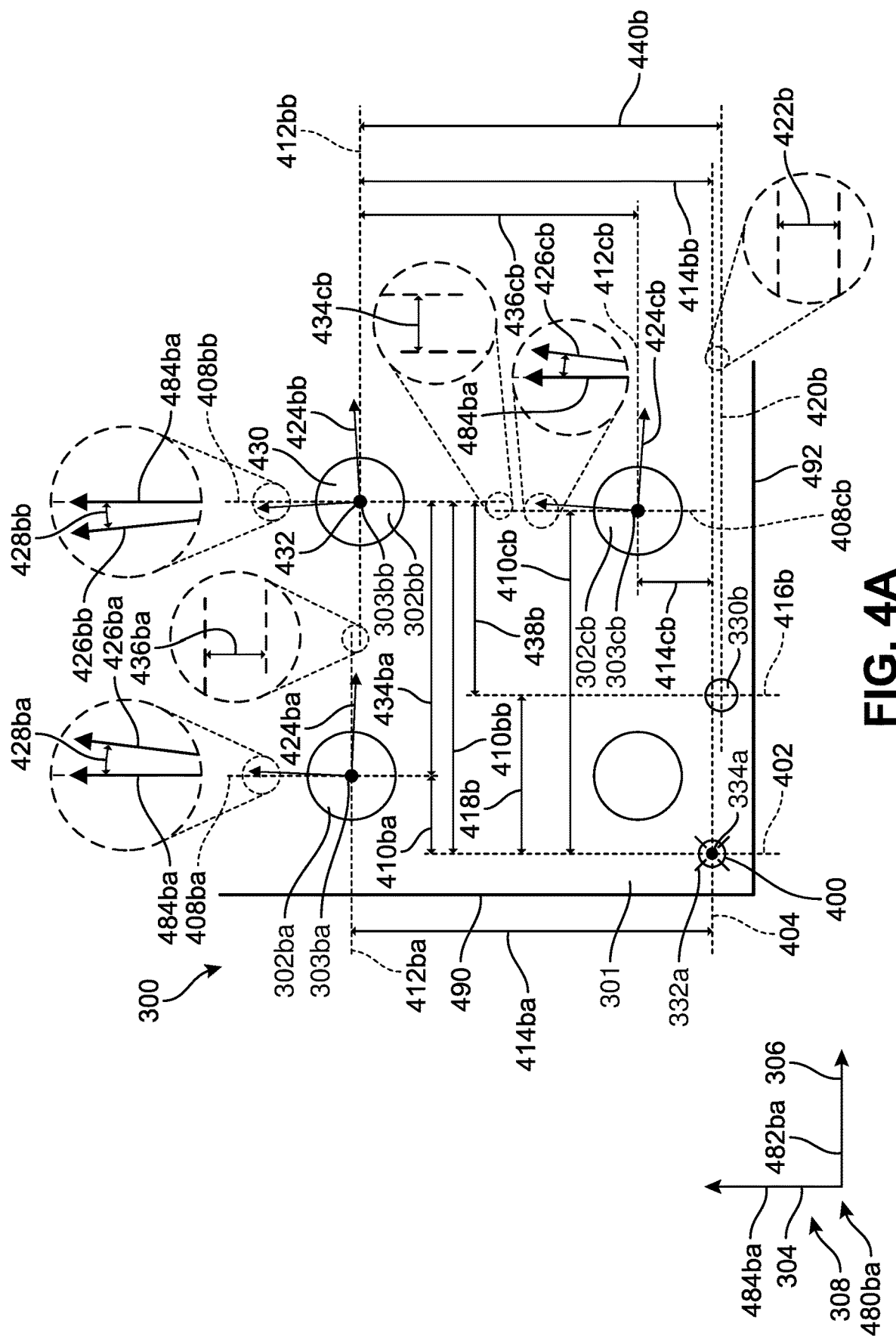

Referring now to FIG. 4A, the actual positions and orientations of the imaging cameras 302 may be measured using the module coordinate space 308 for the camera module 300. In some examples, the module coordinate space 308 may be used as a module-specific coordinate space 480ba with a module-specific axis 482ba in the direction of the module axis 304 and a module-specific axis 484ba in the direction of the module axis 306. In the example shown in FIG. 4A, the location 334a indicated by the registration mark 332a may be used as a first origin 400 for measurements. A vertical line 402, which is parallel to the module axis 306, and a horizontal line 404, which is parallel to the module axis 304, both pass through the first origin 400.

FIG. 4A further illustrates a vertical line 408ba parallel to the module axis 306 and a horizontal line 412ba parallel to the module axis 304 that both pass through the optical center 303ba of the imaging camera 302ba. A distance 410ba between the lines 402 and 408ba and a distance 414ba between the lines 404 and 412ba together indicate a position of the optical center 303ba relative to the first origin 400. In addition, FIG. 4A depicts a vertical line 408bb parallel to the module axis 306 and a horizontal line 412bb parallel to the module axis 304 that both pass through the optical center 303bb of the imaging camera 302bb. A distance 410bb between the lines 402 and 408bb and a distance 414bb between the lines 404 and 412bb together indicate a position of the optical center 303bb relative to the first origin 400. Similarly, FIG. 4A depicts a vertical line 408cb parallel to the module axis 306 and a horizontal line 412cb parallel to the module axis 304 that both pass through the optical center 303cb of the imaging camera 302cb. A distance 410cb between the lines 402 and 408cb and a distance 414cb between the lines 404 and 412cb together indicate a position of the optical center 303cb relative to the first origin 400.

In addition to being displaced laterally and longitudinally on the substrate 301, the rotational orientations of the imaging cameras 302, as defined by the rows and columns of the pixels of the imaging cameras 302, may not be aligned with the module axes 304 and 306. FIG. 4A further illustrates a direction 424ba of rows of the pixels of the imaging camera 302ba and a direction 426ba, orthogonal to the direction 424ba, of columns of the pixels of the imaging camera 302ba. The imaging camera 302ba has a rotational orientation 428ba corresponding to a difference in the angular directions between the module-specific axis 484ba and the direction 426ba. In addition, FIG. 4A illustrates a direction 424bb of rows of the pixels of the imaging camera 302bb and a direction 426bb, orthogonal to the direction 424bb, of columns of the pixels of the imaging camera 302bb. The imaging camera 302bb has a rotational orientation 428bb corresponding to a difference in the angular directions between the module-specific axis 484bb and the direction 426bb. Furthermore, FIG. 4A illustrates a direction 424cb of rows of the pixels of the imaging camera 302cb and a direction 426cb, orthogonal to the direction 424cb, of columns of the pixels of the imaging camera 302cb. The imaging camera 302cb has a rotational orientation 428cb corresponding to a difference in the angular directions between the module-specific axis 484cb and the direction 426cb. The positions of the remaining imaging cameras 302 of the camera module 300 may be measured in a similar manner.

Furthermore, a vertical line 416b parallel to the module axis 306 and a horizontal line 420b parallel to the module axis 304 both pass through a center of the circular mounting hole 330b. A distance 418b between the lines 402 and 416b and a distance 422b between the lines 404 and 420b together indicate a position of the center of the mounting hole 330b relative to the first origin 400. Although not illustrated in FIG. 4A, the positions and/or orientations of other features of the camera module 300, such as but not limited to the edges 490 and 492 of the substrate 301, may be characterized as described above for the imaging cameras 302 and the mounting hole 330b.

In some examples, it may be desired to use a different point as an origin for positional measurements. The desired origin may permit various assumptions and/or precalculations to be made when capturing and processing image data captured by the imaging cameras 302, and/or facilitate positioning the camera module 300 and the imaging cameras 302 relative to other such camera modules and imaging cameras included in a light field camera. For example, the imaging camera 302bb may be selected as a reference camera 430 for the camera module 300 and/or a light field camera including the camera module 300, and as a result the optical center 303bb is used as a second origin 432 for positional measurements. As previously noted for the optical center 302bb, the lines 408bb and 412bb both pass through the second origin 432. A distance 434ba between the lines 408bb and 408ba and a distance 436ba between the lines 412bb and 412ba together indicate a position of the optical center 303ba relative to the second origin 432. A distance 434cb between the lines 408bb and 408cb and a distance 436cb between the lines 412bb and 412cb together indicate a position of the optical center 303bb relative to the second origin 432. A distance 438b between the lines 408bb and 416b and a distance 440b between the lines 412bb and 420b together indicate a position of the center of the mounting hole 330b relative to the second origin 432. The distances 410bb and 414bb described above together indicate a position of the location 334a indicated by the registration mark 332a.

Figure 4B:
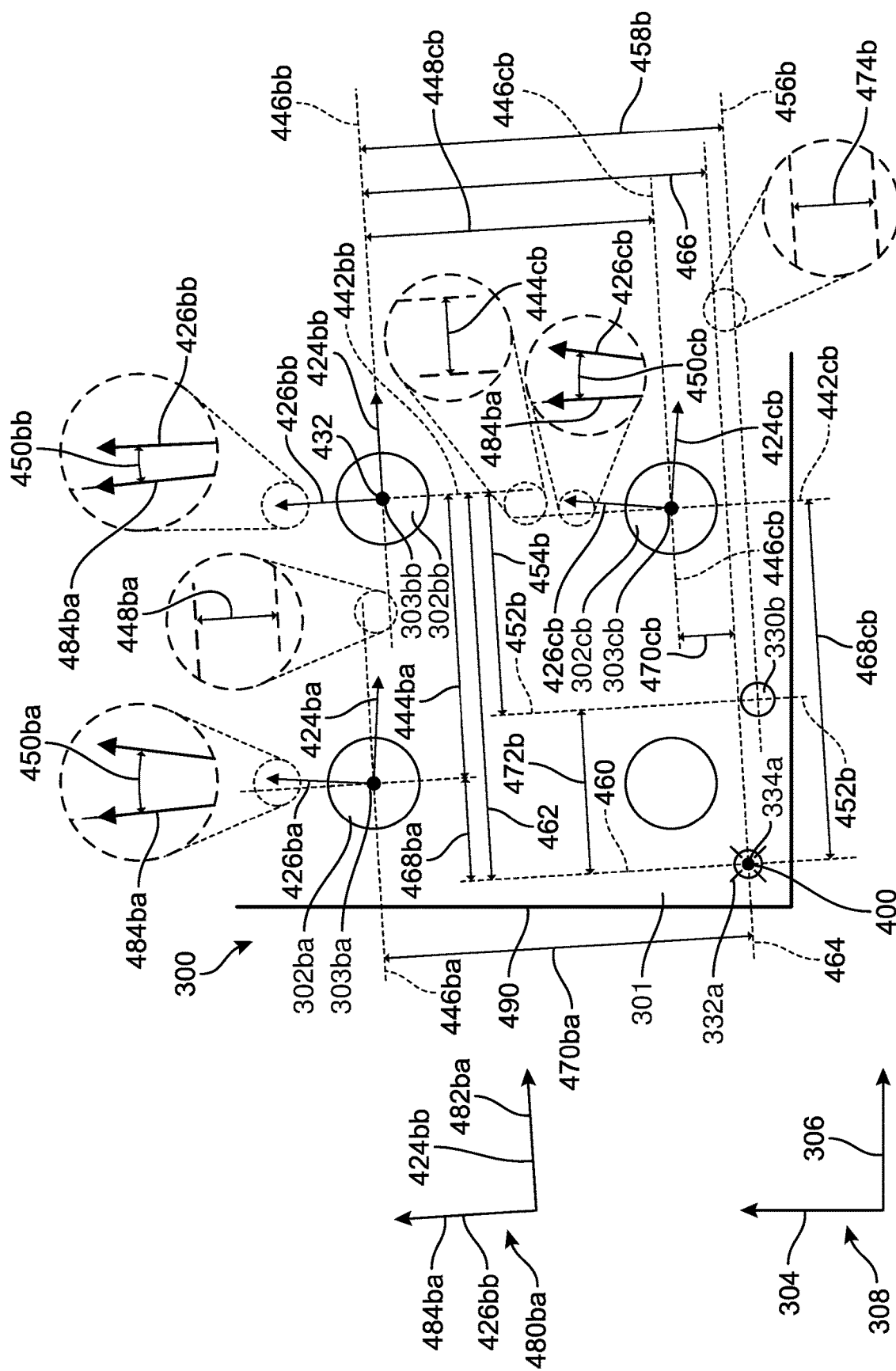

Referring now to FIG. 4B, in an implementation in which the imaging camera 302bb is selected as the reference camera 430, whether for the camera module 300 and/or other features of a light field camera, it may be desired to use a reference camera coordinate space 440 with a first reference camera axis corresponding to the direction 424bb and a second reference camera axis, orthogonal to the first reference camera axis, corresponding to the direction 426bb to measure the actual positions and orientations of features of the camera module 300 such as the imaging cameras 302. In some examples, the reference camera coordinate space 440 may be used as the module-specific coordinate space 480ba with a module-specific axis 482ba in the direction of the module axis 304 and a module-specific axis 484ba in the direction of the module axis 306. In some examples, the module-specific coordinate space 480ba may be defined with respect to other features of a light field camera in which the camera module 300 is included. The selection of the module-specific coordinate space 480ba, whether with respect to features of the camera module 300, the reference camera 432 selected for the camera module 300 or a light field camera as a whole, or with respect to other features, may permit various assumptions and/or precalculations to be made when capturing and processing image data captured by the imaging cameras 302, and/or facilitate positioning the camera module 300 and the imaging cameras 302 relative to other such camera modules and imaging cameras included in a light field camera.

In the example shown in FIG. 4B, the optical center 303bb of the imaging camera 302bb (which may be selected as the reference camera 430) may be used as the second origin 432 for measurements based on the module-specific coordinate space 480ba (or the reference camera coordinate space 440). A line 442bb, which is parallel to the module-specific axis 484ba, and a line 446bb, which is parallel to the module-specific axis 482ba, both pass through the second origin 432. FIG. 4B further illustrates a line 442ba parallel to the module-specific axis 484ba and a line 446ba parallel to the module-specific axis 482ba that both pass through the optical center 303ba of the imaging camera 302ba. A distance 444ba between the lines 442bb and 442ba and a distance 448ba between the lines 446bb and 446ba together indicate a position of the optical center 303ba relative to the second origin 432. FIG. 4B further illustrates a line 442bc parallel to the module-specific axis 484ba and a line 446bc parallel to the module-specific axis 482ba that both pass through the optical center 303bc of the imaging camera 302bc. A distance 444bc between the lines 442bb and 442bc and a distance 448bc between the lines 446bb and 446bc together indicate a position of the optical center 303bc relative to the second origin 432.

For the rotational orientations of the imaging cameras 302 angular measurements may be made with respect to the module-specific coordinate space 480ba. The imaging camera 302ba has a rotational orientation 450ba corresponding to a difference in the angular directions between the module-specific axis 484ba and the direction 426ba. The imaging camera 302cb has a rotational orientation 428cb corresponding to a difference in the angular directions between the module-specific axis 484cb and the direction 426cb. In some examples, the imaging camera 302bb may not be rotationally aligned with the module-specific axis 484ba, and have a rotational orientation 428bb corresponding to a difference in the angular directions between the module-specific axis 484ba and the direction 426bb. The positions of the remaining imaging cameras 302 of the camera module 300 may be measured in a similar manner.

Furthermore, a line 452b parallel to the module-specific axis 484ba and a line 456b parallel to the module-specific axis 482ba both pass through the center of the mounting hole 330b. A distance 454b between the lines 442bb and 452 and a distance 458b between the lines 446bb and 456b together indicate a position of the center of the mounting hole 330b relative to the second origin 432. FIG. 4B further illustrates a line 460 parallel to the module-specific axis 484ba and a line 464 parallel to the module-specific axis 482ba that both pass through the location 334a indicated by the registration mark 332a. A distance 462 between the lines 442bb and 460 and a distance 466 between the lines 446bb and 464 together indicate a position of the center of the location 334a relative to the second origin 432.

In some examples, it may be desired to use a different point as an origin for positional measurements. The desired origin may permit various assumptions and/or precalculations to be made when capturing and processing image data captured by the imaging cameras 302, and/or facilitate positioning the camera module 300 and the imaging cameras 302 relative to other such camera modules and imaging cameras included in a light field camera. For example, the first origin 400, at the location 334a, may be used for positional measurements. As previously noted for the location 334a, the lines 460 and 464 both pass through the first origin 400. A distance 468ba between the lines 460 and 442ba and a distance 470ba between the lines 464 and 446bc together indicate a position of the optical center 303ba relative to the first origin 400. A distance 468bb between the lines 460 and 442bb and a distance 470bb between the lines 464 and 446bb together indicate a position of the optical center 303bb relative to the first origin 400. A distance 468cb between the lines 460 and 442cb and a distance 470cb between the lines 464 and 446cb together indicate a position of the optical center 303cb relative to the first origin 400. A distance 472 between the lines 460 and 452b and a distance 474 between the lines 462 and 456b together indicate a position of the center of the mounting hole 330b relative to the first origin 400. Although not illustrated in FIG. 4B, the positions and/or orientations of other features of the camera module 300, such as but not limited to the edges 490 and 492 of the substrate 301, may be characterized as described above for the imaging cameras 302 and the mounting hole 330b.

Figure 4C:
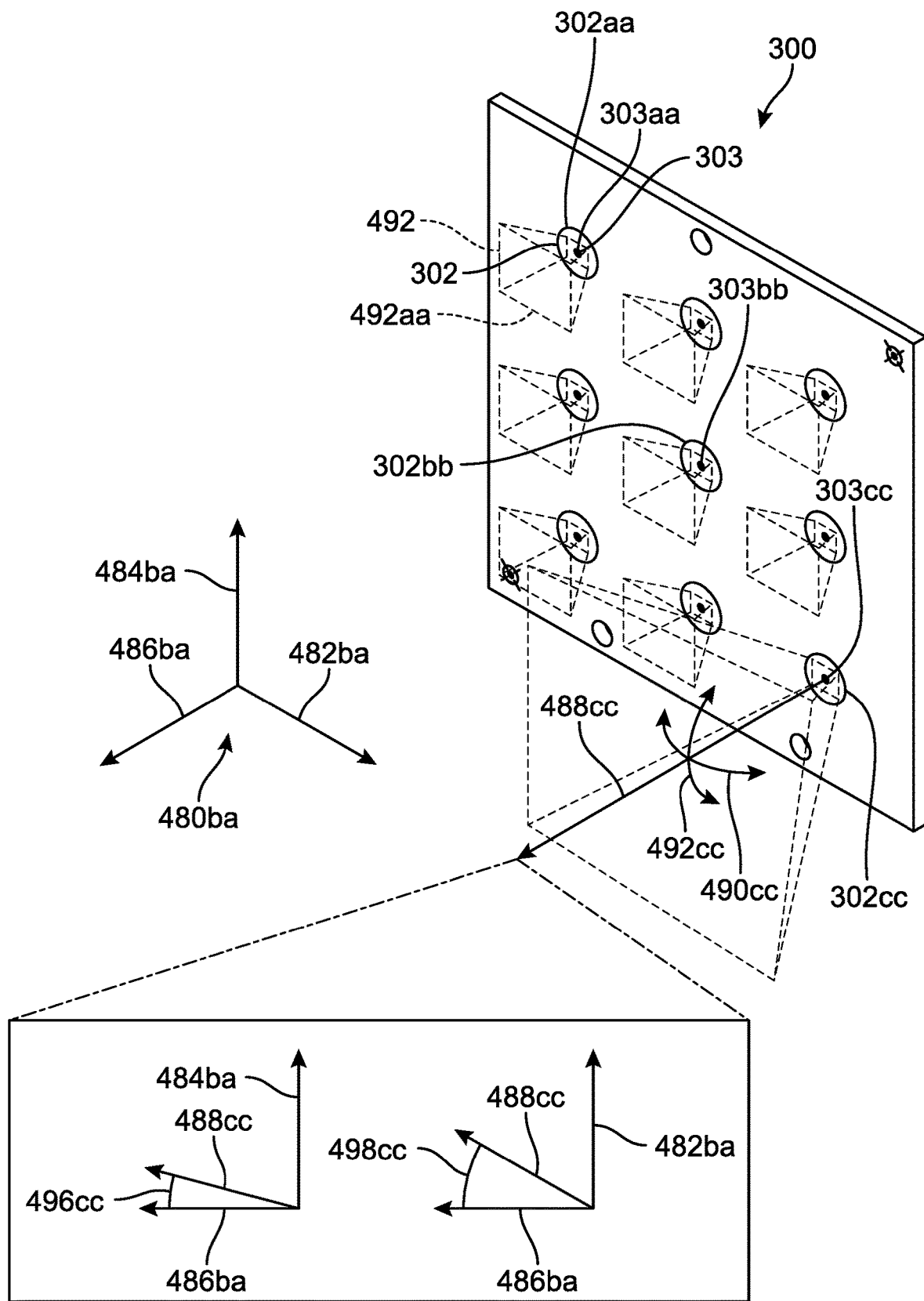

Referring next to FIG. 4C, in addition to the errors in rotational orientations of the imaging cameras 302 described in connection with FIGS. 4A and 4B, there may be an unintended tilt and/or tilt (rotation about the module-specific axis 482ba and/or the module-specific axis 484ba) of an optical axis 488 of each of the imaging cameras 302. Additionally, there may be variations in a horizontal field of view (HFOV) 490 and/or a vertical field of view (VFOV) 492 of each of the imaging cameras 302 (which may be associated with variation in the optical axis 488). Such variations can affect mappings between the angular directions of light rays measured in image data 494 provided by the imaging cameras 302, such as an image data 494cc shown in FIG. 4C for the camera 302cc. In FIG. 4C, an additional module-specific axis 486ba, orthogonal to both of the module-specific axes 482ba and 484ba, is depicted. For purposes of discussion, in the specific example shown in FIG. 4C, the optical axes 488 of the cameras 402 are intended to be parallel to the module-specific axis 486ba.

For the imaging camera 302cc, FIG. 4C illustrates measurements of the orientation of the optical axis 488cc, including a rotational orientation 496cc corresponding to a difference in the angular directions between the optical axis 488cc and the module-specific axis 486ba in a first plane defined by the module-specific axes 484ba and 486ba (and corresponding to an amount of rotation about the module-specific axis 482ba). Also, the measurements include a rotational orientation 498cc corresponding to a difference in the angular directions between the optical axis 488cc and the module-specific axis 486ba in a second plane defined by the module-specific axes 482ba and 486ba (and corresponding to an amount of rotation about the module-specific axis 484ba). The HFOV 490cc may be measured in the second plane, such as a total angle of the HFOV, a maximum angle with respect to the module-specific axis 486ba, and/or a minimum angle with respect to the module-specific axis 486ba. The VFOV 492cc may be measured in the first plane, such as a total angle of the VFOV, a maximum angle with respect to the module-specific axis 486ba, and/or a minimum angle with respect to the module-specific axis 486ba. Similar measurements can also be performed for the remaining imaging cameras 302 included in the camera module 300.

In some implementations, the positions of the optical centers 303 may also be measured in the direction of the module-specific axis 486ba to measure variations in height. It is noted that, due to variations in optical characteristics across the imaging cameras 302, the variations is the heights of the optical centers 303 may be more significant than variations in the heights of other portions of the imaging cameras 302.

Figure 5A:
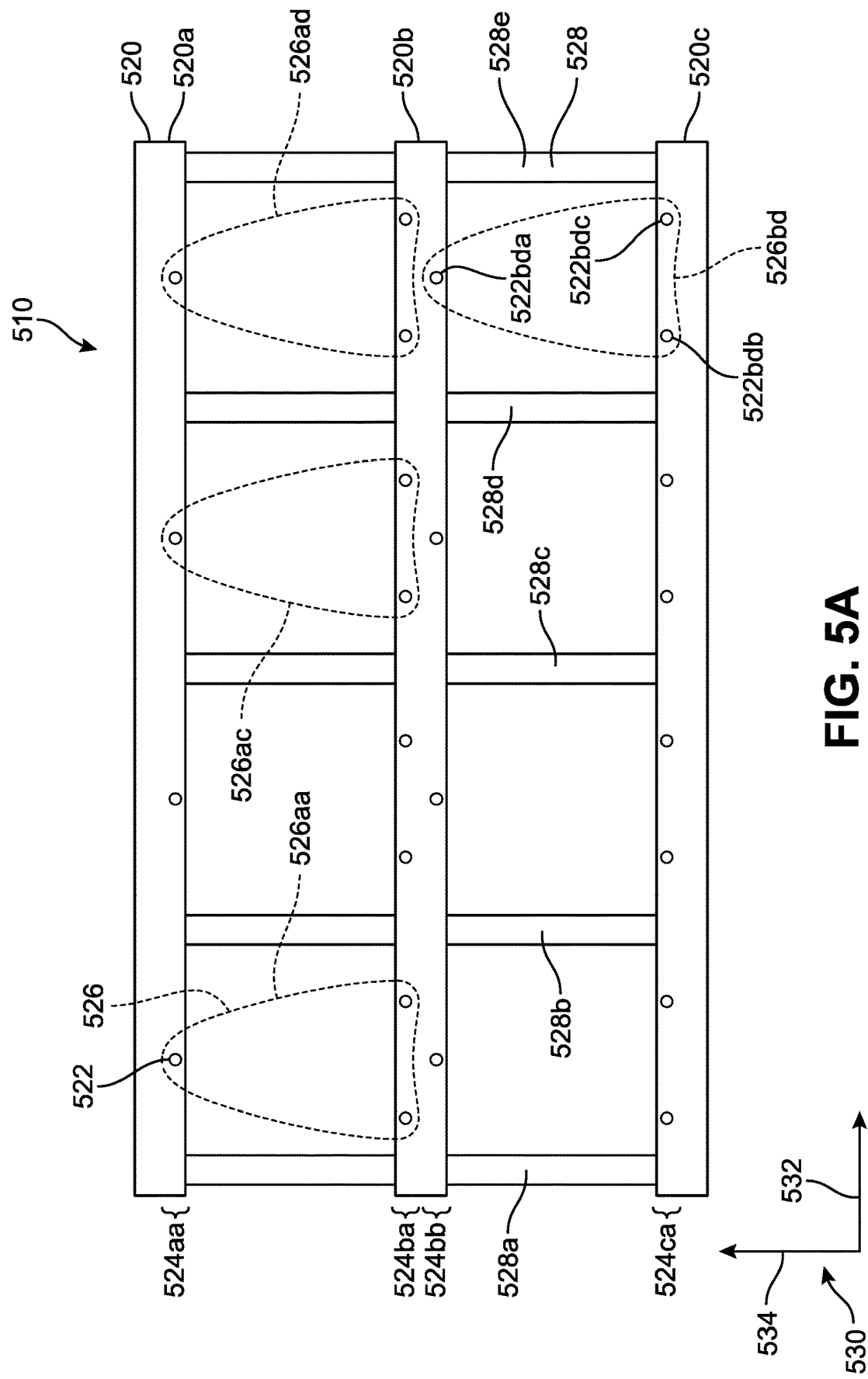
FIGS. 5A, 5B, 5C, and 5D illustrate an example of assembling a plurality of the light field camera modules illustrated in FIGS. 3-4C into an integrated module array for a light field camera.

Referring next to FIGS. 5A, 5B, 5C, and 5D a process of mounting a plurality of light field camera modules is presented. In FIG. 5A, a rigid frame 510 is shown. In this example, the rigid frame 510 includes horizontal members 520 which are rigidly attached to and supported by vertical members 528. For example, the rigid frame 510 might be provided by a welded and/or machined metal structure. FIG. 5A shows a frame coordinate space 530 including a horizontal frame axis 532 and a vertical frame axis 534. The rigid frame 510 also includes mounting attachments 522, such as threaded holes for receiving screws and/or bolts used to attach light field camera modules 340. In this particular example, the rigid frame 510 is configured to receive a total of eight camera modules 340 in a 2×4 array. A first horizontal member 520a includes a first row 524aa of the mounting attachments 522 aligned with the frame axis 532. A second horizontal member 520b includes a second row 524ba and a third row 524bb of the mounting attachments 522 both of which are aligned with the frame axis 532. A third horizontal member 520c includes a fourth row 524ca of the mounting attachments 522 also aligned with the frame axis 532. In this example, each of the camera modules 340 is configured as previously described for the camera module 300 shown in FIG. 3, including the arrangement of mounting holes 330, and may include any of the features described for other light field camera modules described herein.

As shown in FIG. 5A, the rigid frame 510 can be understood to include a plurality of mounting regions 526, where each mounting region is configured to secure a camera module 340. In this specific example, there are eight mounting regions 526, and each mounting region 526 includes three mounting attachments 522, such that first and second mounting attachments 522 are provided on one horizontal member and a third mounting attachment 522 is provided on an adjacent horizontal member. For purposes of clarity, FIG. 5A identifies four mounting regions 526, including a first mounting region 526aa, a second mounting region 526ac, a third mounting region 526ad, and a fourth mounting region 526bd. The mounting regions 526aa, 526ac, and 526ad each include three mounting attachments 522 arranged along an upper section of the rigid frame 510 (i.e., one provided on the first horizontal member 520a and two on the second horizontal member 520b), and the fourth mounting region 526bd includes three mounting attachments 522 arranged along a lower section of the rigid frame 510 (i.e., one provided on the second horizontal member 520b and two on the third horizontal member 520c). More specifically, the fourth mounting region 520bd includes a first mounting attachment 522bda, a second mounting attachment 522bdb, and a third mounting attachment 522bdc.

Figure 5B:
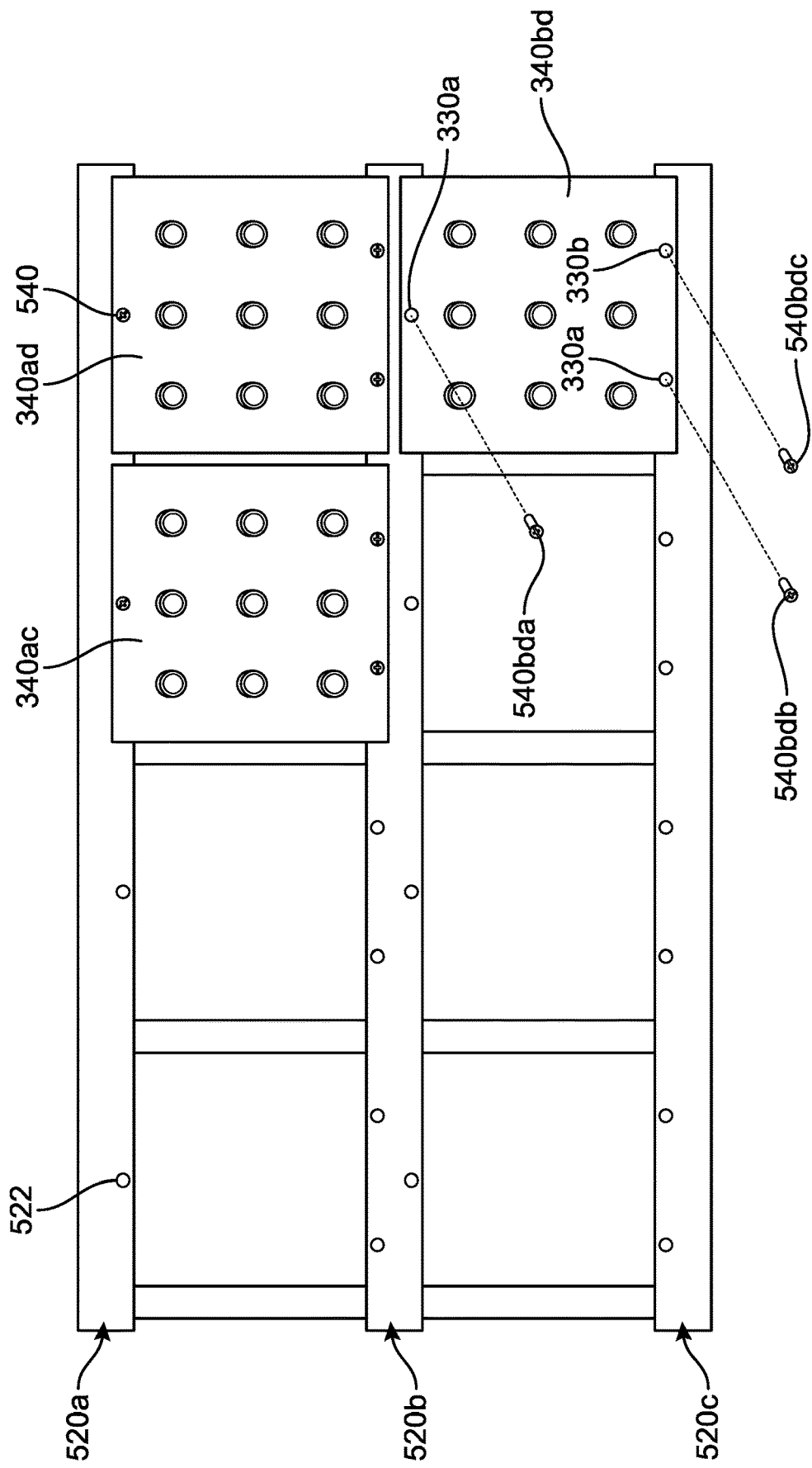

Referring to FIG. 5B, as light field camera modules 340ac, 340ad, and 340bd are mounted onto the rigid frame 510 using fasteners 540, each can be positioned and secured to a specific pre-arranged position on the rigid frame 510. For purposes of this example, the first mounting attachment 522bda of FIG. 5A can be understood to correspond to a first mounting hole 330a of the camera module 340bd, the second mounting attachment 522bdb can be understood to correspond to a second mounting hole 330b of the camera module 340bd, and the third attachment 522bdc can be understood to correspond to a third mounting hole 330c of the camera module 340bd.

Thus, when a camera module 340 is placed on the rigid frame 510, the positions of the mounting attachments 522 and the corresponding mounting holes 330 are substantially aligned and configured to establish and secure direct fastening or other attachment between the camera module 340 and the rigid frame 510. For example, a camera module 340 may be fixedly attached to a frame and/or chassis using screws or bolts. In this specific example, as the camera module 340bd is disposed on the rigid frame 510 in the fourth mounting region 526bd, a first fastener 540bda can be inserted into the first mounting hole 330a and secured to the first mounting attachment 522bda, a second fastener 540bdb can be inserted into the second mounting hole 330b and secured to the second mounting attachment 522bdb, and a third fastener 540bdc can be inserted into the third mounting hole 330c and secured to the third mounting attachment 522bdc, thereby attaching the module 340bd to the rigid frame 510.

Figure 5C:
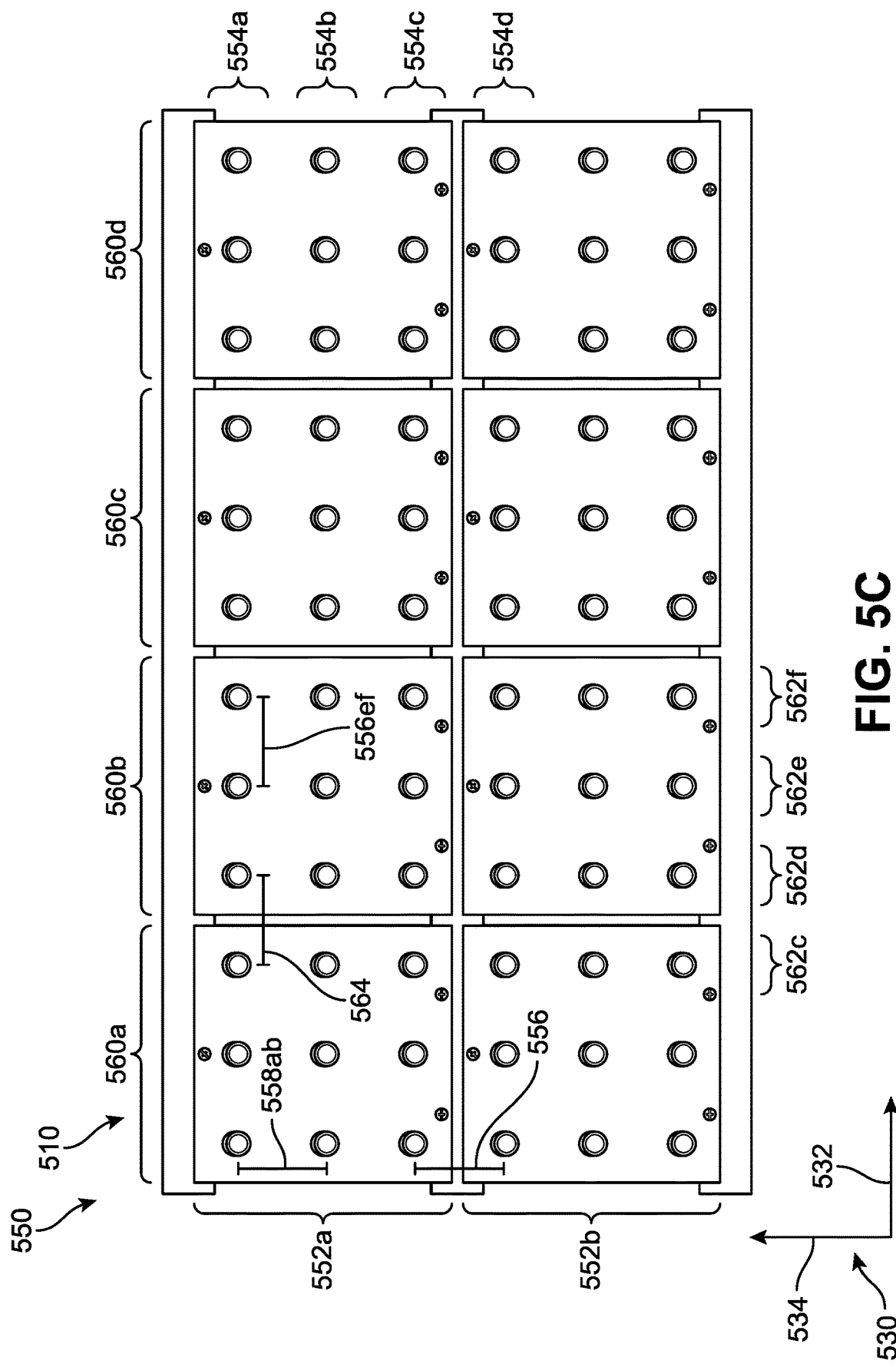

FIG. 5C shows all eight of the camera modules 340 having been attached to the rigid frame 510. The camera modules 340 are arranged in two camera module rows 552*a* and 552*b* and are also arranged in four camera module columns 560*a*, 560*b*, 560*c*, and 560*d*, and collectively form a camera module array 550. The camera module array 550 includes a plurality of imaging cameras 570 arranged in six imaging camera rows 554, including imaging camera rows 554*a*, 554*b*, 554*c*, and 554*d*. In each of the imaging camera rows 554 the imaging cameras 570 are aligned in the direction of the frame axis 532. Also, in this example, the imaging camera rows 554 are evenly spaced, including between different camera modules 340. For example, a distance 558*ab* between the imaging camera rows 554*a* and 554*b* is substantially the same as a distance 556 between the imaging camera rows 554*c* and 554*d* which are located in different camera module rows 552.

Additionally, the plurality of imaging cameras 570 is arranged in twelve imaging camera columns 562, including imaging camera columns 562*c*, 562*d*, 562*e*, and 562*f*. In each of the imaging camera columns 562, the imaging cameras 570 are aligned in the direction of the frame axis 534. Also, in this example, the imaging camera columns 562 are evenly spaced, including between different camera modules 540. For example, a distance 566*ef* between the imaging camera columns 562*e* and 562*f* is substantially the same as a distance 564 between the imaging camera columns 562*c* and 562*d* which are located in different camera module columns 560.

Figure 5D:
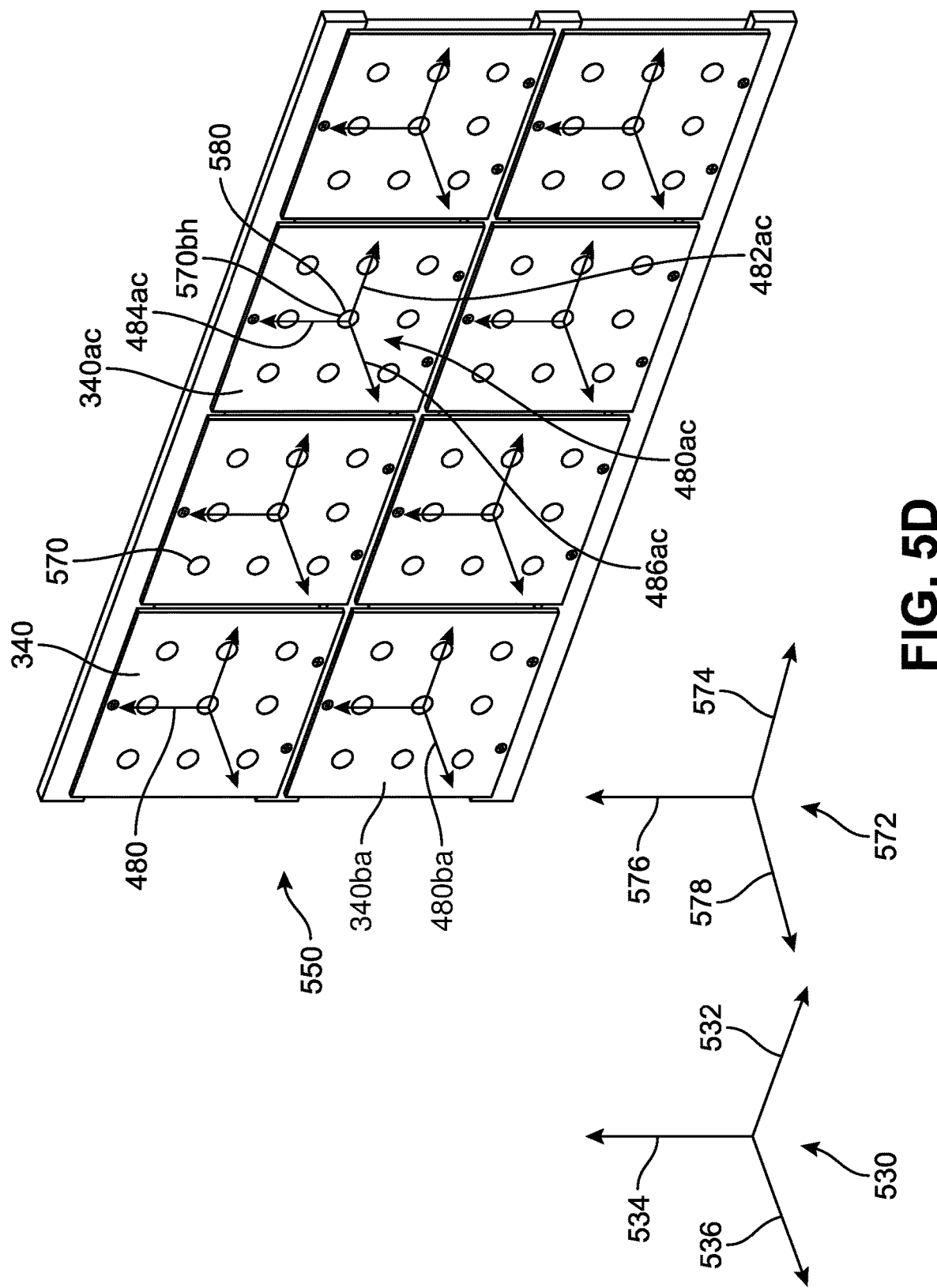

For purposes of illustration, FIG. 5D presents the camera module array 550 in a perspective view. In FIG. 5D, the frame coordinate space 530 is depicted with a frame axis 536 that is orthogonal to each of the frame axes 532 and 534. Each of the camera modules 340 has a respective module-specific coordinate space 480. For example, the camera module 340*ac* includes a module-specific coordinate space 480*ac* with module-specific axes 482*ac*, 484*ac*, and 486*ac*. In some examples, some or all of the module-specific coordinate spaces 480 are not aligned with the frame coordinate space 530. In some examples, the module-specific coordinate spaces 480 are different from each other. In some implementations, one of the imaging cameras 570 included in the camera module array 550 is selected as a reference imaging camera 580 for the camera module array 550. The reference imaging camera 580 may be, in some examples, used to calibrate the other imaging cameras 570 in the camera module array 550. This may include setting or modifying one or more the module-specific coordinate spaces 480 to correspond to an alignment of the reference imaging camera 580. In some implementations, a module array coordinate space 572, with orthogonal module array axes 574, 576, and 578, is generated for the camera module array 550. In some implementations, the module array axis 578 is a normal vector to a plane fit to the positions of the optical centers of the imaging cameras 570, which may be identified as part of a calibration procedure performed on the camera module array 550. In some implementations, the module array axis 574 is determined based on one or more lines fit to the positions of the optical centers of the imaging cameras 570 included in respective imaging camera rows 554. In some implementations, the module array axis 576 is determined based on one or more lines fit to the positions of the optical centers of the imaging cameras 570 included in respective imaging camera columns 562. It is understood that the module array coordinate space 572 may not be aligned with the frame coordinate space 530. In some implementations, one or more of the module-specific coordinate spaces 480 is generated based on the module array coordinate space 572. For example, some or all of the module-specific coordinate spaces 480 may be aligned with the module array coordinate space 572.

Figure 6A:
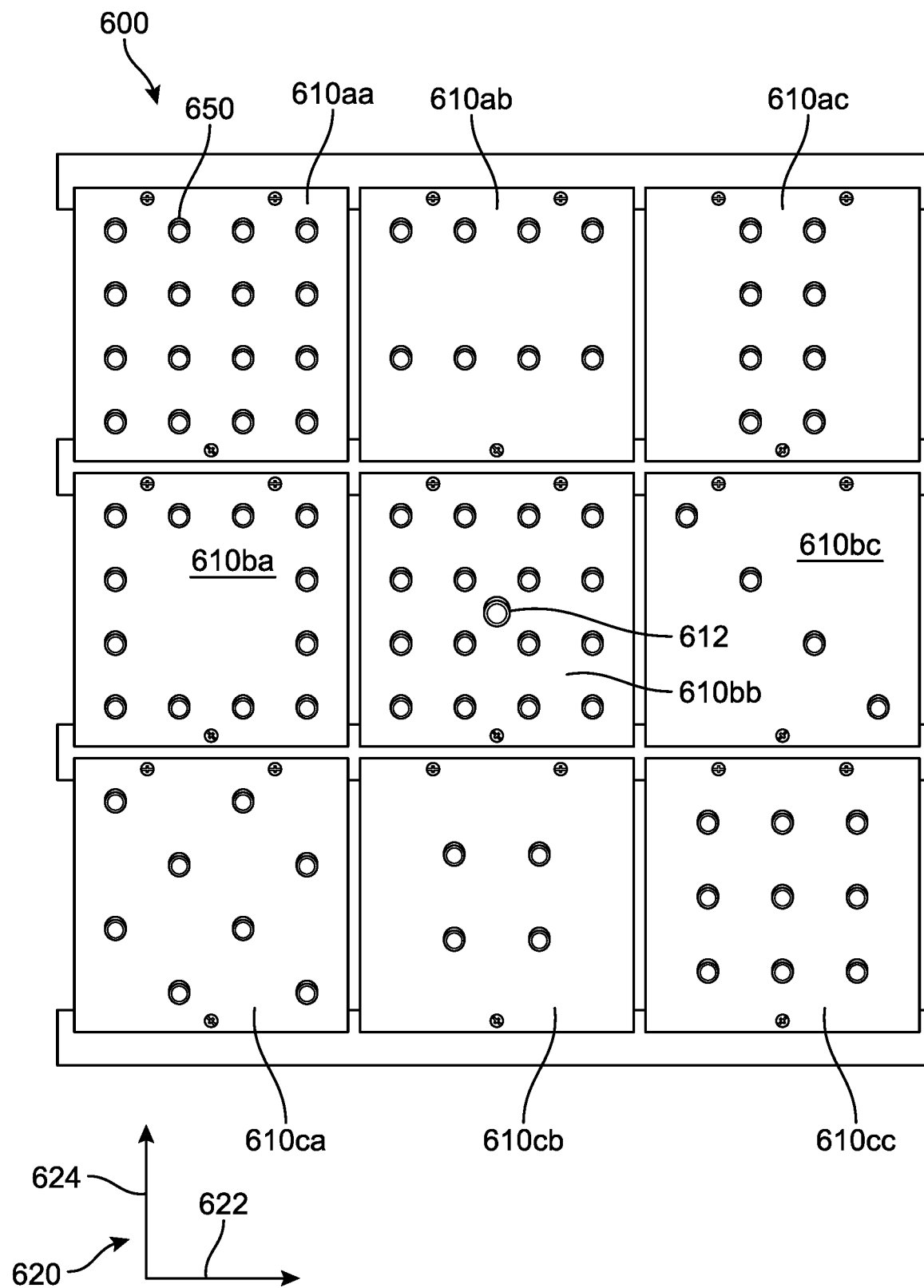
FIG. 6A illustrates an example of a camera module array including light field camera modules with different configurations.

Although FIGS. 5C and 5D depict a camera module array 550 in which each of the camera modules 340 is identical, in some implementations, there may be different camera module configurations included in a single camera module array. FIG. 6A illustrates an example camera module array 600 including nine camera modules 610, each having a different configuration than the other camera modules 610. FIG. 6A also depicts module array axes 622 and 624 of a module array coordinate space 620 for the camera module array 600. A first camera module 610*aa* includes 16 imaging cameras 650 arranged in a 4×4 array. A second camera module 610*ab* is arranged similar to the first camera module 610*aa*, but omits two alternating rows of imaging cameras 650, and therefore includes only eight imaging cameras 650. A third camera module 610*ac* is arranged similar to the first camera module 610*aa* but omits the leftmost and rightmost columns of imaging cameras 650 and only has a total of eight imaging cameras 650. A fourth camera module 610*ba* is arranged similar to the first camera module 610*aa* but omits the four central imaging cameras 650, resulting in a total of twelve imaging cameras 650 arranged about a periphery of the fourth camera module 610*ba*. A fifth camera module 610*bb* includes sixteen imaging cameras 650 as in the first camera module 610*aa*. Additionally, the fifth camera module 610*bb* includes a depth camera 612, such as a structured light or time of flight depth camera. The depth camera 612 enables the camera module array 600 to generate depth maps used to more efficiently and effectively capture and select light rays from an environment observed by the camera module array 600. The fifth camera module 610*bb* is configured to provide depth image data to a controller via a controller bus, as discussed below for the controller bus 804 of FIG. 8. A sixth camera module 610*bc* includes four imaging cameras 650 in a diagonal arrangement. A seventh camera module 610*ca* is arranged similar to the first camera module 610*aa* but omits alternating imaging cameras 650 in a checkerboard pattern and as a result has a lower density of imaging cameras 650. An eighth camera module 610*cb* simply has four imaging cameras 650 in a 2×2 arrangement. Finally, a ninth camera module 610*cc* is configured in the same manner as the camera module 300 shown in FIG. 3.

Figure 6B:
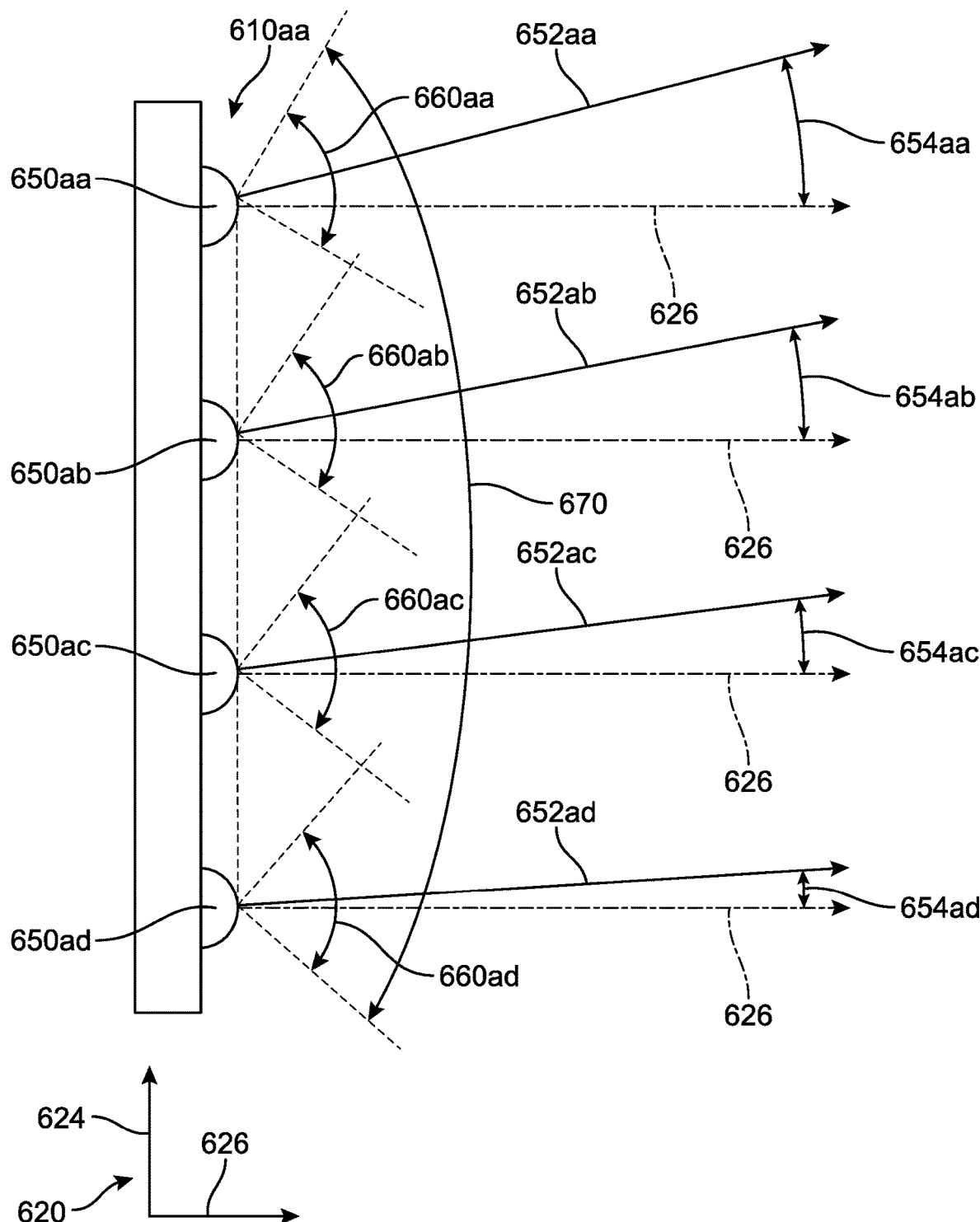
FIG. 6B illustrates a light field camera module included in the camera module array of FIG. 6A and having imaging cameras arranged with increasing optical angles in a direction along a substrate.

In addition to the variations in positional arrangements of the imaging cameras 650, the camera modules 610 may feature variations in angular orientations of the imaging cameras 650. FIG. 6B depicts an example of the first camera module 610*aa* in which the imaging cameras 650 have increased angular deflections as they approach a periphery of the camera module array 600. FIG. 6B depicts the module array coordinate space 620 with the module array axis 624 and a module array axis 626 that is orthogonal to the module array axes 622 and 624. The module array coordinate space 620 may correspond to a module-specific coordinate space for the first camera module 610*aa* (not shown in FIG. 6B). A column of four imaging cameras 650*aa*, 650*ba*, 650*ca*, and 650*da* is shown. The imaging camera 650*aa* is closest to a periphery of the camera module array 600 and has an optical axis 652*aa* with an angular deflection 654*aa* from the module array axis 626 toward the periphery in the plane defined by the module array axes 624 and 626. As a result, an FOV 656*aa* of the imaging camera 650*aa* is rotated significantly toward the periphery of the camera module array 600, thereby providing an increased total FOV 670 for the first camera module 610*aa* and the camera module array 600 in comparison to the optical axes 652 being aligned with the module array axis 626. An optical axis 652*ba* of the imaging camera 650*ba* has an angular deflection 654*ba* (and a corresponding rotation or shift of an FOV 656*ba* of the imaging camera 650*ba*) that is smaller than the angular deflection 654*aa*. An optical axis 652*ca* of the imaging camera 650*ca* has an angular deflection 654*ca* (and a corresponding rotation or shift of an FOV 656*ca* of the imaging camera 650*ca*) that is smaller than the angular deflection 654*ba*. An optical axis 652*da* of the imaging camera 650*da* has an angular deflection 654*da* (and a corresponding rotation or shift of an FOV 656*da* of the imaging camera 650*da*) that is smaller than the angular deflection 654*ca*.

In some implementations, the imaging cameras 650*aa*, 650*ba*, 650*ca*, and 650*da* may be implemented with a view camera system. An example of the view camera system is shown and described in U.S. Pat. No. 7,495,694, titled "OMNI-DIRECTIONAL CAMERA WITH CALIBRATION AND UP LOOK ANGLE IMPROVEMENTS," issued on Feb. 24, 2009, which is incorporated herein by reference in its entirety. In a view camera system, an image sensor is mounted flat on a PCB and a corresponding lens is mounted on the image sensor. Instead of tilting the image sensor and lens together, which would increase manufacturing costs, in the view camera system the lens is horizontally shifted (for example, in the row and/or column directions of the image sensor) such that the centers of the image sensor and lens are offset from each other, which in turn tilts the optical axis of the combined image sensor and lens. By controlling the horizontal shift direction and distance, the optical axis may be tiled at a desired up-look angle while ensuring that the image is completely captured by the sensor. In the view camera system, the image sensors do not need to be held above a surface at a tilted angle to achieve the desired tilt angle. Hence, the camera module 610*aa* may be designed and manufactured in a simpler manner, and image camera misalignment may be substantially reduced.

Figure 7A:
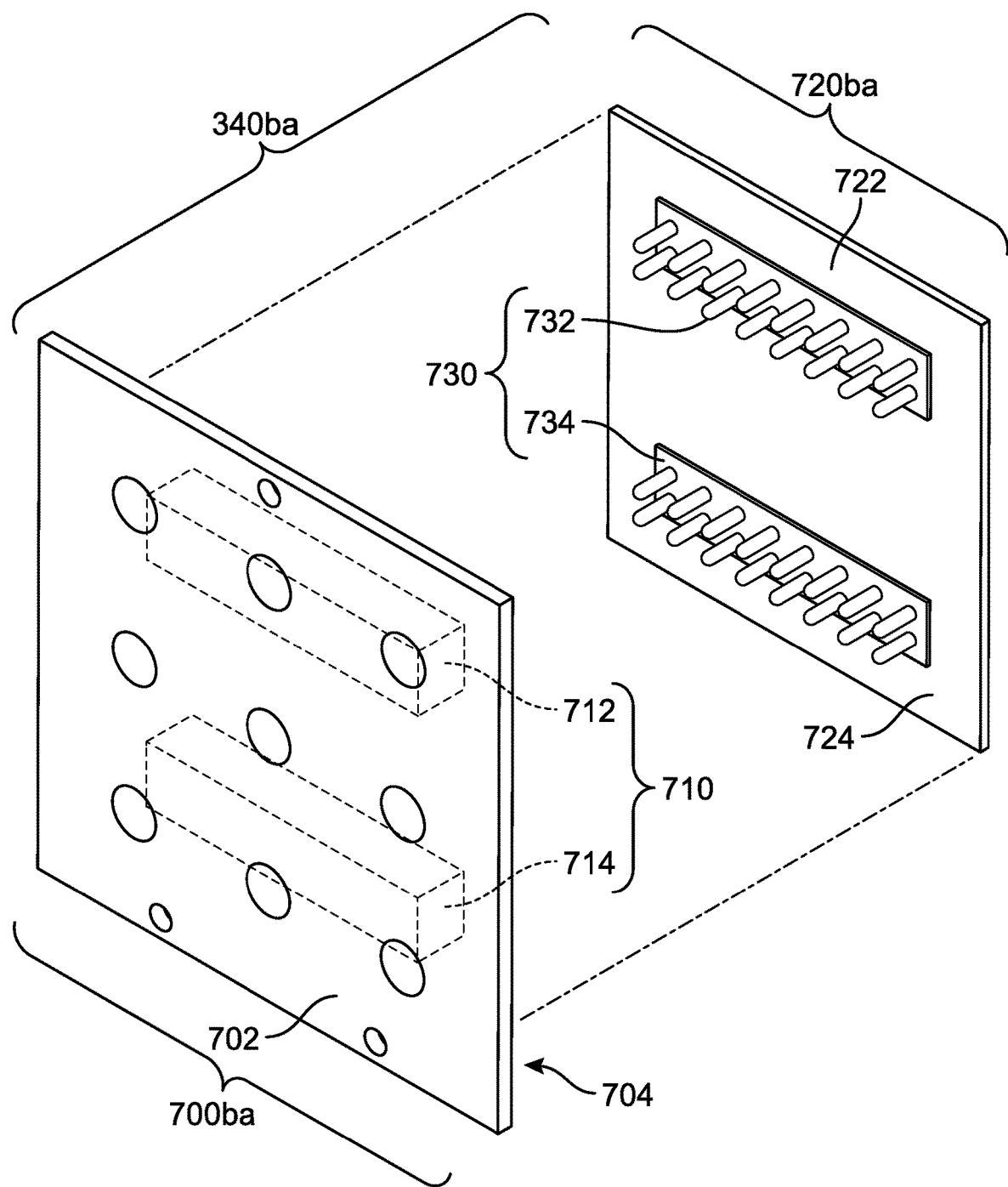
FIG. 7A illustrates an example of a light field camera module comprising a first submodule including imaging cameras on a forward side of a first substrate and a first data connector on an opposing rearward side of the first substrate, and a second submodule including a camera module controller on a rearward side of a second substrate and a second data connector on an opposing forward side of the second substrate.

FIG. 7A illustrates an example in which the camera module 340*ba* comprises a plurality of submodules, including a first submodule 700*ba* and a second submodule 720*ba*. The first submodule 700*ba* includes the imaging cameras 302 mounted on a front side 702 of the substrate 301 as illustrated in the previous examples. Additionally, on a rear side 704 of the substrate 301 is mounted a data connector 710 including a first data connector 712 and a second data connector 714. The second submodule 720*ba* has a data connector 730 including a third data connector 732 and a fourth data connector 734 arranged on a front side 724 of a substrate 722. The data connector 730 is arranged and adapted to mechanically and electrically couple to the data connector 710.

Figure 7B:
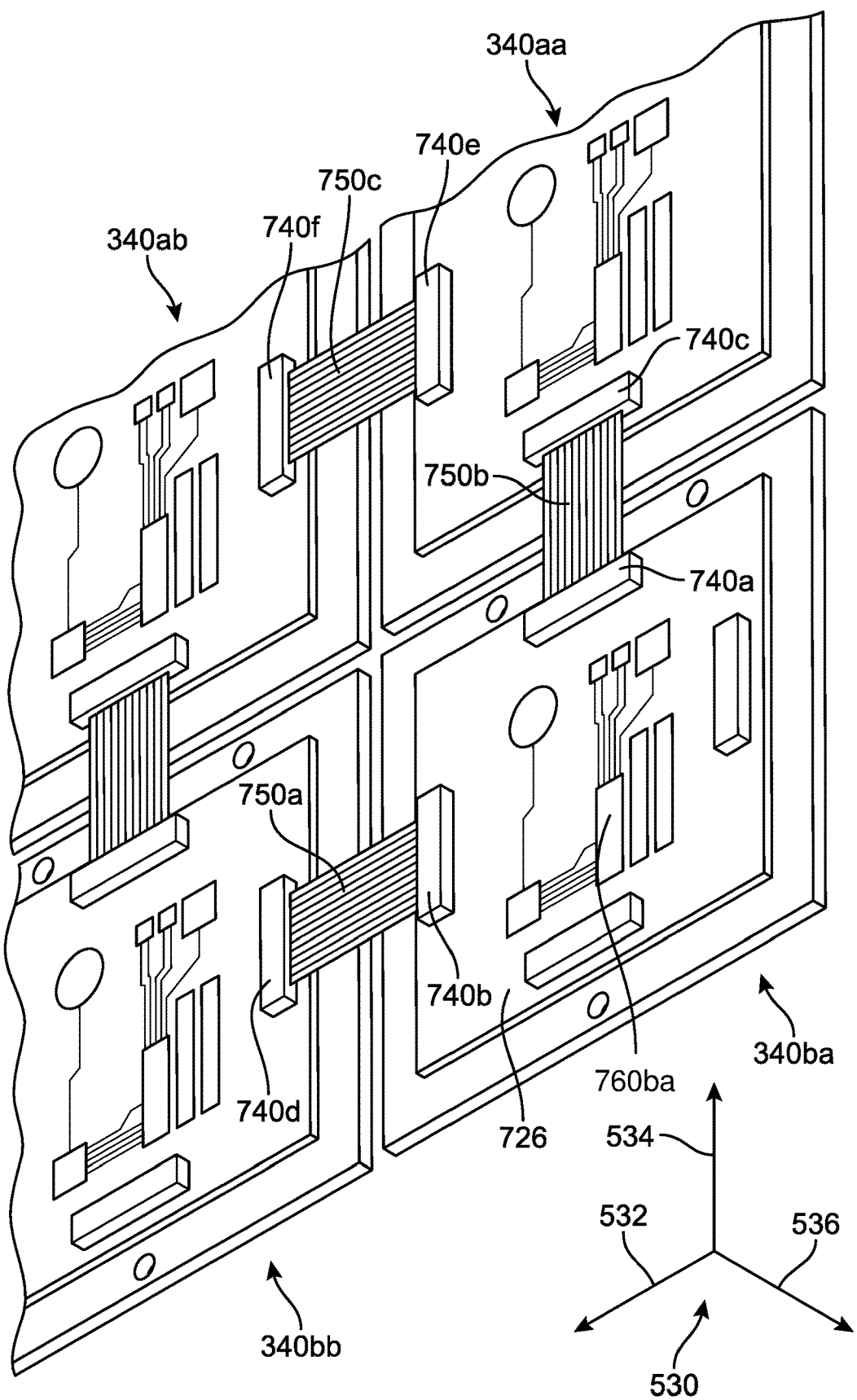
FIG. 7B illustrates an example of light field camera modules of a camera module array being communicatively coupled to other light field camera modules of the camera module array.

Continuing the example of FIG. 7A, FIG. 7B illustrates an example in which the camera module 340*ba* featuring the second submodule 720*ba* is connected to other camera modules 340 as part of the camera module array 550, as previously shown in FIGS. 5C and 5D. In this case, a rear side of a portion of the camera module array 550 is shown with rigid frame 510 not illustrated for purposes of discussion. From this perspective, a rear side 726 of the second submodule 720*ba* is visible, as is a camera module controller 760*ba*, which is mounted on the rear side 726 of the second submodule 720*ba*. It is understood that the second submodule 720*ba* is coupled to the first submodule 700*ba* via the data connectors 710 and 730, which allows the camera module controller 760*ba* to interoperate with the imaging cameras 302 included in the first submodule 700*ba*. By having the camera module controller 760*ba* on the substrate 722 of the second submodule 720*ba* and on the rear side 726 facing away from the first submodule 700*ba*, heat that is produced by the camera module controller 760*ba* is isolated from the imaging cameras 302 or other potentially sensitive components included in the first submodule 700*ba*. Additionally, in the example being shown in FIGS. 7A and 7B, the data connectors 710 and 730 provide a channel through which air may pass to further control heat produced by the camera module controller 760*ba* or other heat-generating components of the camera module array 550. However, it is understood that in other implementations, the camera module 340*ba* can include a single substrate with a forward side and a rear side, where the forward side includes the imaging cameras 302 and the rear side includes the camera module controller 760*ba*, thereby eliminating the need for two separate submodules.

The camera module controller 760*ba* may include a logic subsystem, a data holding subsystem, and a communications subsystem. The logic subsystem may include, for example, one or more processors configured to execute instructions and communicate with the other elements of the camera module 340*ba* according to such instructions to realize various aspects of this disclosure involving the camera module 340*ba*. Such aspects include, but are not limited to, configuring and controlling the other elements of the camera module 340*ba*, communicating with other camera modules and a light field camera controller, and/or processing images captured by the imaging cameras. The data holding subsystem may include one or more memory devices (such as, but not limited to, DRAM devices) and/or one or more storage devices (such as, but not limited to, flash memory devices). The data holding subsystem may include one or more media having instructions stored thereon which are executable by the logic subsystem, which cause the logic subsystem to realize various aspects of this disclosure involving the camera module 340*ba*. Such instructions may be included as part of firmware, an operating system, device drivers, application programs, or other executable programs. The communications subsystem may be arranged to allow the camera module 340*ba* to communicate with other camera modules and the light field camera controller.

Furthermore, the camera module 340*ba* is communicatively coupled to the camera module 340*aa* positioned adjacent to the camera module 340*ba* in the direction of the module array axis 534 via a cable 750*b* and a connector 740*a* included in the camera module 340*ba* and a connector 740*c* included in the camera module 340*aa*. Additionally, the camera module 340*ba* is communicatively coupled to the camera module 340*bb* positioned adjacent to the camera module 340*ba* in the direction of the module array axis 532 via a cable 750*a* and a connector 740*b* included in the camera module 340*ba* and a connector 740*d* included in the camera module 340*bb*. Similarly, the camera module 340*aa* is communicatively coupled to the camera module 340*ab* via a cable 750*e* and a connector 740*e* included in the camera module 340*aa* and a connector 740*f* included in the camera module 340*ab*. Via the cables 750*a* and 750*b*, the camera module 340*ba* is able to exchange data with its neighboring camera modules 340*aa* and 340*bb*. In some implementations, via the cable 750*a* and/or 750*b*, the camera module 340*ba* is able to exchange data with other camera modules 340 included in the camera module array 550. For example, the camera module 340*ba* may be able to exchange data with the camera module 340*ab* via the cables 750*b* and 750*c*. In connection with their use for exchanging data between camera modules 340, the cables 750a and 750b, in whole or in part, may be referred to as a "camera module array bus." In some implementations, the cable 750a and/or the cable 750b allow the camera module 340ba to exchange data with a light field camera controller (not shown in FIG. 7B) involved in configuring, controlling, and receiving image data from the camera modules 340 of the camera module array 550. In connection with their use for exchanging data between camera modules 340 and the light field camera controller, the cables 750a and 750b, in whole or in part, may be referred to as a "light field camera controller bus" (or more simply a "controller bus"). In some implementations, a camera module 340 may utilize a first connection for a camera module array bus and a different connection for a light field camera controller bus. In some implementations, multiple camera modules 340 may be communicatively coupled to a single light field camera controller via a shared light field camera controller bus, which may enable the light field camera controller to reduce communication overhead by directing a single broadcast transmission to multiple camera modules 340.

Continuing the example of FIG. 7B, FIG. 8 illustrates an example of features included in the camera module 340ba and their operation, including interoperation with a light field camera controller via a light field camera controller bus 804 using a first communication interface (not shown in FIG. 8) and, in some implementations, other camera modules included in a same camera module array via a camera module array bus 806 using a second communication interface (not shown in FIG. 8). Although aspects of features illustrated in FIG. 8 may be described with a focus on generating a light field image frame for a current camera capture period (which may be referred to as a "frame capture period" or a "frame period"), it is understood that these features would be similarly applied to generate additional light field image frames, such as a series of light field image frames for a telepresence videoconferencing stream.

The camera module 340ba is configured to store calibration data 808. In some implementations, some or all of the calibration data 808 is stored in a nonvolatile memory module included as part of the camera module 340ba. The calibration data 808 includes camera-specific calibration data for each of the imaging cameras 302 included in the module 340ba, such as but not limited to color response attributes, per-pixel attributes (which may include identification of "hot" pixels that fail to provide useful measurements), optical distortion (which may include parameters for mapping between angular positions within an FOV to and/or from pixel positions), field of view, focal length, position and/or orientation (which may include one or more transformation matrices translating between one or more camera coordinate systems and other coordinate systems) for each of the imaging cameras 302. Example techniques for calibrating cameras for their perspective intrinsic parameters and their distortion patterns are described in O. D. Faugeras et al., Camera self-calibration: theory and experiments, In European Conference on Computer Vision, pages 321-34, 1992; Oliver Faugeras et al., The calibration problem for stereo. In Proceedings of the IEEE Conference on Computer Vision and Pattern Recognition 1986, pages 15-20, 1986; Roger Tsai, A versatile camera calibration technique for high accuracy 3d machine vision metrology using off-the-shelf tv cameras and lenses, IEEE Journal of Robotics and Automation, 3(4):323-344, August 1987; and N. Sabater et al., Dataset and Pipeline for Multi-View Light-Field Video, In Proceedings of the IEEE Conference on Computer Vision and Pattern Recognition Workshops 2017 (pp. 30-40), July 2017, each of which are incorporated by reference in their entireties. Additionally, the calibration data 808 may include module-specific calibration data for the camera module 340ba, such as but not limited to position and/or orientation (which may include one or more transformation matrices translating between one or more camera coordinate systems and other coordinate systems) for the camera module 304ba.

Figure 9A:
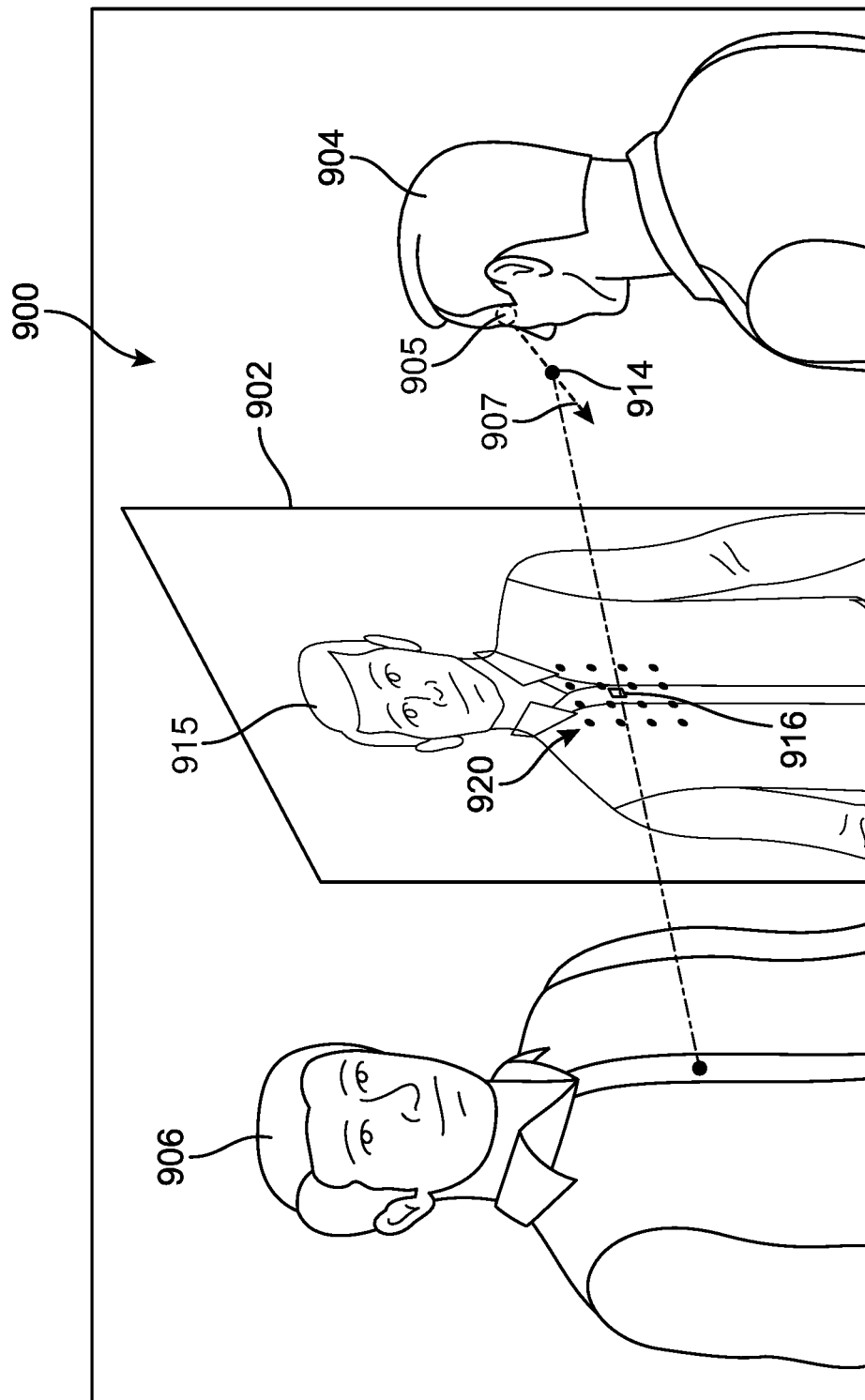
FIG. 9A illustrates an example interaction between a third participant and a fourth participant and generating, for a point of view (POV) of the third participant, a rendered image portion of a rendered image of the fourth participant.

With reference to FIG. 9A, a third participant 904 (shown as positioned at a first time) at a first location 900 is shown interacting with a fourth participant 906 via a first telepresence device, much as described in connection with FIGS. 1A-1D. Image data of the fourth participant 906 is captured by a light field camera (not shown in FIG. 9A) (for example, included in a second telepresence device), provided to the first telepresence device including a rendering surface 902 (which may be referred to as a "display surface"), and the image data captured by the light field camera is used to generate and display, at a second time after the first time, a rendered image 915 (including a rendered image portion 916) on the rendering surface 902 based on a real-time determination of a rendering POV 914 for the third participant 904 for the second time, making the displayed rendered image, along with a series of additional such rendered images, directly responsive to movements of the third participant 904 despite a delay between the first time and the second time, including, for example, delays associated with position estimation, round trip network latencies, compression and decompression of the image data, and generating the rendered image 915 from the image data captured by the light field camera. FIG. 9A shows the fourth participant 906, at a third time between the first time and the second time and during which the image data is captured, in relation to imaging cameras corresponding to imaging camera positions 920 on the rendering surface 902.

Figure 9B:
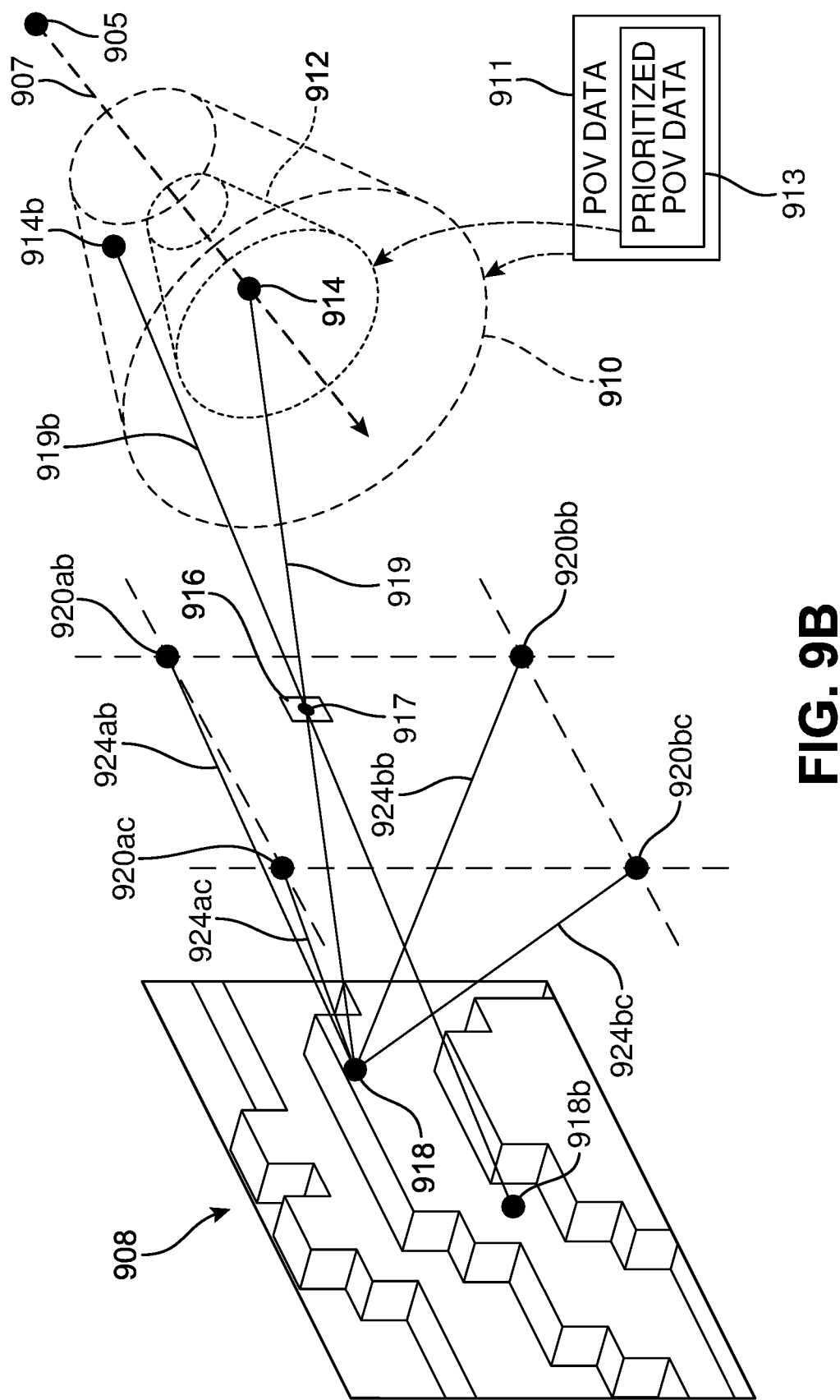
FIG. 9B illustrates an example technique for obtaining image data selected based on its use for rendering the rendered image portion of FIG. 9A for a rendering POV of the third participant, and for using capture POV volumes indicating a range of candidate POVs.

Continuing the example shown in FIG. 9A, FIG. 9B illustrates an example technique for obtaining image data captured by the light field camera at the third time and selected based on information available at the first time that is suitable for rendering, at the second time, the rendered image portion 916 (with a corresponding image position 917) for the rendering POV 914 (which may also be referred to as a virtual camera location) of the third participant 904. Using a depth map 908 obtained for a scene observed by the light field camera, which includes depth data for various portions of the fourth participant 906, a first scene point 918 is identified along a fourth virtual ray 919 extending through the image position 917 and the rendering POV 914 onto the depth map 908 (for example, with depth map 908 as a mesh corresponding to the scene depth data 814). Pixel data is obtained from a imaging camera corresponding to an imaging camera position 920ab for a direction 924ab from the camera to the first scene point 918. Likewise, pixel data is obtained from imaging cameras corresponding to imaging camera positions 920ac, 920bb, and 920bc surrounding the image position 917 for respective directions 924ac, 924bb, and 924bc from the imaging cameras to the first scene point 918. Various interpolation techniques may be applied to determine pixel color values for the rendered image portion 916, such as bilinear interpolation of pixel color values for the imaging camera positions 920aa, 920ab, 920ba, and 920bb or triangle interpolation (for example, using barycentric coordinates) of pixel color values for the imaging camera positions 920aa, 920ab, and 920ba. The quadrilateral region bounded by the imaging camera positions 920aa, 920ab, 920ba, and 920bb may be referred to as an "interpolation region," in which pixel values are determined based on an interpolation of pixel values obtained using the corresponding four imaging cameras. To render other image portions included in the rendered image 915, additional image data captured by the light field camera, including more image data from the imaging cameras corresponding to the imaging camera positions 920ab, 920ac, 920bb, and 920bc, is similarly selected based on projections from the rendering POV 914 to be rendered. Related techniques for using depth data for rendering light fields are described in Lin, Zhouchen, and Heung-Yeung Shum, "A Geometric Analysis of Light Field Rendering", International Journal of Computer Vision 58.2 (2004): 121-138, which is incorporated by reference herein in its entirety.

Even using light field-specific image compression techniques that exploit reasonably predictable similarities among the images captured by the many imaging cameras included in the light field camera, it is undesirable to transmit the full images captured by the imaging cameras across long-distance networks. To reduce the volume of image data being transmitted, image data limited to the portions used to render for the rendering POV 914 may be selected for transmission. Based on movements of the third participant 904 detected before the first time and an estimate of when the third time, at which the rendered image 915 will be displayed, will be, at about the first time the rendering POV 914 may be transmitted to another system for selecting the image data for transmission. Using the transmitted image data, a rendered image may then be rendered for the estimated POV and the image rendered for the estimated warped to account for differences between the POV estimated at the first time and an actual POV at the third time.

In an approach used in connection with the camera module 340ba shown in FIG. 8, rather than a single rendering POV 914 being used to select image data for transmission, a first capture POV volume 910 (which may also be referred to as a "capture POV range" or a "capture POV"), corresponding to an estimated range of POVs for rendering one or more rendered images from the image data captured by the light field camera, is determined and a corresponding capture POV data 911 (which may simply be referred to as "POV data," as shown in FIG. 9B) is generated and transmitted at about the first time. For example, the illustrated first capture POV volume 910 includes both the rendering POV 914 and a candidate POV 914b for which a fifth virtual ray 919b extending from the candidate POV 914b and through the image position 917 projects to a second scene point 918b. A size, shape, and/or orientation of the first capture POV volume 910 may be determined based on at least detected movement of the third participant 904 and/or a POV of the third participant 904 prior to the first time; an estimated movement path, range of paths, and/or speed for a POV of the third participant 904 after the first time; and/or one or more uncertainties is measurements and/or estimates. In the example shown in FIG. 9B, the first capture POV volume 910 is a frustum of a cone extending along the estimated path 907 from a POV 905 determined for the third participant 904 for the first time, with an increasing radius reflecting increasing uncertainty in a rendering POV over time for which image data is to be captured. In some implementations, the capture POV data 911 may include prioritized capture POV data 913 (which may simply be referred to as "prioritized POV data," as shown in FIG. 9B) that identifies two or more priority values for respective subportions of the first capture POV volume 910 (which may be referred to as "subvolumes") for respective priority values. For example, the first capture POV volume 910 may be divided into a first capture POV subvolume 912 (which may be referred to as a "prioritized capture POV subvolume", "prioritized capture POV volume", or a "prioritized capture POV") with a first priority value for higher probability virtual camera positions and a second subvolume with a second priority value less than the first priority value for the remainder of the first capture POV volume 910. In some examples, there may be three or more priority values or a continuous range of priority values identified by the prioritized capture POV data 913.

Returning to the discussion of FIG. 8, the camera module 304ba includes a POV FOV region selector 810, which is configured to determine, based on at least capture POV data 816 (labeled "POV data" in FIG. 8) for a current image capture period received via the light field camera controller bus 804 from the light field camera controller, which portions of the FOVs of the imaging cameras 302 (shown as POV FOV regions 830) should be obtained from the imaging cameras 302 during the current image capture period for the camera module 304ba to provide selected camera module image data 870 for the current capture period (which may be referred to as a "camera module light field image frame" for the current capture period) useful for rendering images from various virtual camera positions within a POV volume (which, in some examples, may be a combination of multiple volumes, such as volumes for multiple virtual cameras) identified by the capture POV data 816. Accordingly, only selected image data portions needed for rendering from a range of POVs indicated by the capture POV data 816 are sent via the light field camera controller bus 804, thereby managing and reducing a volume of image data that the light field camera controller must process for each camera capture period. In some examples, the POV FOV region selector 810 is configured to determine the POV FOV regions 830 also based on scene depth data 814 received from the light field camera controller.

In some implementations, the POV FOV region selector 810 includes an interpolation region scene point identifier 812 configured to identify, based on at least the capture POV data 816 and the scene depth data 814, interpolation scene points 820 for a plurality of interpolation regions for which image data obtained from the imaging cameras 302 is used to render an image from a rendering POV (usually within a capture POV volume identified by the capture POV data 816). Much as shown in FIG. 9B, in which scene points 918 and 918b were identified for the respective POVs 914 and 914b for the rendered image portion 916, a capture POV volume identified by the capture POV data 816 may be projected through an interpolation region (for example, as a virtual aperture) to identify the interpolation region scene points 820 for the interpolation region.

The POV FOV region selector 810 may also include a camera scene point identifier 822 configured to identify, based on at least the interpolation region scene points 820 identified by the interpolation region scene point identifier 812, camera scene points 826 for each of the imaging cameras 302. For example, if a first imaging camera 302 contributes image data for four interpolation regions, the interpolation scene points 820 for those four interpolation regions may be combined to identify the camera scene points for the first imaging camera 302. In some implementations, the camera scene point identifier 822 is configured to receive interpolation region scene points 824 from other camera modules via the camera module array bus 806, and the camera module 340ba is configured to provide a portion of the interpolation scene points 820 to other camera modules via the camera module array bus 806. By sharing the interpolation region scene points 820 and/or 824 in this manner, occurrences of multiple camera modules 340 identifying scene points for a same interpolation region may be reduced or eliminated.

The POV FOV region selector 810 may also include a POV FOV region identifier 828 configured to, based on at least the camera scene points 826, determine the POV FOV regions 830 for each of the imaging cameras 302. As each of the imaging cameras 302 is at a different position, a same scene point can have different angular positions for different imaging cameras 302, particularly for scene points at smaller depths from the imaging cameras 302. A POV FOV region 830 identifies a portion of an FOV of an imaging camera 302 that corresponds to the camera scene points 826 from the position of the imaging camera 302. In some implementations, the POV FOV regions 830 may be specified with respect to one or more camera coordinate spaces (see, for example, the reference camera coordinate space 440 in FIG. 4B), a module-specific coordinate space for the camera module 340ba (see, for example, the module-specific coordinate space 480ba in FIGS. 4A, 4C, and 5D), and/or a module array coordinate space (see, for example, the module array coordinate space 572 in FIG. 5D).

It is noted that in some implementations, the POV FOV region selector 810 is configured to perform similar determinations with respect to a prioritized capture POV data 818 included in the capture POV data 816 to determine prioritized POV FOV regions 832 based on and corresponding to the prioritized capture POV data 818. This may include identifying corresponding prioritized interpolation scene points 820 and/or prioritized camera scene points 826. The camera module 340ba (including, for example, an image processor 844 included in the module 340ba) and/or the light field camera controller may be configured to determine, based on at least the prioritized capture POV data 818, priority levels for subportions of image data and process subportions of the image data based on their respective priority levels. In some implementations, this may include calculating a score for portions of POV FOV regions 832 and/or portions of various items of image data (for example, per-pixel or per-tile scores may be calculated based on at least the prioritized capture POV data 818). By way of example, a first subportion of a first image data with a third priority level may be processed and/or transmitted before a second subportion of the first image data having a lower fourth priority level (to better realize real-time targets), a greater level of forward error correction may be applied to the first subportion, and/or the first image data may delivered with higher fidelity (for example, by using a different first image data and/or a higher quality compression parameter). In some implementations, the prioritized capture POV data 818 may be automatically identified from the capture POV data 816 and/or the prioritized POV FOV regions 832 may be automatically identified from the POV FOV regions 830, such as by removing a peripheral portion (for example, by performing a 2D or 3D erosion). In some implementations, the capture POV data 816 may be automatically identified from the prioritized capture POV data 818 and/or the POV FOV regions 830 may be automatically identified from the prioritized POV FOV regions 832, such as by adding a peripheral portion (for example, by performing a 2D or 3D dilation).

Figure 10A:
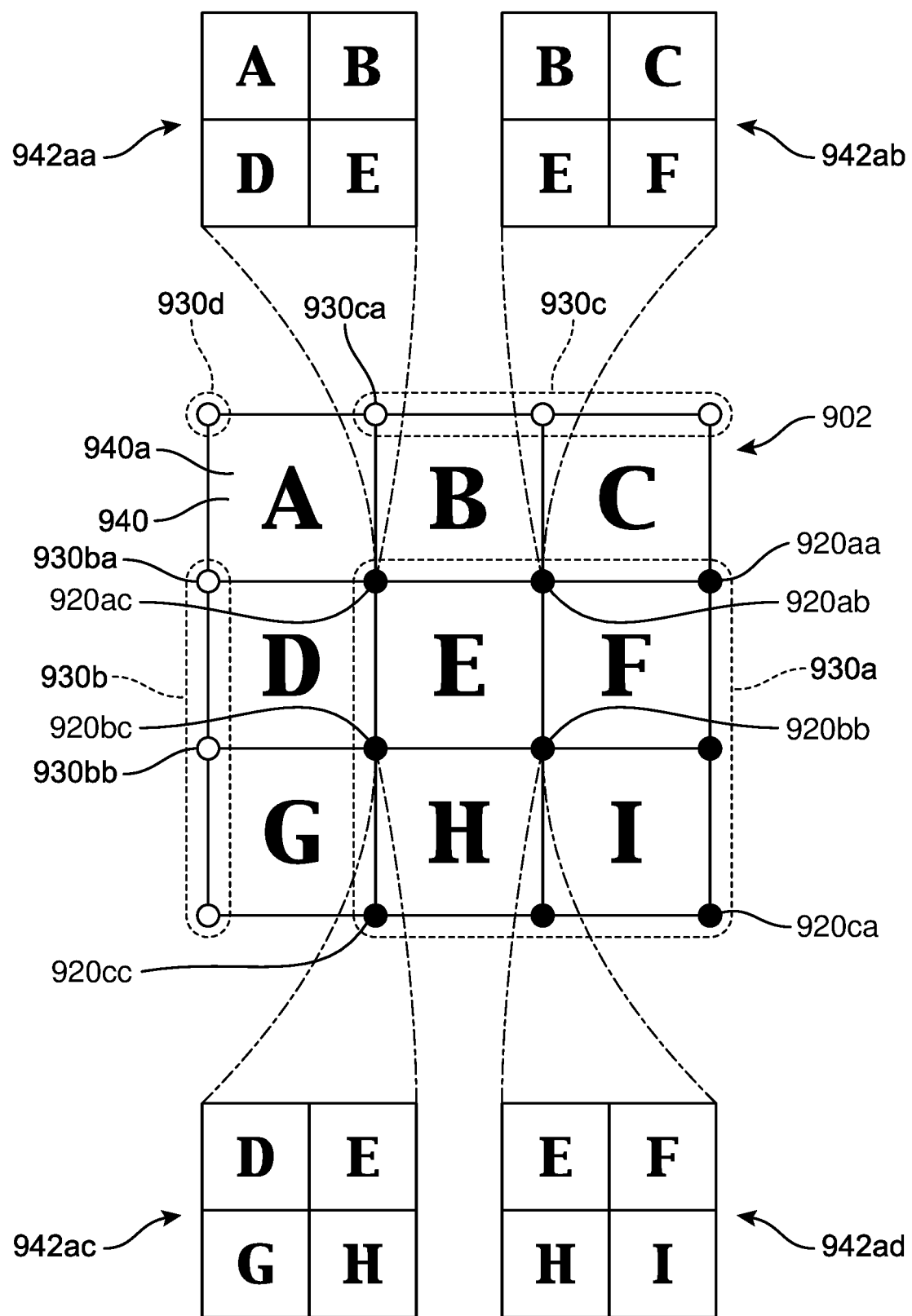
FIG. 10A illustrates examples of interpolation regions for which corresponding interpolation region scene points are identified and camera regions each including two or more of the interpolation regions and having combined interpolation region scene points.

FIGS. 10A, 10B, 10C, 10D, and 10E illustrate examples of identifying interpolation scene points 820, camera scene points 826, and POV FOV regions 830. Continuing the example of FIGS. 9A and 9B, FIG. 10A shows nine imaging camera positions 930a on the rendering surface 902 corresponding to the imaging cameras 302 of the camera module 340ba, including imaging camera positions 920aa, 920ab, 920ac, 920bb, 920bc, 920ca, and 920bc. FIG. 10A also shows three imaging camera positions 930b on the rendering surface 902 (including imaging camera positions 930ba and 930bb) for a first adjacent camera module, three imaging camera positions 930c on the rendering surface 902 (including imaging camera position 930ca) for a second adjacent camera module, and an imaging camera position 930d on the rendering surface 902 for a third adjacent camera module. Also shown are nine interpolation regions 940 of the rendering surface 902, labeled "A"-"I", each a quadrilateral with an imaging camera position at each corner. To render each interpolation region 940, imaging data is obtained for each of the imaging cameras corresponding to the imaging camera positions at its corners. As an example, to render a first interpolation region 940a (labeled "E"), interpolation is performed based on image data captured by the four imaging cameras (all included in the camera module 340ba) corresponding to the imaging camera positions 920ac, 920ab, 920bc, and 920bb. As another example, to render a second interpolation region 940b (labeled "A"), interpolation is performed based on image data captured by the four imaging cameras (in four different camera modules) corresponding to the imaging camera positions 930d, 930ca, 930ba, and 920ac. Thus, image data is required from the camera module 340ba to render the interpolation region 940b, although the interpolation region 940b is not within the imaging camera positions 930a for the camera module 340ba.

Figure 10B:
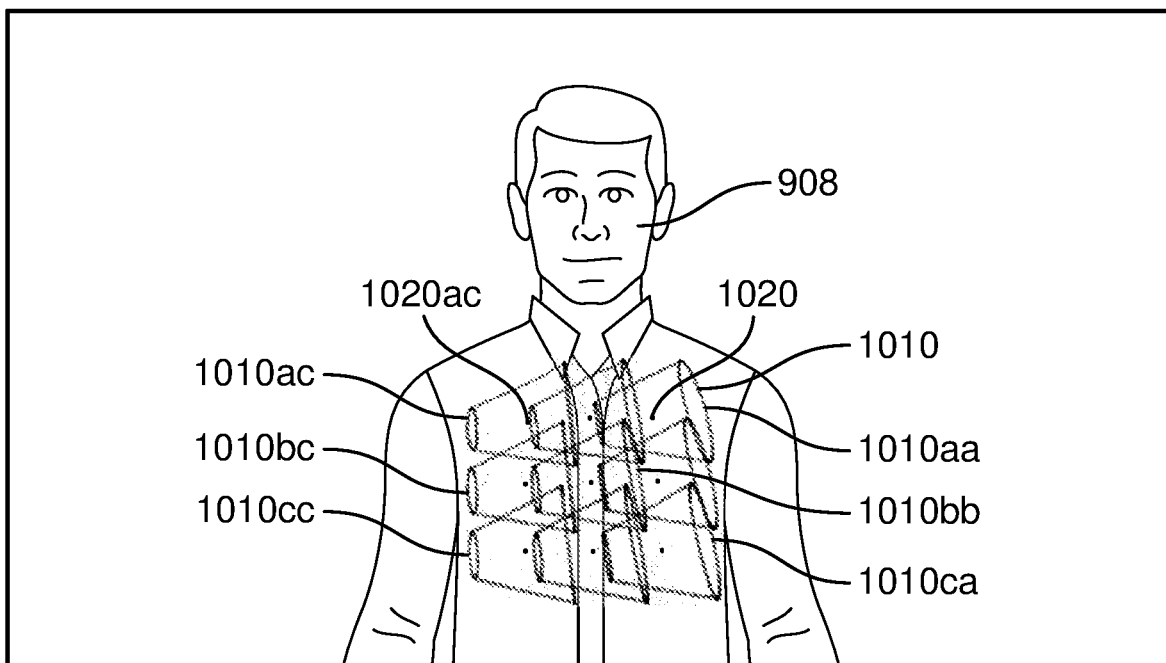
FIG. 10B shows an example of the capture POV volume of FIG. 9B being projected through nine camera positions onto a scene depth map.
Figure 10C:
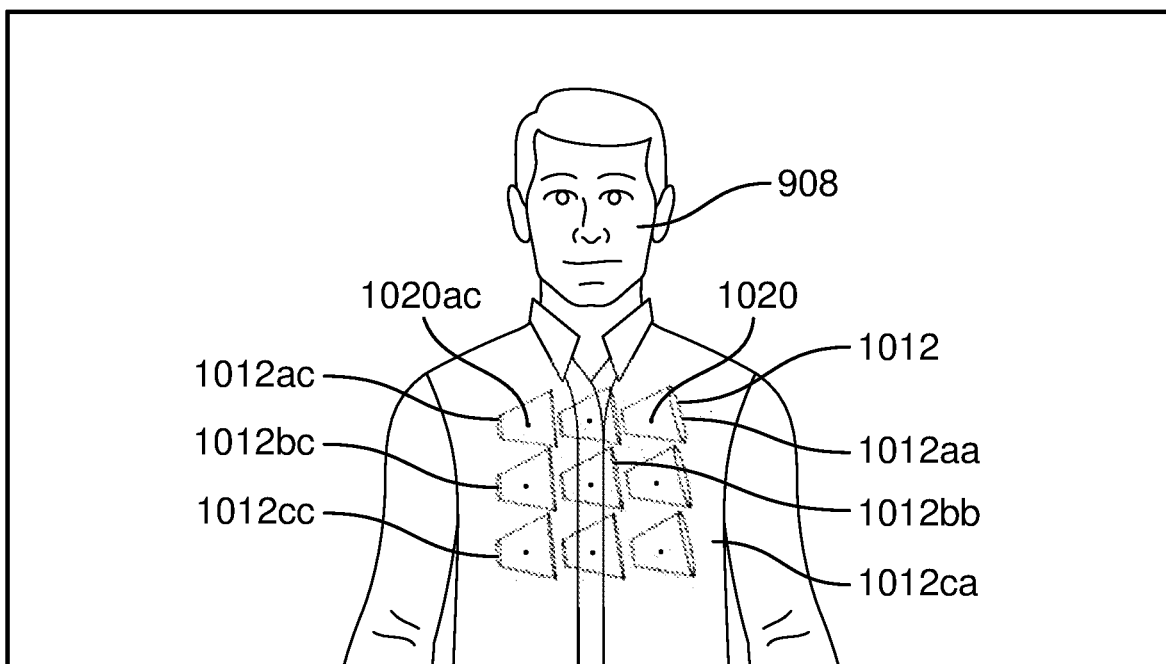
FIG. 10C shows an example of the prioritized capture POV volume of FIG. 9B being projected through the nine camera positions onto the scene depth map of FIG. 10B.
Figure 10D:
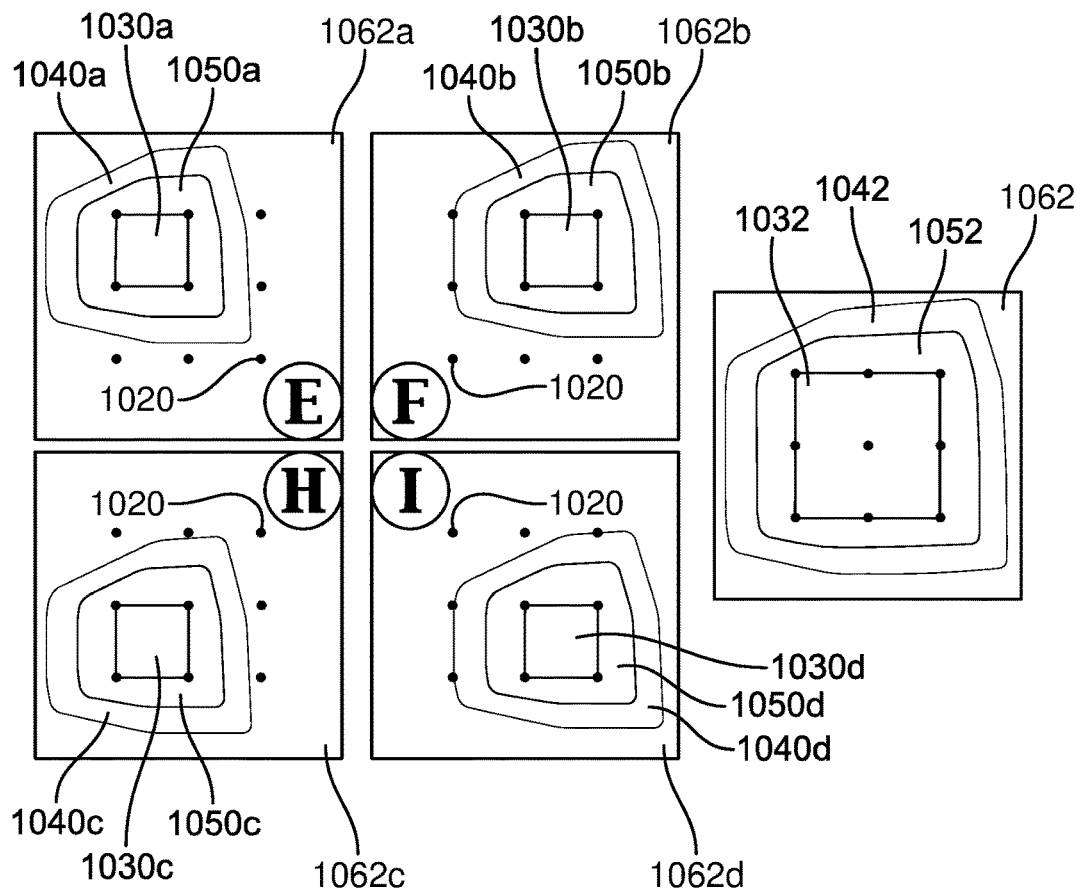
FIG. 10D illustrates various projections of the capture POV volume of FIG. 9B through each of four interpolation regions included in a camera region, their respective interpolation region scene points, and various combined camera scene points.

As noted previously, the interpolation region scene points 820 for an interpolation region correspond to a projection of a capture POV volume for the capture POV data 816 onto a depth map, much as shown with respect to the example shown in FIG. 9B. To facilitate an understanding of FIG. 10D, FIG. 10B shows an example, as seen from the imaging camera corresponding to the imaging camera position 920bb, in which the POV volume 910 of FIG. 9B has been projected according to a pinhole model through each of the nine imaging camera positions 930a, resulting in nine respective POV volume projections 1010 onto the depth map 908 (shown as the fourth participant 906), including POV volume projections 1010aa, 1010ac, 1010bb, 1010bc, 1010ca, and 1010cc through respective imaging camera positions 920aa, 920ac, 920bb, 920bc, 920ca, and 920cc. FIG. 10C shows a similar example in which the prioritized POV volume 912 of FIG. 9B has been projected through each of the nine imaging camera positions 930a, resulting in nine respective prioritized POV volume projections 1012 onto the depth map 908, including prioritized POV volume projections 1012aa, 1012ac, 1012bb, 1012bc, 1012ca, and 1012cc through respective imaging camera positions 920aa, 920ac, 920bb, 920bc, 920ca, and 920cc. As can be seen in FIGS. 10B and 10C, each prioritized POV volume projection 1012 is smaller than its counterpart POV volume projection 1010 (and accordingly projects onto a smaller number or area of scene points), and the nine prioritized POV volume projections 1012 have a lateral extent 1016 that is smaller than the lateral extent 1014 of the nine POV volume projections 1010. For reference, POV projections 1020 of the POV 914 through each imaging camera position 930a are shown in FIGS. 10B and 10C, including a POV projection 1020ac through the imaging camera position 920ac. It is understood that each POV volume projection 1010 is shown as an outline, but covers the region within its outline.

Extending the examples seen in FIGS. 10B and 10C, FIG. 10D shows, again as seen from the imaging camera corresponding to the imaging camera position 920bb, the full projections of the POV volume 910, the prioritized POV volume 912, and the POV 914 through the full area of each of the interpolation regions 940 labeled "E", "F", "H", and "I". The POV projections 1020 of the POV 914 through each imaging camera position 930a are again shown for reference. A first view 1060a shows, as correspond to projections through the interpolation region 940 labeled "E", interpolation scene points 1030a for the POV 914, interpolation scene points 1040a for the POV volume 910, and interpolation scene points 1050a for the prioritized POV volume 912. A second view 1060a shows, as correspond to projections through the interpolation region 940 labeled "F", interpolation scene points 1030b for the POV 914, interpolation scene points 1040b for the POV volume 910, and interpolation scene points 1050b for the prioritized POV volume 912. A third view 1060c shows, as correspond to projections through the interpolation region 940 labeled "H", interpolation scene points 1030c for the POV 914, interpolation scene points 1040c for the POV volume 910, and interpolation scene points 1050c for the prioritized POV volume 912. A fourth view 1060d shows, as correspond to projections through the interpolation region 940 labeled "I", interpolation scene points 1030d for the POV 914, interpolation scene points 1040d for the POV volume 910, and interpolation scene points 1050d for the prioritized POV volume 912. The interpolation scene points 1050a, 1050b, 1050c, and 1050d may be referred to as prioritized interpolation scene points. This illustrates an example approach and results for identification of interpolation region scene points 820 by the interpolation region scene point identifier 812.

Returning to FIG. 10A, camera scene points for an imaging camera may be identified by simply combining the interpolation scene points for all of the interpolation regions (which may be referred to as a "camera region" for the imaging camera) that require a contribution of image data from the imaging camera. By way of example, FIG. 10A shows a first camera region 942ac, consisting of the interpolation regions 940 labeled "A", "B", "D", and "E", for the imaging camera position 920ac. For producing a rendered image, image data is not required from the imaging camera corresponding to the imaging camera position 920ac outside of the image data needed for the first camera region 942ac. Similarly, FIG. 10A shows a second camera region 942ab, consisting of the interpolation regions 940 labeled "B", "C", "E", and "F", for the imaging camera position 920ab; a third camera region 942bc, consisting of the interpolation regions 940 labeled "D", "E", "G", and "H", for the imaging camera position 920bc; and a fourth camera region 942bb, consisting of the interpolation regions 940 labeled "E", "F", "H", and "I", for the imaging camera position 920bb.

Returning to FIG. 10D, a fifth view 1062 shows camera scene points for the imaging camera corresponding to the camera position 920bb, as determined by combining the interpolation scene points for the interpolation regions 940 labeled "E", "F", "H", and "I" shown in the respective views 1060a, 1060b, 1060c, and 1060d. The fifth view 1062 shows camera scene points 1032 for the POV 914 (corresponding to a combination of the interpolation region scene points 1030a, 1030b, 1030c, and 1030d), for which image data would be needed to render for the single POV 914. The fifth view 1062 also shows camera scene points 1042 for the POV volume 910 (corresponding to a combination of the interpolation region scene points 1040a, 1040b, 1040c, and 1040d), for which image data would be needed to render from any POV within the POV volume 910. The fifth view 1062 also shows camera scene points 1052 for the prioritized POV volume 912 (corresponding to a combination of the interpolation region scene points 1050a, 1050b, 1050c, and 1050d), for which image data would be needed to render from any POV within the prioritized POV volume 912.

Figure 10E:
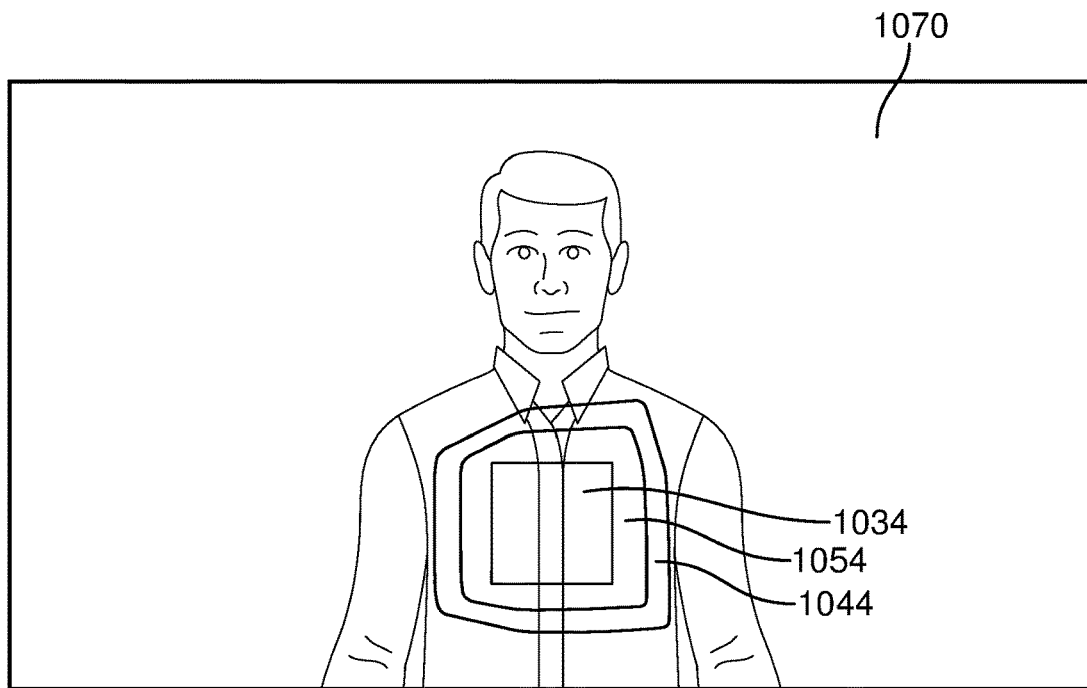
FIG. 10E shows various POV field of view (FOV) regions corresponding to the camera scene points of FIG. 10D in relation to an entire FOV for an imaging camera.

FIG. 10E shows, for the imaging camera corresponding to the imaging camera position 920bb and in relation to an entire FOV 1070 of the imaging camera, POV FOV regions corresponding to the camera scene points shown in FIG. 10D. As the fifth view 1062 of FIG. 10D shows the camera scene points 1032, 1042, 1052 from the position of the imaging camera, POV FOV regions 1034, 1044, and 1054 have the same shapes, relative sizes, and relative positioning as respective camera scene points 1032, 1042, and 1052 in FIG. 10D. In this particular example, the area of the POV FOV region 1044 for the full POV volume 910 is about 3.3× the area of the POV FOV region 1034 for the single POV 914. Although this is a significant increase in area, with a corresponding increase in image data for transmission, it offers a profound benefit: the ability to produce a pixel-perfect light field rendering from any POV within the POV volume 910, which is a substantial visual improvement over techniques involving warping an image rendered for an incorrectly estimated rendering POV. Additionally, the POV FOV region 1044 is only about 7.3% of the entire FOV 1070 of the imaging camera, and is a highly targeted selection of the entire FOV 1070 that is not a result of guesswork or a simple dilation of the POV FOV region 1034. Instead, various aspects of the shape, size, and/or orientation of the POV volume 910 can be adjusted based on observed conditions in real-time, enabling highly selective transmission of image data for a robust range of POVs that reflect actual conditions. Additionally, POV volumes for multiple virtual cameras, such as having two virtual cameras corresponding to a participant's eyes for stereoscopic viewing and/or for multiple participants, each reflecting conditions associated with a respective virtual camera, can be easily combined into a single POV volume for processing. Additionally, in this example, the area of the prioritized POV FOV region 1054 is about 2.2× the area of the POV FOV region 1034. If the prioritized POV FOV region 1054 often includes the actual POV used for rendering, full performance may be obtained even during periods of reduced network capacity.

By first identifying interpolation region scene points and then identifying camera scene points combining the interpolation region scene points relevant to an imaging camera, potentially expensive operations involved in identifying scene points can be minimized and not repeated unnecessarily, thereby facilitating meeting real-time processing targets with reduced processing resources. For example, directly identifying the camera scene points for the imaging camera positions 920ab, 920ac, 920bb, and 920bc would result in projecting a POV volume for the interpolation region 940 labeled "E" four times—once for each imaging camera. By first identifying scene points and then determining per-camera POV FOV regions based on the scene points, potentially expensive operations involved in identifying scene points can be minimized and not repeated unnecessarily. A step of converting three dimension scene point positions to POV FOV regions can be performed with simple matrix operations.

Returning to the discussion of FIG. 8, in some implementations, the camera module 340ba may include a capture region identifier 834 configured to, based on at least the POV FOV regions 830, identify camera capture regions 838 for the imaging cameras 840 based on at least the POV FOV regions 830. The camera capture regions 838 identify which pixels are to be obtained from the imaging cameras 302. In some examples, the capture region identifier 834 is configured to receive additional FOV region data 836 and, based on the additional FOV region data 836, add additional FOV area to, or otherwise modify, the POV FOV regions 830 for one or more of the imaging cameras 302. For example, for the purpose of performing stereoscopic depth estimation, additional FOV region data 836 may be received via the light field camera controller bus 804 requesting a large FOV be captured by a specified imaging camera 302. As another example, additional FOV region data 836 may be received via the camera module array bus 806 from a camera module to ensure a particular FOV region is captured to make particular image data 864 available to the camera module. As an additional example, an image flow detector 858 may provide additional FOV region data 836 to ensure that an additional FOV region is captured for detecting image flow. The capture region identifier 834 may be configured to, based on the calibration data 808, map a POV FOV region 830 to a corresponding pixel regions, in order to account for alignment and/or distortion characteristics of each individual imaging camera 302. The resulting camera capture regions 838 may be provided to a imaging camera controller 840 (labeled "camera control" in FIG. 8) for selectively capturing a subset of the pixels available from each imaging camera 302 as a current image data 842. The current image data 842 may be referred to as "uncorrected image data" or "raw image data." This enables reductions in image data transfer volume, image data storage space, and amounts of image data being processed by the image processor 844, and corresponding reductions in resource and power needed to meet real-time deadlines. In some implementations, the camera module 340ba does not include the capture region identifier 834 and the imaging camera controller 840 simply obtains and provides full image frames captured by the imaging cameras 302.

The camera module 340ba includes the image processor 844, which is configured to process the current image data 842 to generate and select camera module image data 870 for the current capture period selected based on at least the capture POV data 816. The image processor 846 includes an image corrector 846 (which may be referred to as an image preprocessor) configured to generate, based on the calibration data 808, corrected current image data 852 from the current image data 842 produced by the imaging cameras 302. Corrected image data 852 generated from current image data 842 from a first imaging camera 302 may be referred to as "image data captured by" or "image data obtained from" the first imaging camera 302. The image corrector 846 includes a geometric distortion corrector 848 configured to, based on the calibration data 808, generate rectified undistorted image data with a consistent mapping between angular direction and pixel position, thereby simplifying and improving performance of selecting image data corresponding to desired light rays under real-time performance constraints, including during light field rendering. In some implementations, the image corrector 846 is configured to reproject image data to a common reference plane and a common coordinate space. In some implementations, the geometric distortion corrector 848 is configured to obtain camera-specific geometric distortion correction parameters based on at least the calibration data 808.

The image corrector 846 may include a color corrector 850 configured to, based on camera-specific color response attributes included in the calibration data 808, remap the current image data 842 from device-dependent color spaces of the image cameras 302 to a target color space. In some implementations, the geometric distortion corrector 848 is configured to obtain camera-specific color correction parameters based on at least the calibration data 808. In some implementations, the color corrector 850 is configured to perform color correction based on ambient light color data provided by an ambient light color sensor included in a device including the camera module 340ba, to account for various lighting conditions. In some implementations, to accelerate rendering of the corrected current image data 852, the color corrector 850 is configured to perform color correction based on a color profile provided by the rendering first device, thereby avoiding performing color correction, such as corrections for display color response and/or ambient light color, as part of the very time sensitive rendering process. Since correction targeting a rendering device may result in image data not well suited for use by the camera module 340ba, its camera module array, and/or the light field camera controller (such as, but not limited to, image flow detection and/or stereoscopic depth estimation), the image corrector 848 may configured to generate multiple versions of corrected current image data 852 according to different correction schemes. In some implementations, the image corrector 846 is configured to perform demosaicing of current image data 842 in raw image format. In some implementations, the image corrector 846 is configured to generate interpolated image data for "dead" or "hot" pixels identified by the calibration data 808. The image processor 844 may be configured to temporarily store a portion of the corrected current image data 852 as previous image data 853. For example, the previous image data 853 may be used for image flow detection or other processing supporting image compression, such as intra-frame prediction analysis.

The image processor 844 includes a POV pixel selector 854 configured to select selected current image data 856 corresponding to the POV FOV regions 830 from the corrected current image data 852 for transmission to a rendering device. For example, with reference to FIG. 10E, for a current image data 852 corresponding to the FOV 1070 and the capture POV data 911, the selected current image data 856 would be a portion of the current image data 852 corresponding to the FOV POV region 1044. The POV pixel selector 854 may be configured to also identify prioritized selected current image data 856 corresponding to the prioritized POV FOV regions 832.

In some implementations, the image processor 844 includes an image flow detector 858 configured to, based on the previous image data 853, corrected current image data 852, selected current image data 856, and/or image data 864 obtained from other camera modules, generate image flow data 876 identifying differences identified between various image data portions. In some implementations, the image flow detector 858 is configured to utilize the scene depth data 814 to generate the image flow data 876. For example, a portion of the differences between images captured by two imaging cameras may be predicted by reprojecting image data according to the scene depth data 814. In some implementations, the image processor 844 includes an image compressor 860 configured to, based on at least the selected current image data 856, generate camera module image data 870 for the selected current image data 856 in a compressed image data format.

Various approaches may be used to reduce the computation required to determine and/or select the interpolation region scene points 820, camera scene points 826, POV FOV regions 830, camera capture regions 838, and/or selected current image data 856 for each of the imaging cameras 302 for the capture POV data 816 and the scene depth data 814 for the current capture period. In some implementations, the capture POV data 816 is provided as voxels or voxels are otherwise obtained for the capture POV data 816, and voxel-based determinations of POV FOV regions and/or image data portions are performed. As the scene depth data 814 may have a small number of discrete values or may be divided into a small number of discrete ranges, tables or other values may be precalculated to reduce otherwise extensive geometric calculations into more rapid processing, such as a table lookup of scene points, FOV regions, and/or image data regions corresponding to a current combination of the capture POV data 816 and scene depth data 814. In some implementations, the camera module 340*ba* is configured to select and process the selected current image data 856 in multi-pixel units, such as 16×16 pixel, 32×32 pixel, or 64×64 pixel "tiles." In such implementations, the number of units that have to be identified is substantially reduced in comparison to pixel-level identifications. Additionally, this may further simplify and/or reduce the size of precalculated tables, resulting in a rapid identification of multi-pixel units that are needed for a current combination of the capture POV data 816 and scene depth data 814.

Figure 11A:
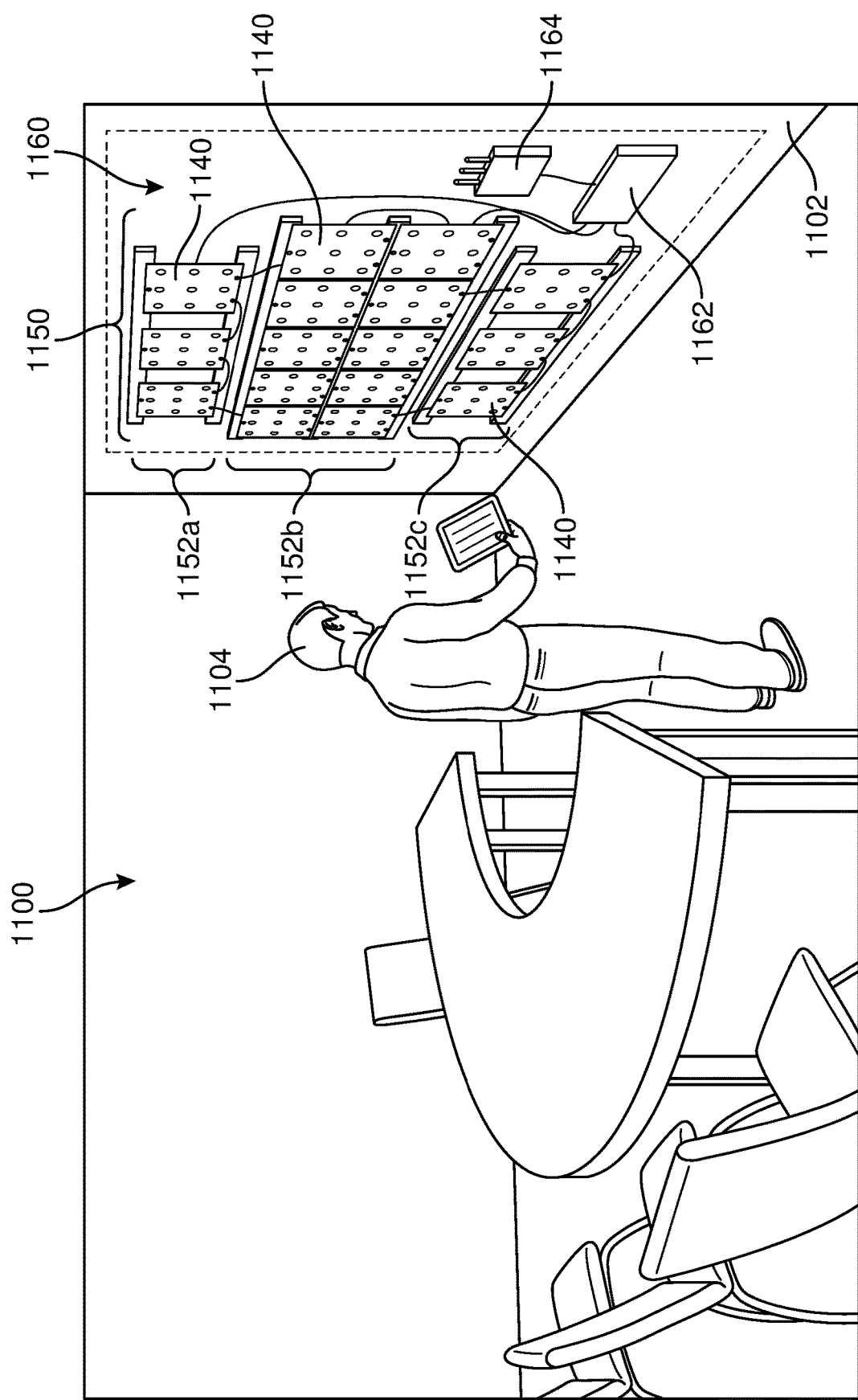
FIG. 11A illustrates an example of camera modules being installed on a wall or other surface and interconnected to provide a large light field camera.

Referring next to FIG. 11A, an example of camera modules being installed on a wall or other surface and interconnected to provide a large light field camera is illustrated. FIG. 11A shows a first environment 1100 in which a technician 1104 is installing and configuring a light field camera 1160 that, in the illustrated example, includes a camera module array 1150 including a plurality of light field camera modules 1140 arranged on and covering a majority of a surface of a wall 1102. The camera modules 1140 and the camera module array 1150 may include any of the aforementioned features, including for example, use of camera modules 1140 having different configurations and/or arranged with varying densities. By way of example, FIG. 11A illustrates a first camera module group 1152*b* having ten camera modules 1140 closely arrayed in two rows and five columns, similar to the arrangement of camera modules 340 in FIG. 5D. The first camera module group 1152*b* spans a range of heights expected for standing participants, in order to capture detailed facial image data. The camera module array 1150 also includes a second camera module group 1152*a* and a third camera module group 1152*c*, each including three camera modules 1140 sparsely aligned in respective rows. This results in a sparser arrangement of imaging cameras in the areas covered by the second camera module group 1152*a* and third camera module group 1152*c*, resulting in larger interpolation regions for these imaging cameras for regions expected to capture less significant details of the first environment 1100. As noted previously, the camera modules 1140 are included in a camera module array 1150, which includes both camera module array bus connections between various camera modules 1140 as well as light field camera controller bus connections with a light field camera controller included in a telepresence device controller 1162, shown in FIG. 11A mounted on the wall 1102. In addition to being communicatively coupled to the camera module array 1150 the telepresence device controller 1162 is also communicatively coupled to a wireless transceiver 1164. The wireless transceiver 1164 is configured to provide wireless data connections and communications between the telepresence device controller 1162 and head-mounted displays, which will be discussed in more detail in connection with FIG. 11B.

Figure 11B:
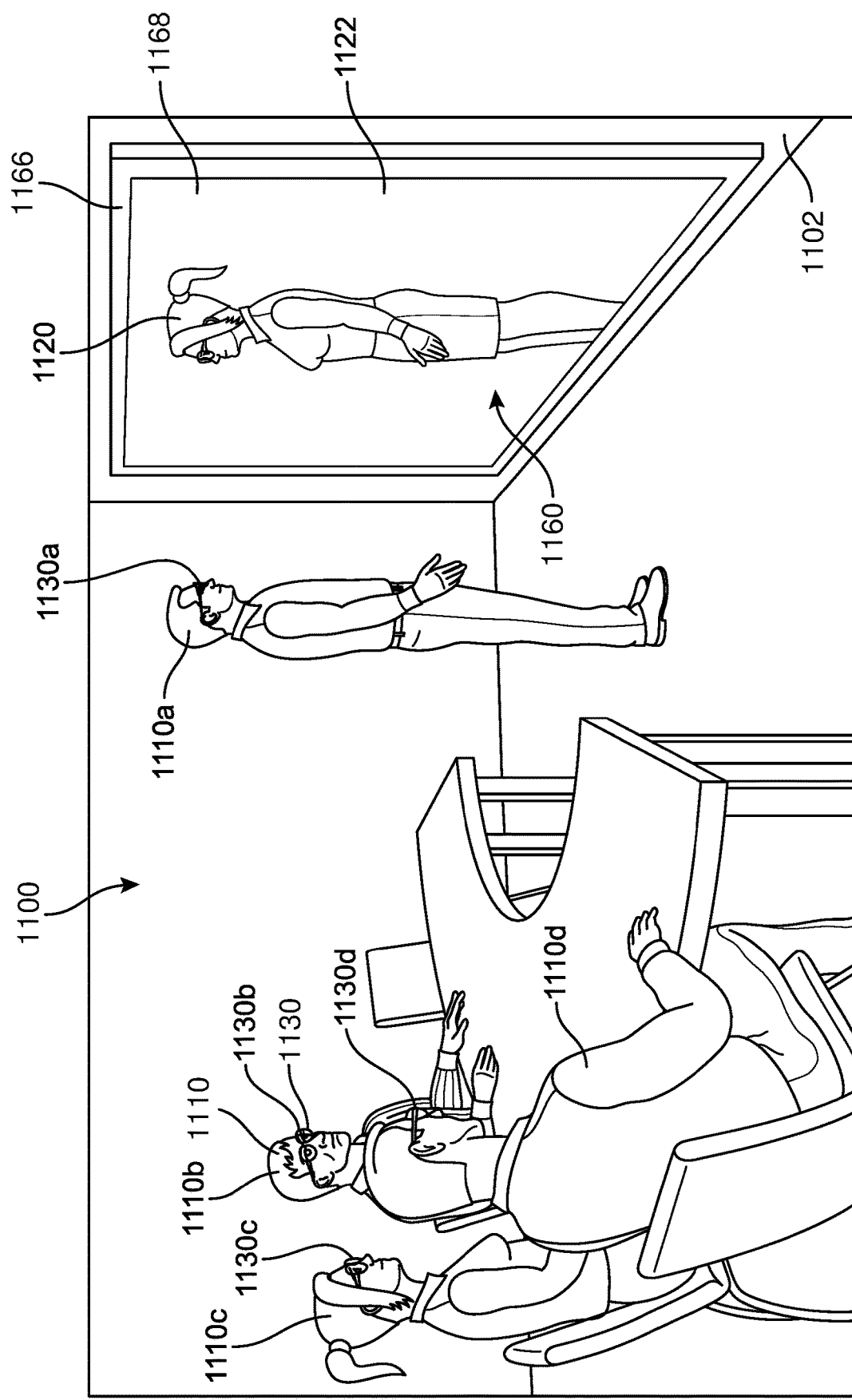
FIG. 11B illustrates an example use of the resulting light field camera in a telepresence conferencing session.

FIG. 11B shows the light field camera 1160 in a fully assembled form or state, including a frame or enclosure 1166 surrounding the camera module array 1150, telepresence device controller 1162, and wireless transceiver 1164 and a panel or covering 1168 through which the imaging cameras included in the camera module array 1150 can capture images of the first environment 1100. This form of enclosure for the light field camera 1160 is merely shown as an example; in other implementations, one or more display devices may be positioned in front of the camera module array 1150, allowing current display and image capture similar to the embodiment shown in FIG. 1B. For example, one or more large transparent OLED display panels may be placed in front of some or all of the camera module array 1150.

It is noted that in the particular example shown in FIG. 11B, although an image of a fifth participant 1120 in a second environment 1122 has been illustrated to appear to be located at about the camera module array 1150 and/or the panel or covering 1168, the panel or covering 1168 itself is not presenting such an image in this example. Instead, this image is representative of rendered images of the fifth participant 1120 and the second environment 1122 seen by sixth participants 1110*a*, 1110*b*, 1110*c*, and 1110*d* (who may be referred to as sixth participants 1110) via respective head-mounted displays 1130*a*, 1130*b*, 1130*c*, and 1130*d* (which may be referred to as head-mounted displays or HMDs 1130), which as noted in FIG. 11A, are configured to communicate with the telepresence device controller 1162 via the wireless transceiver 1164. In some implementations, a rendering surface corresponding to the panel or covering 1168 (for example, having a shape, dimensions, and/or pose based on the actual features of the panel or covering 1168) is used for purposes of image capture, selection, and/or rendering, much as described with respect to other rendering surfaces in this disclosure. The HMDs 1130 may be embodied as virtual-reality (VR), augmented reality (AR), and/or mixed reality (MR) devices. For example, an AR-based HMD 1130 with a see-through display device permits a sixth participant 1110 to both see items in the first environment 1100 through the display device as it displays rendered images of the fifth participant 1120 and the second environment 1122. In some implementations, the panel or covering 1168 may have a dark and/or neutral color that improves the visibility of images viewed through a see-through display device. Also, the HMDs 1130 are configured to present separate images to the left and right eyes of a sixth participant 1110, providing a stereoscopic light field rendering to each of the sixth participants 1110, further enhancing a sense of the fifth participant 1120 being present. For each of the eyes of the sixth participants 1110, a separate virtual camera position is tracked and predicted by the telepresence device controller 1162, much as previously described. This can include generating respective POV volumes based on estimated positions for the virtual cameras. In view of the large area occupied by the light field camera 1160 and use of that area to depict remote participants, the light field camera 1160 may be referred to as a "telewall."

In some implementations, to facilitate tracking the motion and/or position of the HMDs 1130 and the aforementioned virtual cameras, the HMDs 1130 may include motion sensors, such as accelerometers, gyroscopes, and/or magnetometers and be configured to provide motion data derived from measurements provided by the motion sensors. In some implementations, the telepresence device controller 1162 performs real-time light field rendering for all of the HMDs 1130, including late-stage reprojection performed on rendered images to make final adjustments before being displayed. In some implementations, a portion of the light field rendering may be performed by an HMD 1130. For example, an HMD 1130 may be configured to receive compressed or uncompressed image data and select and process appropriate portions for light field rendering done by the HMD 1130. In some implementations, an HMD 1130 may be configured to perform the aforementioned late stage reprojection of rendered images produced by and received from the telepresence device controller 1162.

Figure 12:
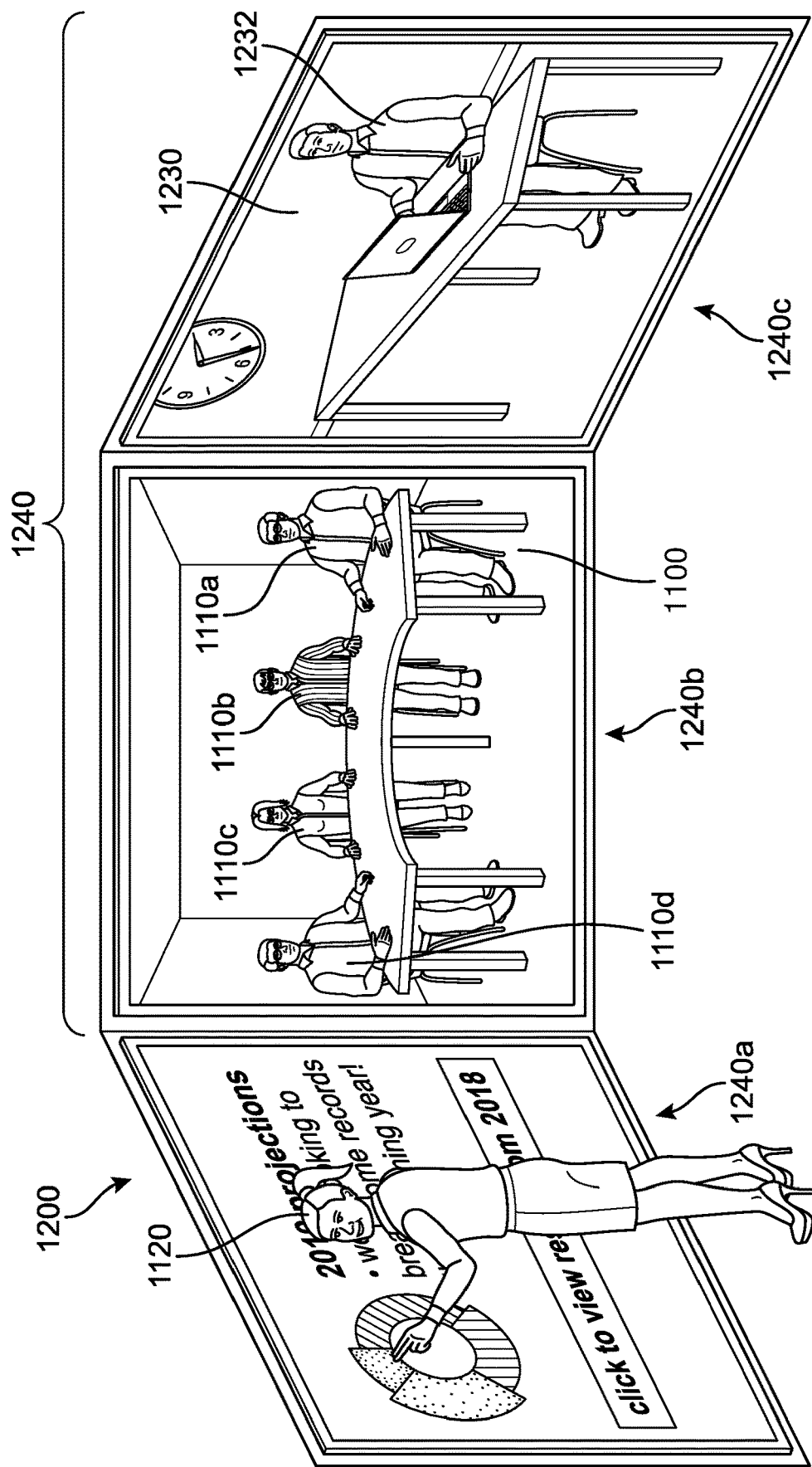
FIG. 12 illustrates an example immersive environment with camera modules installed on a concave surface.

FIG. 12 illustrates an example immersive environment 1200 with light field camera modules installed on a concave surface 1240 comprising a first wall 1240*b* and a second wall 1240*c* upon which the camera modules have been arranged and integrated, similar to the example shown in FIGS. 11A and 11B. In some implementations, these camera modules may be included in one or more light field cameras. In this example, the fifth participant 1120 seen in FIG. 11B is shown interacting with the sixth participants 1110 in their first environment 1100, also shown in FIG. 11B via the first wall 1240*b*. For example, the first wall 1240*a* may provide a display surface or the fifth participant 1120 may make use of an HMD as described in FIG. 11B. In addition, and as part of a same conferencing session, a seventh participant 1232 and a third environment 1230 are presented via the second wall 1240*c*. In some implementations, the concave surface 1240 may be dynamically subdivided into multiple interaction regions. For example, if an additional participant were to join the teleconferencing session shown in FIG. 12, the second wall 1240*c* may be divided into a first portion for the second participant 1232 and a second portion for the newly arriving participant. For each of the sixth participants 1110 and the seventh participant 1232, respective POV data is provided to identify, select, and transmit image data collected by the camera modules for rendering and display to each of the participants.

To further enhance a sense of realism provided by the telepresence systems discussed herein, high-resolution displays (for example, at 4K, 8K, or other resolutions) and high-resolution imaging cameras may be employed. In order to render accurate and consistent images, a high degree of accuracy and precision for correctly selecting light rays from the image data obtained from the image cameras is desired. For example, with imaging cameras collecting 1080p images with a vertical FOV of 90 degrees, approximately milliradian accuracy is required for pixel-level selections of light rays for light field rendering. Additionally, due to a high number of imaging cameras (for example, with hundreds or thousands of individual imaging cameras) being included in a light field camera, reductions in the cost of the imaging cameras can have a profound effect on the expense of producing a light field camera. Significant cost reductions can be obtained by using plastic instead of glass for lens elements. However, there are various drawbacks with plastic lenses such as, but not limited to, poorer manufacturing tolerances, greater changes in optical characteristics and distortion due to changes in temperature, and changes not experienced with glass in optical characteristics and distortion due to absorption of water vapor from the atmosphere (although this can be addressed to a significant degree with lens coatings and/or selecting plastics that have a lower coefficient of moisture expansion).

Figure 13B:
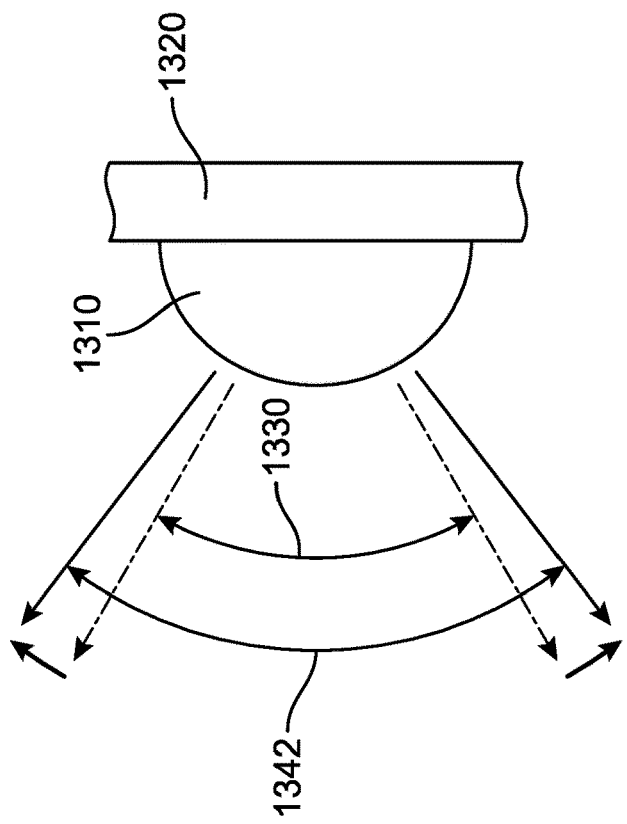
FIGS. 13A and 13B illustrate example effects of temperature changes on optical distortion for an imaging camera.
Figure 13A:
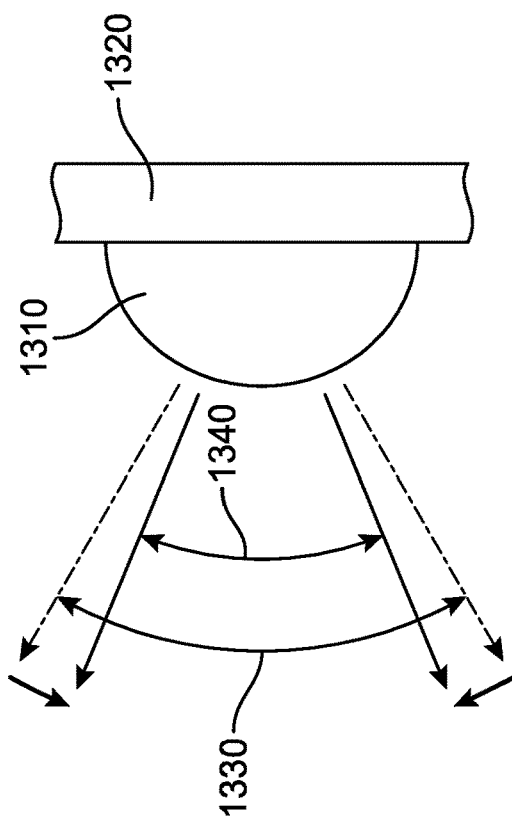

FIGS. 13A and 13B illustrate some of the changes in optical characteristics resulting from changes in temperature, such as due to changes in an environmental temperature and/or heat generated by electronic components included in a light field camera. FIG. 13A illustrates an imaging camera 1310 mounted on a substrate 1320, as previously described with respect to the aforementioned light field camera modules. FIG. 13A also illustrates a first vertical FOV 1330 for a first temperature, such as 25° C. In FIG. 13A the imaging camera 1310 is shown at a second temperature greater than the first temperature. Expansion of lens materials due to this increase in temperature result in an increase of the focal length of the imaging camera 1310 and a corresponding decrease in the vertical FOV to a second FOV 1340. FIG. 13B illustrates the same imaging camera 1310, but at a third temperature that is lower than the first temperature. As a result, the lens materials have contracted, a focal length of the imaging camera 1310 has decreased, and the vertical FOV of the imaging camera 1310 has increased to a third FOV 1342. The changes in focal length shown in FIGS. 13A and 13B interfere with accurately mapping between angular positions and pixel positions. For example, for an optical lens made with the plastic ZEONEX 480R, a change in temperature by 55° C. changes the focal length by about 1.5% which would result in a shift of approximately 15 pixels for a peripheral angle captured by an HD resolution imaging camera. A further complication is that the changes in optical characteristics and distortion resulting from temperature changes may not be symmetric. For example, the change might be more pronounced in a lateral direction than a longitudinal direction, or there may be astigmatic and/or non-linear changes in distortion that differ from one imaging camera to another. Further, in addition to the above changes in optical parameters, there may also be temperature-related changes in imager performance, such as changes in gain, bias, noise, and/or color response that may vary from one imaging camera to another.

FIGS. 14A and 14B illustrate a portion of an example camera module 1400 including a first imaging camera 1410 and a second imaging camera 1412 mounted on a substrate 1430 and at an initial position and orientation. In FIGS. 14A and 14B, the first imaging camera 1410 has a first optical center 1420 at a first initial position 1440*a*, and the second imaging camera 1412 has a second optical center 1422 at a second initial position 1442*a*. For purposes of discussion, in FIGS. 14A and 14B the substrate 1430 is initially flat and parallel to axes 1492 and 1494 of a world coordinate space 1490 (for example, a frame coordinate space or a module array coordinate space, as seen in FIG. 5D).

FIGS. 14C, 14C, 14D, and 14E illustrate examples in which changes have occurred to the positioning and/or orientation of the substrate 1430, such as due to temperature effects, mechanical shock, and/or vibration, and as a result the first imaging camera 1410 and/or the second imaging camera 1412 have deviated from their initial positions and/or initial orientations shown in FIGS. 14A and 14B. FIG. 14C illustrates an example in which an end of the substrate 1430 has moved a distance 1432 in the direction of the axis 1494. Associated with this, a portion of the substrate at which the first imaging camera 1410 is attached has moved a distance 1450 in the direction of the axis 1494 and the first imaging camera 1410 has translated the same distance 1450 in the direction of the axis 1494 from the first initial position 1440*a* to a third position 1440*c*. Also, another portion of the substrate at which the second imaging camera 1412 is attached has moved a distance 1452 in the direction of the axis 1494 and the second imaging camera 1412 has translated the same distance 1452 in the direction of the axis 1494 from the second initial position 1442*a* to a fourth position 1442*c*. In some examples, the positions of the imaging cameras 1410 and 1412 may at the same time have translations in positions in the direction of the axis 1402. The changes shown in FIG. 14C may occur, for example, due to a fastener failing to secure the camera module 1400 at a fixed position and allowing the camera module 1400 to slip and/or shift to a new position, or may occur due to a supporting frame (not shown) for the camera module 1400 failing to remain rigid. In some examples, this may occur in part due to a change in temperature and a corresponding expansion or contraction of the substrate 1430 and/or the frame to which the camera module 1400 is attached.

FIG. 14D illustrates an example in which the substrate 1430, or a portion thereof, has changed from an initial orientation 1468a, parallel to the axis 1494, by a first angle 1454 (in terms of rotation about the axis 1492) to a new orientation 1468d, resulting in the first imaging camera 1410 changing from a first initial orientation 1460a by a second angle 1464 to a third orientation 1460d, and the second imaging camera 1412 changing from a second initial orientation 1462a by a third angle 1466 to a fourth orientation 1462d. If the substrate has maintained its initial flatness, the angles 1454, 1464, and 1466 are equal or approximately equal. Also as a result of the change in orientation of the substrate 1430, the first imaging camera 1410 has translated from the first initial position 1440a to a fifth position 1440d (including a translation of a distance 1456 in the direction of the axis 1496), and the second imaging camera 1412 has translated from the second initial position 1442a to a sixth position 1442d (including a translation of a distance 1458 in the direction of the axis 1496). The changes shown in FIG. 14D may occur, for example, due to a fastener failing to secure the camera module 1400 in a fixed orientation, or may occur due to a supporting frame for the camera module 1400 failing to remain rigid. In some examples, this may occur in part due to a change in temperature and a corresponding expansion or contraction of the frame to which the camera module 1400 is attached.

FIG. 14E illustrates an example in which bowing, twisting, or other warping has changed a flatness of the substrate 1430. As a result of this warping, the first imaging camera 1410 changed from the first initial orientation 1460a by a fourth angle 1470 to a fifth orientation 1460e, and the second imaging camera 1412 changed from the second initial orientation 1462a by a fifth angle 1472 to a sixth orientation 1462e. Also as a result of the warping of the substrate 1430, the first imaging camera 1410 has translated from the first initial position 1440a to a seventh position 1440e (including a translation of a distance 1474 in the direction of the axis 1496), and the second imaging camera 1412 has translated from the second initial position 1442a to an eighth position 1442e (including a translation of a distance 1476 in the direction of the axis 1496). As is often the case with warping of the substrate 1430, in the example shown in FIG. 11E, the angles 1470 and 1472 are different and the distances 1474 and 1476 are different, reflecting different movements of the portions of the substrate 1430 at which the imaging cameras 1410 and 1412 are attached.

Warping and/or characteristics affecting warping may be introduced when manufacturing a substrate; for example, due to variations in materials and/or process variations, or due to design imbalances between layers of the substrate 1430 (for example, in copper layout or dielectric thickness of a PCB substrate). Warping and/or characteristics affecting warping may be introduced during assembly of the camera module 1400; for example, due to heat applied to bake the substrate 1430 for outgassing, and/or thermal shock to the substrate 1430 during wave, reflow, or hand soldering of components onto the substrate 1430 (such as to attach the imaging cameras 1410 and 1412). Warping may be caused or affected by mechanical stress being applied to the substrate 1430 by a fastening system or frame (for example, due to overtightening or undertightening of a fastener, fastening of an initially warped substrate, and/or misalignment of portions of a frame to which the camera module 1400 is attached. The changes shown in FIG. 14E may occur, for example, due to stress and/or strain in and/or being applied to and/or removed from the substrate 1430; for example, loosening of a fastener may result in a reduced mechanical force on the substrate 1430, allowing it to exhibit its intrinsic warpage. In some examples, an amount of warping may vary according to temperature; for example, the camera module 1400 itself may undergo changes in warping as a result of expansion and/or contraction of materials within and/or attached to the substrate 1430, or corresponding expansion or contraction of the frame to which the camera module 1400 is attached may change the mechanical forces applied to the substrate 1430, causing changes in warping.

For the convenience of comparison with FIG. 15B, FIG. 15A again illustrates the view, positions, and orientations of FIG. 14A. FIG. 15B illustrates an example in which the imaging cameras 1410 and 1412 have deviated from their initial orientations and/or positions. In FIG. 15B, the substrate 1430, or a portion thereof, has changed from an initial orientation 1483a, parallel to the axis 1494, by a sixth angle 1484 (in terms of rotation about the axis 1496) to a seventh orientation 1483g, resulting in the first imaging camera 1410 changing from a first initial orientation 1480a by the sixth angle 1484 to an eighth orientation 1480g, and the second imaging camera 1412 changing from a second initial orientation 1482a by the sixth angle 1484 to a ninth orientation 1482g. Also as a result of the change in orientation of the substrate 1430, the first imaging camera 1410 has translated from the first initial position 1440a to a ninth position 1440g (including a translation of a distance 1486 in the direction of the axis 1492), and the second imaging camera 1412 has translated from the second initial position 1442a to a tenth position 1442g (including a translation of a distance 1488 in the direction of the axis 1492). The changes shown in FIG. 14G may occur, for example, due to a fastener failing to secure the camera module 1400 at a fixed position and allowing the camera module 1400 to slip and/or shift to a new orientation, or may occur due to a supporting frame for the camera module 1400 failing to remain rigid. In some examples, this may occur in part due to a change in temperature and a corresponding expansion or contraction of the frame to which the camera module 1400 is attached and a resulting change in mechanical force being applied to the substrate 1430.

Figure 16:
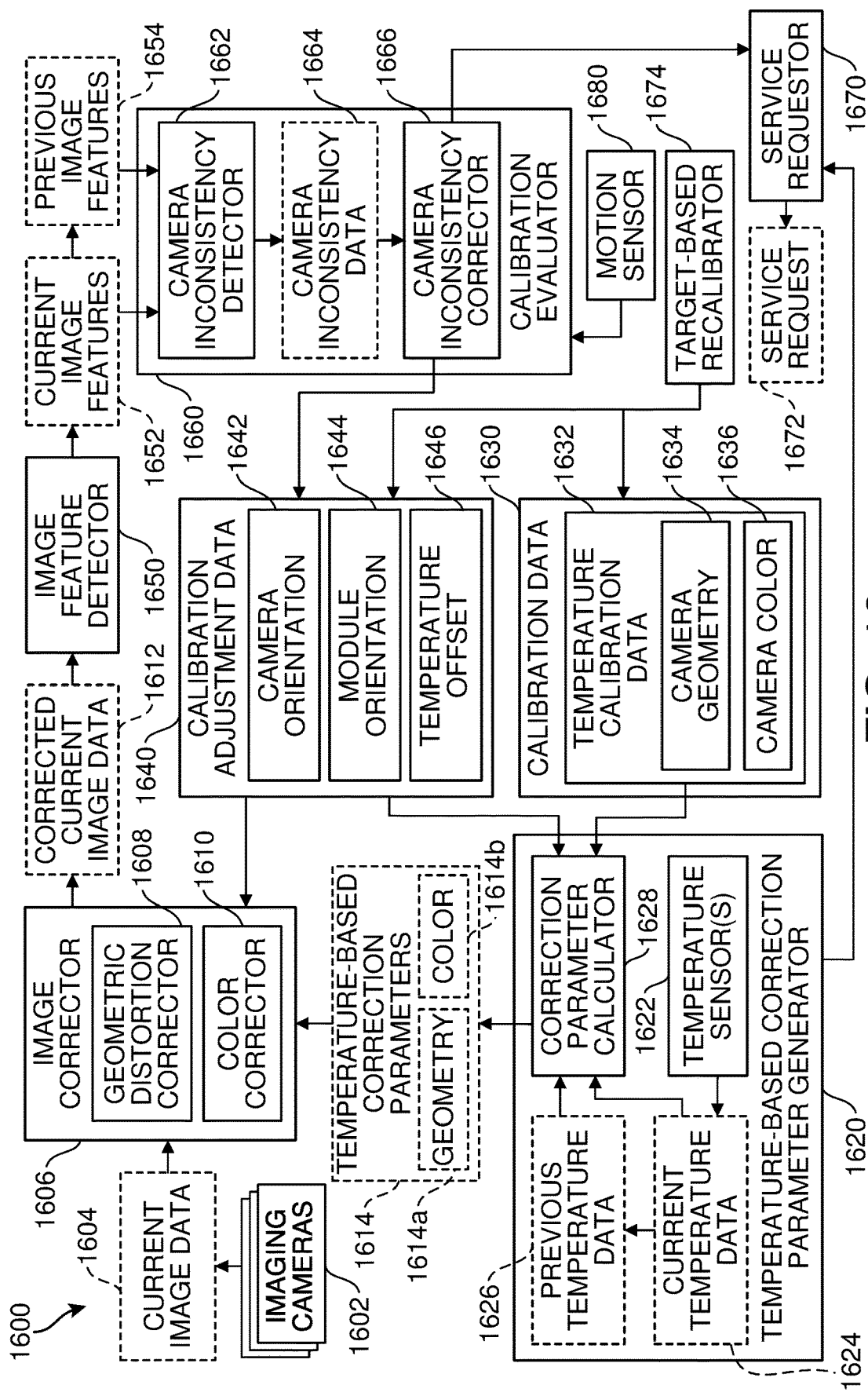
FIG. 16 is a flow chart illustrating an implementation of an example process for detecting and responding to miscalibration of one or more imaging cameras.

FIG. 16 is a block diagram illustrating features of an example light field camera system 1600 ("light field camera" or "light field camera array"). In some implementations, as shown in FIG. 16, the light field camera 1600 is configured to perform temperature-based image correction based on temperature calibration data 1632 and/or automatic detection and resolution of inconsistencies between imaging cameras 1602, such as inconsistencies resulting from changes in camera position and/or orientation as illustrated in FIGS. 14C-14G. Various features are omitted in FIG. 16 for purposes of discussion. Any of the features described in other portions of this disclosure may be included in the light field camera 1600. Additionally, any of the features discussed for FIG. 16 may be used in combination with the other examples of light field cameras and light field camera modules described herein.

As described for previous examples, the light field camera 1600 includes a plurality of imaging cameras 1602 used to capture and provide image data for light field rendering, including current image data 1604 for a camera capture period. The light field camera 1600 also includes an image corrector 1606 configured to perform various image correction operations on the current image data 1604 to generate corresponding corrected current image data 1612 based on calibration data 1630 for the light field camera 1632 and/or calibration adjustment data 1640 (discussed in detail below). The image corrector 1606 includes a geometric distortion corrector 1608 and/or a color corrector 1610. Much as noted above, the image corrector 1606 may be configured to perform any of the operations described in connection with the image corrector 846 of FIG. 8.

In the example shown in FIG. 16, the light field camera 1600 is configured to perform temperature-based corrections and includes a temperature-based correction parameter generator 1620 configured to generate temperature-based correction parameters 1614 used by the image corrector 1606 to generate corrected current image data 1612 that corrects changes to the current image data 1604 associated with temperature. The temperature-based correction parameter generator 1620 includes one or more temperature sensors 1622 configured to provide temperature measurements used to generate respective current temperature data 1624. In some implementations, previous temperature data 1626 may be generated from the current temperature data 1624 for later use. In some implementations with imaging cameras 1602 included in multiple camera modules, camera modules may each include one or more temperature sensors 1622 to provide temperature measurements localized to a camera module. Additionally, where camera modules are individually characterized and calibrated, temperature calibration data 1632 for a camera module may be directly correlated with the measurements provided by the temperature sensors 1622 included in the camera module.

The temperature-based correction parameter generator 1620 includes a correction parameter calculator 1628 configured to, based on at least the current temperature data 1624, select corresponding portions of the temperature calibration data 1632 and calculate temperature-based correction parameters 1614 for the current temperature data 1624 based on the selected temperature calibration data 1632. Techniques for generating and applying temperature-based correction parameters are described in U.S. Patent Application Publication Number 2005/0117034 (published on Jun. 2, 2005 and entitled "Temperature Compensation in Multi-Camera Photographic Devices"), which is incorporated by reference herein in its entirety. An additional difficulty with plastic lenses is that due to low thermal diffusivity of plastic materials, plastic lenses are slow in reaching equilibrium with changes in temperature, and temperature gradients can also occur, further complicating changes in distortion. In some implementations, the correction parameter calculator 1628 is configured to generate temperature-based correction parameters 1614 that correct for the resulting distortion based on a temperature history provided by the previous temperature data 1626 and temperature calibration data 1630 corresponding to that temperature history. In some implementations, the correction parameter calculator 1628 is configured to generate g 1614*a* based on camera geometry temperature calibration data 1634 (for use by the geometric distortion corrector 1608) and/or temperature-based color correction parameters 1614*b* based on camera color temperature calibration data 1636 (for use by the color corrector 1610). The generation and use of the temperature-based correction parameters 1614 is effective, at least in part, in correcting issues described in FIGS. 13A-15B caused by changes in temperature.

A standalone calibration of a camera module can be performed to characterize the combined optical effects of the issues described in connection with FIGS. 13A and 13B, at least a portion of the issues described in connection with FIGS. 14A-15B, manufacturing-related variations between individual imaging cameras included in the camera module (such as variations in lens elements, semiconductor imagers, and relative positioning of lens elements, imagers, and/or imaging camera packages), manufacturing-related variations between camera modules (such as variations in position and/or orientation of imaging cameras relative to a substrate on which they are mounted and/or each other (see, for example, FIGS. 4A-4C), dimensional variations between camera modules, and/or bow and/or twist in the substrate) and produce corresponding calibration data 1632 used to transform image data provided by each imaging camera 1302 into corrected image data 1612.

In some examples, characterization and calibration of a camera module is performed with the camera module mounted on a fixture configured to impart similar mechanical stresses on the camera module as when it is incorporated into a camera module array; for example, if a camera module is attached using screws or bolts in the assembled device, measurements should be performed applying similar mechanical forces, either by using screws or bolts (with predetermined amounts of torque) to attach the camera module to the fixture or otherwise. Benefits of separate calibration of camera modules prior to their integration into a camera module array include, but are not limited to, testing (to make sure a newly assembled camera module works correctly and its imaging cameras satisfy minimum standards), binning (identifying camera modules with better performance for positions more likely to capture facial features), "burn in" (testing over a range of temperatures and allowing plastic lens materials to fully equilibrate requires a certain amount of time, during which failures of weak components by occur and be detected).

Although the above techniques are generally effective in calibrating the light field camera 1600 and its constituent camera modules for obtaining accurate corrected current image data 1612, the calibration may become no longer fully effective due to use and/or abuse of a device including the light field camera 1600. For example, over time, vibrations experienced by the light field camera 1600 over time can result in fasteners not maintaining one or more camera modules in their initial orientations, even in ordinary use scenarios and/or during transport from a manufacturer to an end user. In more severe circumstances, the device may be dropped or receive some other substantial impact, which may cause deformation of a structure carrying the camera modules (which may change positions of, orientations of, and/or mechanical stress or strain placed on some of the camera modules) and/or shift a portion of the camera modules from their initial mounting positions and orientation. Whatever the underlying cause, such issues can result in calibration data 1630 generated as part of a manufacturer or installer calibration not continuing to provide pixel-level accurate image corrections. This can result in visible reduction in rendered image quality and/or interfere with capture-side image processing, such as stereoscopic depth estimation based on the corrected image data.

The example light field camera 1600 in FIG. 16 is also configured to perform automatic detection and resolution of inconsistencies in corrected image data among the imaging cameras 1602. Such inconsistencies may be a result of, for example, changes in camera position and/or orientation as illustrated in FIGS. 14C-14G. In some examples, such inconsistencies may result from incomplete geometric distortion correction; for example, due to inaccuracies in estimating effects of changes in temperature, or changes in amounts of water absorption by a plastic lens which cause the lens to expand and contract accordingly, resulting in distortions similar to those resulting from changes in temperature as described in connection with FIGS. 13A and 13B. Detection of inconsistencies may be done periodically. In some examples, inconsistencies may be detected as part of other image processing and trigger initiation of a detection process; for example, if stereoscopic depth estimation is performed, image feature correlation issues may serve as a trigger. In some implementations, a trigger may result from determining the light field camera 1600 has experienced a significant amount (for example, more than a predetermined amount) of vibration (for example, magnitude and/or duration), movement, and/or impact (for example, magnitude and/or number of occurrences) based on motion data received from a motion sensor 1680 included in the light field camera 1600.

The light field camera 1600 includes an image feature detector 1650 configured to detect current image features 1652 in the corrected current image data 1612 useful for determining whether the corrected image data 1612 is consistent (provides a consistent view of a scene across time and/or multiple imaging cameras 1602). The image feature detector 1650 may be configured to detect image features (which may be referred to as "local image descriptors", "image descriptors", or "feature descriptors") according to algorithms such as, but not limited to, SIFT (Scale-Invariant Feature Transform), SURF (Speeded Up Robust Features), BRIEF (Binary Robust Independent Elementary Features), ORB (Oriented FAST and rotated BRIEF), or DAISY features. In some implementations, current image features 1652 may be stored temporarily as previous image features 1654.

The light field camera 1600 includes a calibration evaluator 1660 configured to, based on at least the corrected current image data 1612 and/or the current image features 1652, detect inconsistent image data and attempt to correct detected inconsistencies. In some examples, the calibration evaluator 1660 is configured to detect inconsistent image data based on at least the corrected current image data 1612 and/or the current image features for multiple different imaging cameras 1602. The calibration evaluator 1660 includes a camera inconsistency detector 1662 configured to, based on at least the current image features 1652, determine whether there are inconsistencies in the corrected image data 1612. For example, there may be inconsistencies among portions of the current image features 1652 generated from corrected current image data 1612 from multiple different imaging cameras 1602 with overlapping fields of view. In some implementations, the calibration evaluator 1660 is configured to utilize scene depth data (not shown in FIG. 16), such as the scene depth data 814 in FIG. 8, to better determine whether corrected image data 1612 from multiple different imaging cameras 1602 is consistent. For example, the scene depth data may be used to transform positions of image features 1652 and/or 1654 from a first camera space for a first imaging camera 1602 to a second camera space for a second imaging camera 1602. In some implementations, the calibration evaluator 1660 is provided with scene depth data at a higher resolution than used to select the module image data 870. In some implementations, the calibration evaluator 1660 is configured to utilize the previous image features 1654. For example, for a fixed installation or a device that has been determined to have remained stationary (which may be determined, for example, based on motion data from the motion sensor 1680 or location detection), certain previous image features 1654 (for example, corresponding to corners of walls) are expected to remain in fixed positions, and the camera inconsistency detector 1662 may determine there is an inconsistency based on a difference detected between positions of image features in the previous image features 1654 and the current image features 1652.

If the camera inconsistency detector 1662 detects inconsistencies, it provides camera inconsistency data 1664 to a camera inconsistency corrector 1666 included in the calibrator evaluator 1660 and configured to attempt to automatically generate calibration adjustment data 1640 that reduces or eliminates the detected inconsistencies. In some implementations, as shown in FIG. 16, the correction parameter calculator 1628 is configured apply the calibration adjustment data 1640 to adjust correction parameters generated based on the calibration data 1630. In some examples, the calibration adjustment data 1640 includes temperature offset calibration adjustment data 1646 the correction parameter calculator 1628 is configured to change a temperature measurement for a corresponding first imaging camera 1602 indicated by the current temperature data 1624 by a temperature offset indicated by the temperature offset calibration adjustment data 1646 for the first imaging camera 1602, and a focal length correction for the first imaging camera 1602 changes accordingly. In some implementations, the image corrector 1606 is configured to apply the calibration adjustment data 1640 to make corresponding image correction adjustments.

In general, changes in an angular orientation of an imaging camera, such as in the examples of FIGS. 14D, 14E, and 15B, are more likely than translations in position to result in an incorrect mapping between angular positions and pixel positions significant enough to detect, identify, and correct. The camera inconsistency corrector 1666 is configured to, based on the camera inconsistency data 1664, the current image features 1652, and/or the previous image features 1654, identify which imaging cameras 1602 have become inconsistent, determine if the inconsistencies indicate changes in imaging camera orientations, determine whether all of the imaging cameras 1602 included in a single camera module demonstrate the same inconsistencies (suggesting the camera module has changed orientation, as illustrated by FIGS. 14B and 15G), and/or whether an imaging camera has an incorrectly corrected focal length (for example, due to uncorrected water absorption by a lens or temperature data not corresponding to a lens temperature).

Based on this identification and the type of issue it suggests, the camera inconsistency corrector 1666 attempts to generate calibration adjustment data 1640 for one or more of the imaging cameras 1602 that reduces or eliminates the detected inconsistencies. The calibration adjustment data 1640 may be referred to as "correction data." In some examples, in response to a determination that an orientation of a camera module changed, camera module orientation calibration adjustment data 1644 may be created for the camera module; in response to a determination that an orientation of an imaging camera 1602 changed, camera orientation calibration adjustment data 1644 may be created for the imaging camera 1602; and in response to a determination that a focal length is being incorrectly corrected for an imaging camera 1602, temperature offset calibration adjustment data 1646 may be created for the imaging camera 1602 (as the camera geometry temperature calibration data 1634 offers camera-specific corrections associated with expansion or contraction of a lens, whether due to temperature or moisture). It usually is difficult to directly calculate an offsetting adjustment, so the inconsistency corrector 1666 may be configured to iteratively repeat: estimating a type and parameters needed for adjustment, generating corresponding calibration adjustment data 1640, applying the calibration adjustment data 1640 (for example, using the temperature-based correction parameter generator 1620 and/or the image corrector 1606) to generate an updated inconsistency metric, and determining if the updated inconsistency metric satisfies a threshold condition (for example, less than a threshold error value). In some implementations, computer-implemented optimization techniques such as, but not limited to, gradient descent, simulated annealing, evolutionary algorithms, and/or particle swarm optimization, in which multiple different types of adjustments and/or different sets of parameters may be evaluated in each round of iteration towards minimizing an amount of error (such as an estimated error between adjusted corrected image data for an imaging camera or cameras 1602 for which adjustments are being performed and one or more other imaging cameras 1602). In some implementations, amounts of error for individual imaging cameras 1302 and/or groups of imaging cameras 1302 are calculated by the camera inconsistency detector 1662 and included the camera inconsistency data 1664 (in some examples, the amounts of error are used as, or to generate, inconsistency metrics). In some implementations, due to possible inaccuracies in temperature measurements for some imaging cameras 1602 in some conditions (for example, during a time between a device including the light field camera 1600 being powered on and reaching a steady state temperature), focal length error detection and updates to temperature offset calibration adjustment data 1646 may be performed more frequently than detection and updates for camera orientation and/or camera module orientation (which are less like to change).

In some implementations, the inconsistency corrector 1666 is configured to, in response to a failure to generate calibration adjustment data 1640 effective for resolving a detected inconsistency, indicate to a service requestor 1670 included in the light field camera 1600 that a human service action is needed. The service requestor 1670 is configured to, in response to this indication, generate a service request 1672 indicating that a human service action is needed. The service request 1672 may be in a form of, for example, a message displayed by a device including the light field camera 1600 and/or a network-transmitted message. In some examples, to provide useful information for carrying out a service task, the service request 1672 may include information generated based on the camera inconsistency data 1664 and/or by the camera inconsistency corrector 1666. In some implementations, the temperature-based correction parameter generator 1620 is configured to use the service requestor 1670 to generate service requests 1672 to report a detection of excessive temperatures, which may indicate a cooling failure for a camera module. In some implementations, the light field camera 1600 includes a target-based recalibrator 1674, which might be invoked by an installation or service technician, configured to obtain image data from the imaging cameras 1602 of a calibration target arranged in multiple different poses (including various positions and/or orientations), detect image features in the obtained image data, and generate new calibration data 1630 and/or calibration adjustment data 1640 based on at least the detected image features.

It is noted that various features and performance of various operations shown in FIG. 16 may be performed by camera modules such as the example camera module 340ba shown in FIG. 8, or a light field camera controller that coordinates and controls the camera modules. For example, in some implementations, elements 1602-1652 may be included, stored, generated, and/or used (as appropriate) by the camera modules (similar to the features and operations discussed in FIG. 8) and the remaining elements implemented by the light field camera controller. It is also noted that the features described in FIG. 16 may be applied to light field cameras not using a camera module-based approach for imaging cameras; for example, the temperature-based correction may be broadly applied to light field cameras.

Figure 17B:
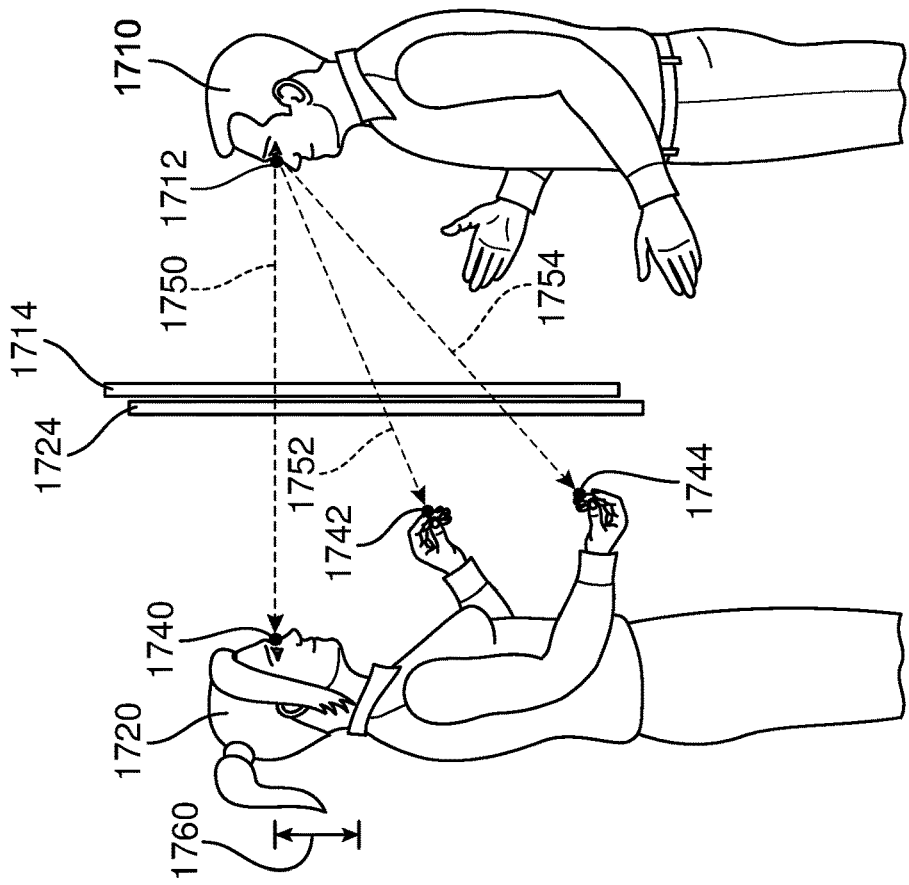
FIG. 17B illustrates an example similar to FIG. 17A, but with the second participant at an increased height.
Figure 17A:
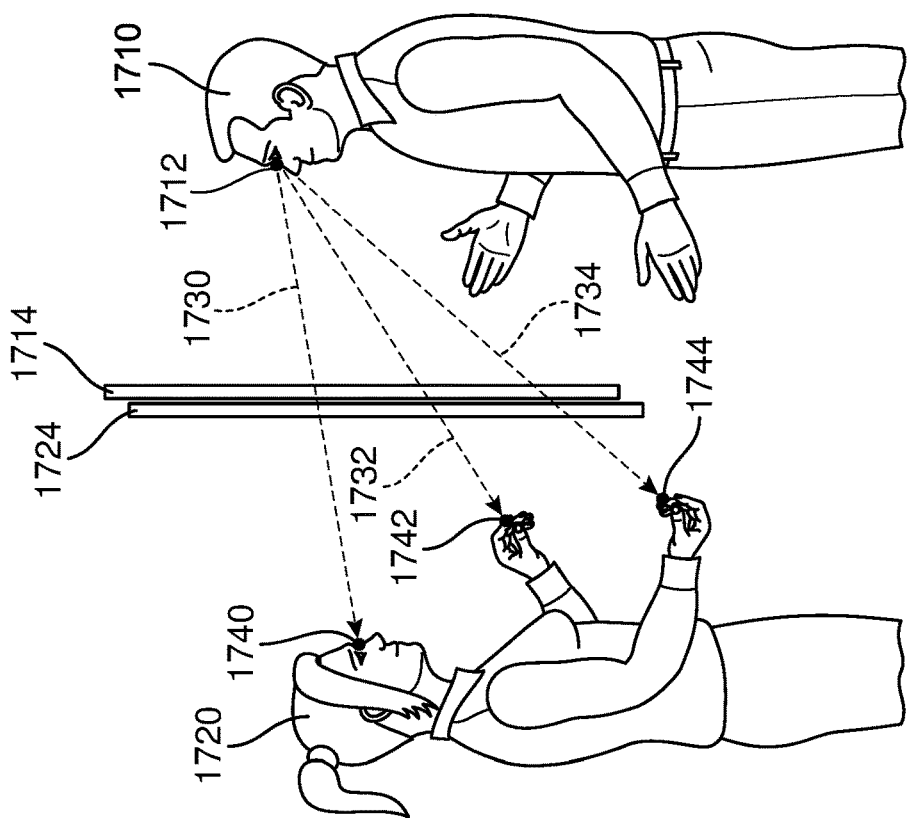
FIG. 17A illustrates an example similar to FIGS. 1C and 1D, with first and second participants conducting a videoconference using first and second telepresence devices.

For purposes of discussion and comparison with FIG. 17B, FIG. 17A illustrates an example similar to FIGS. 1C and 1D, with first and second participants conducting a telepresence session using third and fourth telepresence devices 1714 and 1724. Much as discussed in connection with FIGS. 1C and 1D, the third telepresence device 1714 displays images of a ninth participant 1720, based on image data captured and provided by the fourth device 1724, that (from a POV of an eighth participant 1710) are capable of preserving life-size geometry and providing visual perspective with real-time responsiveness to movement of the eighth participant 1710. Similarly, the fourth telepresence device 1724 displays images of the eighth participant 1710, based on image data captured and provided by the third device 1714, that (from a POV of the ninth participant 1720) are capable of preserving life-size geometry and providing visual perspective with real-time responsiveness to movement of the ninth participant 1720. As in FIGS. 1C and 1D, for purposes of illustration three virtual rays are depicted extending between the eighth participant 1710 and the ninth participant 1720, passing through the two devices 1714 and 1724. For example, a sixth virtual ray 1730 extends between a POV 1712 of the eighth participant 1710 (here, an eye or eyes) and a first region 1740 (here, the eyes) of the ninth participant 1720, a seventh virtual ray 1732 extends between the POV 1712 and a second region 1742 (here, the left hand) of the ninth participant 1720, and an eighth virtual ray 1734 extends between the POV 1712 and a third region 1744 (here, the right hand) of the ninth participant 1720.

Although the third device 1714 and the fourth device 1724 provide a highly engaging and immersive interactive communication experience between the eighth participant 1710 and the ninth participant 1720, there is a difference in height between the eighth participant 1710 and the ninth participant 1720 that even in real-world conversation can diminish a the quality and/or effectiveness of a face-to-face conversation between parties in comparison to a conversation between parties of similar heights. FIG. 17B illustrates an alternative example of the communication session shown in FIG. 17A but in which a height of the ninth participant 1720 has been increased by a distance 1760 such that the eyes of both participants are at approximately the same heights. As a result, a ninth virtual ray 1750 between the POV 1712 and the first region 1740, which corresponds to a line of sight between the two participants 1710 and 1720 is approximately horizontal. This contrasts from the sixth virtual ray 1730, in which the eighth participant 1710 was looking downwards and the ninth participant 1720 was looking upwards, which can create an undesired unconscious dynamic between the two participants 1710 and 1720. Additionally, a tenth virtual ray 1752 from the POV 1712 to the second region 1742 and an eleventh virtual ray 1754 the POV 1712 to the third region 1744 (the second and third regions 1742 and 1744 corresponding to the hands of the ninth participant 1720) are at less steep angles than their counterpart virtual rays 1732 and 1734 in FIG. 17A, placing the hands of the ninth participant 1720 in a more comfortable portion of the FOV of the eighth participant 1710, making gesticulation of the hands of the ninth participant 1720 a more effective part of the interaction. Further, although not illustrated with a virtual ray in FIGS. 17A and 17B, by having the ninth participant 1720 at the greater height shown in FIG. 17B, the hands of the eighth participant 1710 are more likely to remain within the lower region of a display of the fourth device 1724.

FIGS. 18A, 18B, 18C, 18D, 18E, and 18F illustrate examples in which image data selection and image rendering processes are adapted to change an apparent height of the second participant and/or the first participant to better align the eye levels of the first and second participants. In this example, as shown in FIG. 18A, a tenth participant 1810 and a eleventh participant 1820 have the same difference in height illustrated for the participants in FIG. 17A. A fifth device 1814 (similar to the telepresence devices described previously) is positioned is in a pose in which a bottom of a display portion of the fifth device 1814 is at an operating height 1830 ("height") relative to a surface 1832 on which the tenth participant 1810 is standing. In some implementations, the fifth device 1814 is configured to automatically determine the operating height 1830 associated with the pose of the fifth device 1814. For example, the fifth device 1814 may include a dedicated height sensor, such as an ultrasound rangefinder, to measure the operating height 1830. As another example, the fifth device 1814 may be configured to determine the operating height 1830 based on stereoscopic image processing of images captured by the fifth device 1814. A POV 1812 (here, the eyes) of the tenth participant 1810 is an additional distance 1842 above the operating height 1830 as illustrated by a position 1816 on the fifth device 1814. A sixth device 1824 (similar to the telepresence devices described previously) is in a pose in which a bottom of a display portion of the sixth device 1824 at an operating height 1834 relative to a surface 1836 on which the eleventh participant 1820 is standing. A POV 1822 (here, the eyes) of the eleventh participant 1820 is an additional distance 1844 above the operating height 1834 as illustrated by a position 1826 on the sixth device 1824. Additionally, FIG. 18A shows a distance 1846 corresponding to a difference between the eye heights ("vertical eye levels" or "eye levels") of the participants 1810 and 1820. In some implementations, the fifth device 1814 is configured to provide the operating height 1830 to the sixth device 1824, the sixth device 1824 is configured to provide the operating height 1834 to the fifth device 1814, and the fifth device 1814 is configured to adjust the POV 1812 and/or 1822 based on at least a difference between the operating heights 1830 and 1834; as a result, the surfaces 1832 and 1836, both directly and in rendered images 1852 and 1856, appear to be at the same heights, thereby causing the participants 1810 and 1820 to be standing on surfaces 1832 and 1836 at a same level or height. In some examples, such as a portable telepresence device, an operating height may dynamically change during a session.

Continuing the example of FIG. 18A, FIGS. 18B and 18C illustrate the resulting rendered images 1852 and 1856 presented to the respective participants 1810 and 1820. As shown in FIG. 18B, a rendered image 1856 of the tenth participant 1810 is presented on a display surface 1854 of the sixth device 1824. The rendered image 1856 presents the eyes of the tenth participant 1810 at a distance 1862 above the position 1826 corresponding to an eye level of the eleventh participant 1820. As shown in FIG. 18C, a rendered image 1852 of the eleventh participant 1820 is presented on a display surface 1850 of the fifth device 1814 with the eyes of the eleventh participant 1820 being a distance 1860 below the position 1816. As a result, the rendered images 1852 and 1856 fully convey the difference in eye height between the two participants 1810 and 1820, thereby presenting the shortcomings described in connection with FIG. 17A.

In FIGS. 18D-18F, the fifth device 1814 and/or the sixth device 1824 are configured and operating to present rendered images of a participant with approximately the same eye height as a viewing participant, resulting in an experience for the two participants 1810 and 1820 similar to the experience shown in FIG. 17B. For the tenth participant 1810, the eyes of the eleventh participant 1820 will be rendered at approximately a same eye height 1878 as the tenth participant 1810 (in FIG. 18D, the eye height 1878 is shown with respect to the surface 1832, although it may be with respect to the fifth device 1814 as indicated by the distance 1842 from the bottom of the fifth device 1814). Similarly, for the eleventh participant 1820, the tenth participant 1810 will be rendered at approximately a same eye height 1876 as the eleventh participant 1820 (in FIG. 18D, the eye height 1876 is shown with respect to the surface 1836, although it may be with respect to the sixth device 1824 as indicated by the distance 1844 from the bottom of the sixth device 1824).

This is not performed by a simple vertical shifting of the rendered images 1852 and 1856 shown in FIGS. 18B and 18C, which were captured for the respective POVs 1812 and 1822 at the actual eye heights 1878 and 1876 of the participants 1810 and 1820. Instead of the POV 1812, a height-adjusted capture POV 1870 is used that is determined according to the eye height 1876 (in FIG. 18D, the height-adjusted capture POV 1870 is shown at approximately the eye height 1876). In some implementations, an adjustment height 1874 ("adjustment distance") is determined based on a difference between the eye heights 1878 and 1876 of the participants 1810 and 1820. Accordingly, as the eye height 1876 is lower than the eye height 1878, the POV 1812 is shifted downward by the adjustment height 1874 to obtain the height-adjusted capture POV 1870 (which may be a capture POV volume). As a result, the sixth device 1824 selects image data for transmission for a perspective having the same eye height 1876 as the eleventh participant 1820. The fifth device 1814 continues, as described in previous examples, to render images for viewing by the tenth participant 1810 for the POV 1812, the actual POV of the tenth participant 1810. The fifth device 1814 and/or the sixth device 1824 may be configured to vertically shift camera positions by the adjustment height 1874 (and/or an adjustment height 1846), but in general the rendering pipeline remains much the same as described in previous examples. For selecting image data captured by the fifth device 1814 for transmission to the sixth device 1824, a similar process as described for the tenth participant 1810 occurs for the eleventh participant 1820. Specifically, instead of using the POV 1822, a height-adjusted capture POV 1872 is used that is determined according to the eye height 1878 (in FIG. 18D, the height-adjusted capture POV 1872 is shown at approximately the eye height 1878). In some implementations, an adjustment height 1846 is determined based on a difference between the eye heights 1878 and 1876, and the POV 1822 shifted accordingly to obtain the height-adjusted capture POV 1872 (which may be a capture POV volume). In this example, the POV 1822 has been shifted upward. As a result, the fifth device 1814 selects image data for transmission for a perspective having a same eye height 1878 as the tenth participant 1810. In some implementations, an eye height is a typical eye height for a participant, such as while in a resting standing position.

FIG. 18E illustrates a resulting rendered image 1866 of the tenth participant 1810 that is presented to the eleventh participant 1820 on the display surface 1854. As shown in FIG. 18E, the eyes of the tenth participant 1810 are displayed at approximately the position 1826 so that the tenth participant 1810 appears to be at a direct eye level with the eleventh participant 1820. Depending on an upper FOV of the fifth device 1814, the rendered image 1866 may have an unrendered region 1882 due to a lack of image data available from the fifth device 1814. FIG. 18F illustrates the result for the tenth participant 1810 in which a rendered image 1864 of the eleventh participant 1820 is presented on the display surface 1850 with the eyes of the eleventh participant 1820 at approximately the position 1816 so that the eleventh participant 1820 appears to be at a direct eye level with the tenth participant 1810. There is a possibility of an unrendered region 1880 at a bottom portion of the rendered image 1860 depending on the lower range of the FOV of the sixth device 1824. It is noted that the adjustments for device operating height and participant eye heights described in connection with FIGS. 17A-18E may be used in combination with any of the features described herein for other light field camera devices.

Although FIGS. 18D, 18E, and 18F show an example in which rendered images of a remote participant are presented with approximately the same eye height as a local viewing participant by using a height-adjusted capture POV at approximately the eye height of the remote participant, a capture POV may be shifted by other amounts to obtain a height-adjusted capture POV. For example, rather than bringing both participants 1810 and 1820 to a same apparent eye level, intermediate height-adjusted capture POVs 1871 and 1873 may instead be used that reduce, but do not eliminate, an apparent difference in eye heights. For example, the height-adjusted capture POVs 1871 and 1873 may be set to about an average height of the participants 1810 and 1820, as shown in FIG. 18D. This allows a difference in eye height to be reduced while not shifting an apparent height of the environments 1830 and 1832. For example, a noticeable difference between the surface 1832 and an apparent height of the surface 1836 in the rendered image 1864 may present a distraction to the participant 1810 that diminished the realism of the experience. In some implementations, the eye height adjustment shown in FIGS. 18D-18F may be triggered based on the distance 1846 (corresponding to a difference between the eye heights) being greater than or equal to a threshold distance, to activate the accommodation for significant differences in eye height. In some implementations, activation of the eye height adjustment and/or a degree of adjustment may be according to a user setting, which may be changed dynamically during a session. In some implementations, to avoid surfaces 1832 and 1836 appearing to be at different heights, foreground/background separation in combination with use of different capture POVs for foreground and background image portions may be used to render a background environment with a first apparent height adjustment (for example, having the surfaces 1832 and 1836 appear to be level) and a participant with a different second apparent height adjustment (for example, with a same eye height as a viewing participant).

Figure 19:
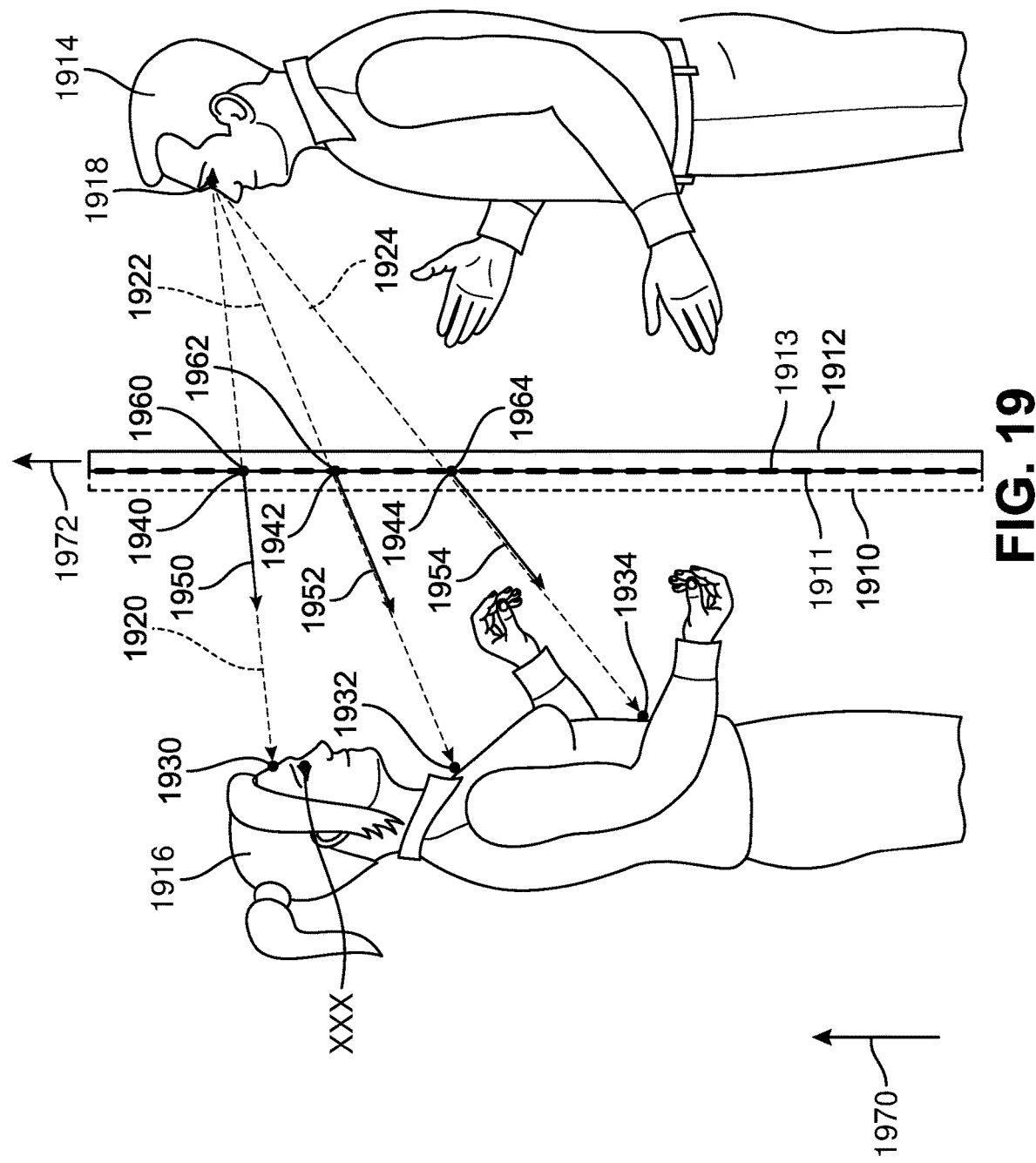
FIG. 19 illustrates an example in which image data is captured and/or rendered for first and telepresence devices that are both aligned vertically.

In many conventional videoconferencing systems, there is an implicit assumption that display devices and image capture devices are in poses having particular components in alignment, for example in the horizontal and vertical directions. An example of this is that a user will often have to ensure that a web camera is appropriately positioned and oriented or a laptop display featuring a camera is tilted in order to accommodate a FOV of the camera. FIG. 19 illustrates an example in which image data is captured and/or rendered for a seventh telepresence device 1910 and an eighth telepresence device 1912 in poses that are both aligned vertically, as generally would be the case for wall-mounted installations of both devices 1910 and 1912. For example, the eighth device 1912 is in a vertical pose 1962 parallel with a vertical axis 1970. In this example, the rendering surfaces 1911 and 1913 of respective devices 1910 and 1912 are considered to be parallel and/or coplanar for purposes of image capture, selection, and rendering. The devices 1910 and 1912 operate as described for previous examples. As a result, to render a rendered image portion 1960 on a display surface of the seventh device 1910, a twelfth virtual ray 1920 extending from a POV 1918 of a twelfth participant 1914 through the rendered image portion 1960 and to a second scene point 1930 of a thirteenth participant 1916 is identified. Based on the twelfth virtual ray 1920, a camera 1940 is selected and image data corresponding to a direction 1950 between the camera 1940 and the second scene point 1930 is used for rendering the rendered image portion 1960. Likewise, for a rendered image portion 1962, a thirteenth virtual ray 1922, a third scene point 1932, a camera 1942, and a direction 1952 between the camera 1942 and the third scene point 1932 are identified and corresponding image data from the camera 1942 used to render the rendered image portion 1962. Similarly, for a rendered image portion 1964, a fourteenth virtual ray 1924, a fourth scene point 1934, a camera 1944, and a direction 1954 between the camera 1944 and the fourth scene point 1934 are identified and corresponding image data from the camera 1944 used to render the rendered image portion 1964.

However, as illustrated in FIG. 20A, it is not always the case or even necessarily desired for a telepresence device to be in a vertically oriented pose. For example, the Microsoft Surface Hub 2™ is offered with a cart that facilitates the movement of a teleconferencing device from one location to another and which also places the teleconferencing device in a pose with a non-vertical slant or pitch. In FIG. 20A, the eighth device 1912 is in a pose 2072 having a non-vertical pitch 2074 (i.e., an amount of rotation about a horizontal axis from the vertical orientation 1970). If the two devices 1910 and 1912 capture, select, and/or render image data while assuming that the two devices 1910 and 1912 are both in vertical poses (and accordingly again considering rendering surfaces 1911 and 1913 to be parallel and/or coplanar), this would result in a similar set of cameras and directions being used for rendering images as in FIG. 19.

Figure 20B:
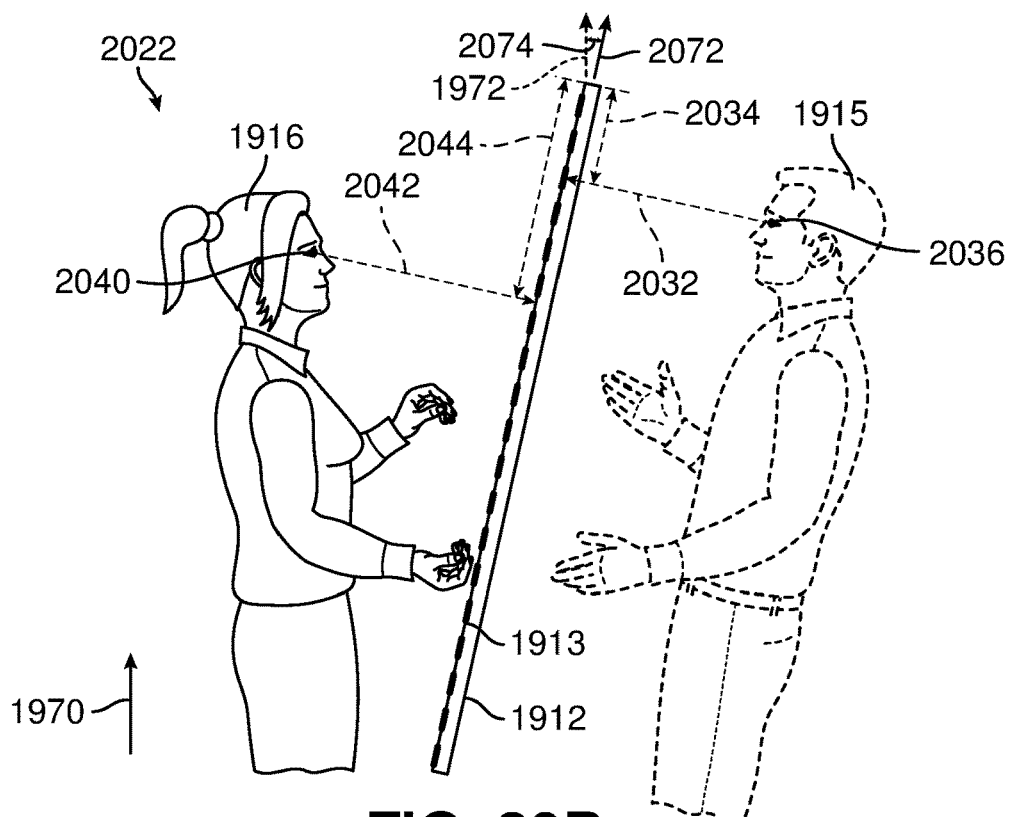
FIGS. 20B and 20C illustrate examples of capture POVs and undesired results from assuming both devices are vertically aligned when at least one of the devices is not vertically aligned.
Figure 20C:
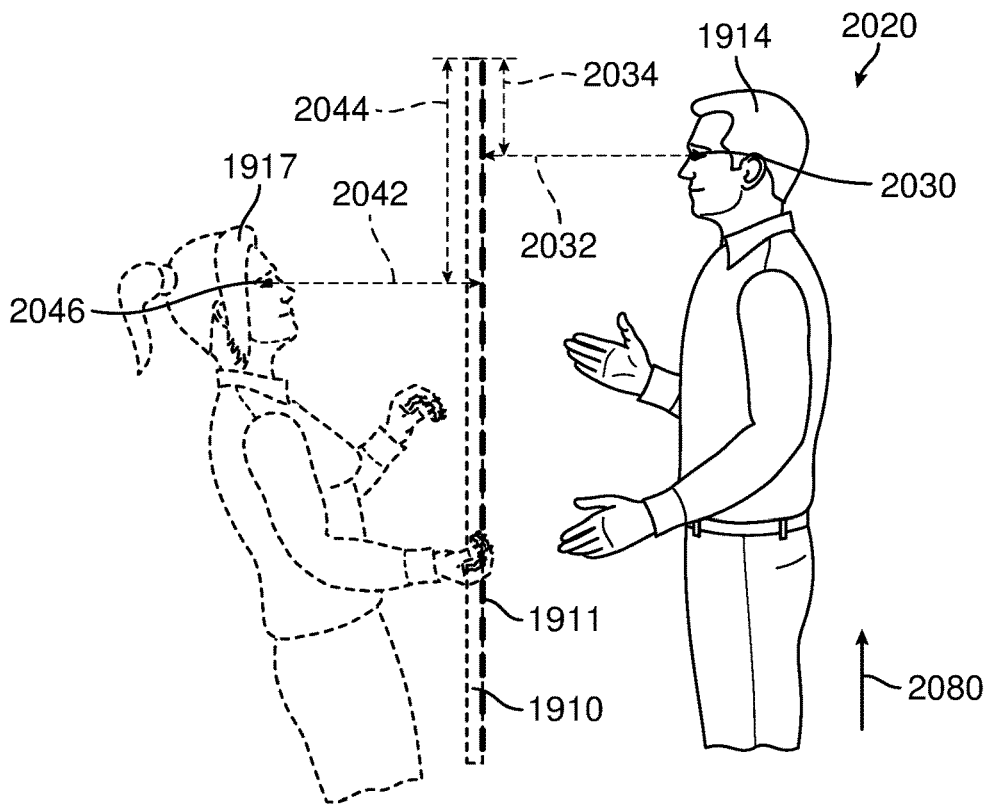

FIGS. 20B and 20C illustrate examples of capture POVs and undesired results from assuming both devices 1910 and 1912 are vertically aligned when at least one of the devices 1910 and 1912 is not vertically aligned. In FIG. 20B, an assumption that the eighth device 1912 is in a vertical pose results in a determination by the eighth device 1912 that a POV 2040 of the thirteenth participant 1916 is at a distance 2042 from the rendering surface 1913 and a distance 2044 from a top of the rendering surface 1913. However, as shown in FIG. 20C, when the distances 2042 and 2044 are applied in connection with the rendering surface 1911 of the seventh device 1910, an incorrect capture POV 2046 is obtained; also, the thirteenth participant 1916 views the twelfth participant 1914 and the environment 2020 as being tilted backward by approximately the pitch 2074. Similarly, the twelfth participant 1914 views the thirteenth participant 1916 and environment 2022 as being tilted backward, as illustrated in FIGS. 20A and 20B in connection with POV 2030, distances 2032 and 2034, and incorrect capture POV 2036 in relation to the tilted rendering surface 1913. This results in a very uncomfortable and disorienting interaction that loses a sense of realism and presence in the communication session.

Figure 21A:
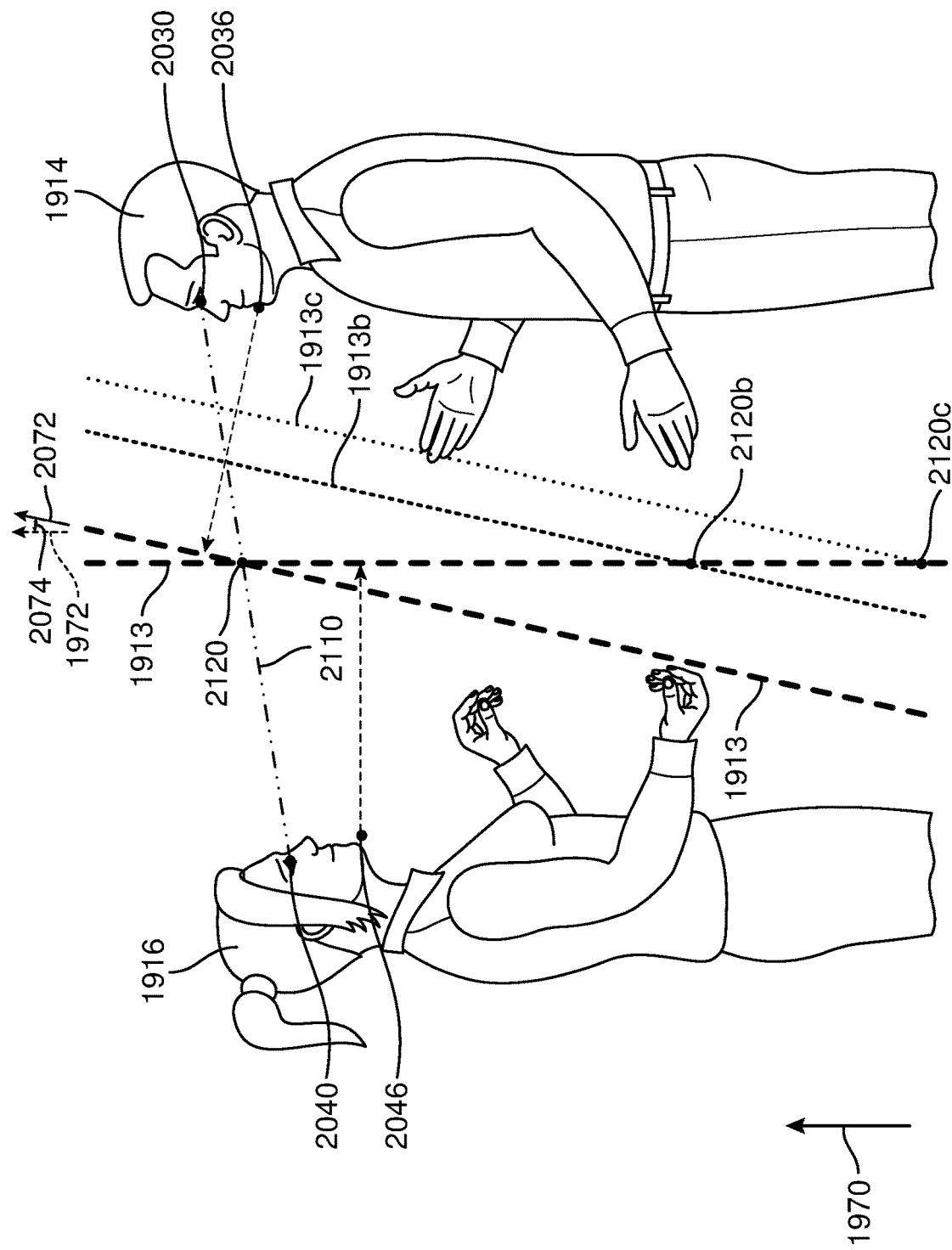
FIGS. 21A and 21B illustrate an implementation in which the first device and/or the second device of FIG. 20A are configured to determine the pitch of the second device and capture, select, and/or render image data captured by the first and second devices.
Figure 21B:
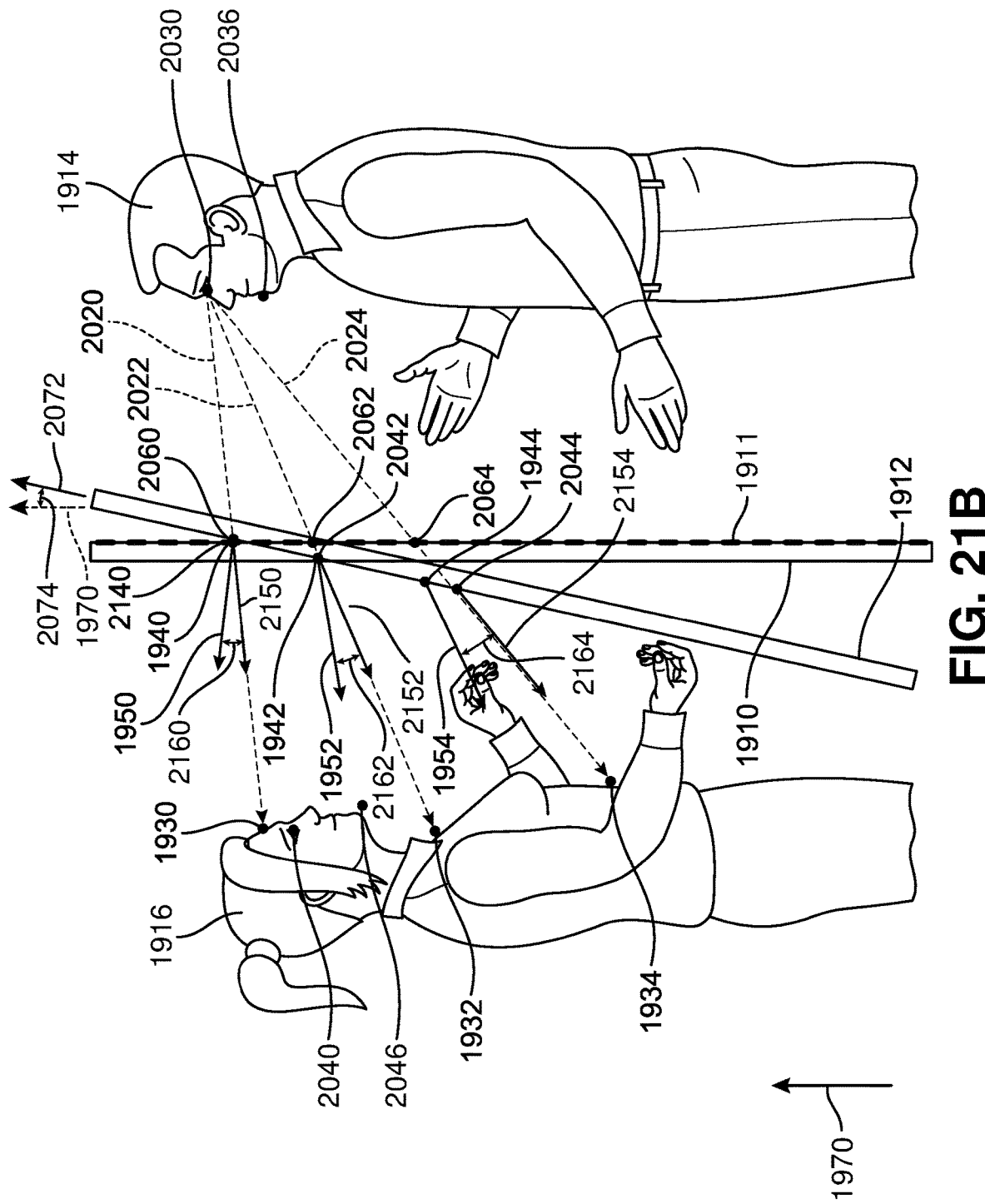

FIGS. 21A and 21B illustrate an implementation in which the seventh device 1910 and/or the eighth device 1912 of FIG. 20A are configured to determine a pose 2072 of the eighth device 1912, including a pitch 2074, and capture, select, and/or render image data captured by the two devices 1910 and 1912 in response to the determined pose 2072. In some implementations, the eighth device 1912 includes a pose or pitch sensor (not shown in FIGS. 21A and 21B) configured to measure the pose 2072 and/or the pitch 2074. For example, this might be done using an inertial movement unit (IMU), a pose or pitch sensor device, and/or stereoscopic processing of images captured by the eighth device 1912 to determine the pose 2072 and/or pitch 2074. In some examples, the pitch 2074 may be determined based on a stored configuration setting, such as a user-specified value or a configuration setting (for example, a setting indicated mounting of the eighth device 1912 on a known model of cart or support would allow the use of a predetermined pitch value). In some implementations where the eighth device 1912 is configured to determine the pose 2072 and/or pitch 2074, the eighth device 1912 is configured to provide the pitch 2074 (and in some implementations, other components of the pose 2072) to the seventh device 1910 and the seventh device 1910 is configured to receive the pitch 2074 (and in some implementations, other components of the pose 2072) and perform appropriate modifications in capturing, selecting, and rendering image data, whether captured by the seventh device 1910 and/or the eighth device 1912.

In some implementations, as shown in FIG. 21A, the rendering surfaces 1911 and 1913 are considered to be in intersecting poses for purposes of capturing, selecting, and rendering image data by the seventh device 1910 and/or the eighth device 1912. In some examples, as shown in FIG. 21A, based on a gaze line 2110 between the eyes of the participants 1914 and 1916, a first intersection 2120 on the gaze line 2110 is selected. Other intersections can be used to allow the participants to have a short distance for the gaze line 2110 while avoiding inadvertent contact with the devices 1910 and 1912. For example, a second intersection 2120b may be selected based on avoiding inadvertent contact of a hand of the participant 1916. As another example, a third intersection 2120c may be selected based on avoiding inadvertent contact of a leg of the participant 1916.

In some examples, only one of the two devices 1910 and 1912 is a pose-aware device configured to perform adjustments selecting, encoding, and/or rendering image data in response to the pose 2072 and/or pitch 2064 of the eighth device 1912, with the other device being a pose-unaware device. The pose-aware device configured to make those adjustments may be configured to accordingly modify capture POV data provided by the pose-aware device, capture POV data received from the pose-unaware device, reproject image data from a first camera position to a second camera position (captured by the pose-aware device and/or the pose-unaware device), and/or aspects of the rendering of image data received from the pose-unaware device in order to ensure that both devices display rendered images to their respective participants that present their counterparts and respective environments in correct orientations (for example, where both participants 1914 and 1916 are standing vertically, as usually is the case, they view each other as standing vertically).

As a result of pose awareness, instead of using the incorrect capture POVs 2036 and 2046 as shown in FIGS. 20B and 20C, capture POVs 2030 and 2040 corresponding to the correct positions of the eyes of the participants 1914 and 1916 are used; also, the participants 1914 and 1916 view one another with accurate vertical orientations. As shown in FIG. 21B, the eighth device 1912 has determined the pitch 2074 and provided at least the pitch 2064 component of the pose 2072 to the seventh device 1910, and both device 1910 and 1912 are configured to adjust their image data processing in response to at least the pitch 2074. As a result, and in comparison to FIG. 19, image data from the camera 1940 is still used for rendering the rendered image portion 1960 for display to the twelfth participant 1914, but instead for using image data from the direction 1950 as in FIG. 19, an orientation-adjusted direction 2150 at an angle 2160 from the direction 1950 is used. For the rendered image portion 1962, image data is no longer used from the image camera 1942 as in FIG. 19; instead, another camera 2042 is used and image data from camera 2042 in a direction 2152 from the camera 2042 to the third scene point 1932 and at an angle 2162 from the direction 1952 is used. Similarly, for the rendered image portion 1964, image data is no longer used from the image camera 1944 as in FIG. 19; instead, another camera 2044 is used and image data from camera 2044 in a direction 2154 from the camera 2044 to the fourth scene point 1934 and at an angle 2164 from the direction 1954 is used. Although not illustrated in FIG. 21B, a similar set of changes in cameras and image data also occurs for obtaining and rendering images of the twelfth participant 1914 for display on the eighth device 1912.

It is noted that although FIGS. 20A-21B describe pose-related adjustments performed in connection with an amount of pitch, adjustments may similarly be performed in connection with other orientation components (about other axes of rotation) of a pose of a telepresence device. For example, conventionally assumptions are often made that display and capture devices are in horizontally aligned poses. However, in practice this is not always the case; for example, even a telepresence device that is in a fixed position may be in a pose with a non-negligible amount of roll (i.e., a degree of rotation about a horizontal axis approximately aligned with a normal vector of a display surface). Much as described in connection with pitch, the devices described herein may also adjust capture, selection, and/or rendering of image data (for example, which may include rotating captured image data) to correctly orient participants based on the detected roll and/or pitch of one or both devices. In some implementations, similar adjustments may be performed for a determined amount of yaw (i.e., an amount of rotation about a vertical axis), which may also include adjustments for detected pitch and/or roll. It is noted the pose-related adjustments described in connection with FIGS. 19-21 may be used in combination with any of the features described herein for other light field camera devices.

The detailed examples of systems, devices, and techniques described in connection with FIGS. 1A-21 are presented herein for illustration of the disclosure and its benefits. Such examples of use should not be construed to be limitations on the logical process embodiments of the disclosure, nor should variations of user interface methods from those described herein be considered outside the scope of the present disclosure. In some embodiments, various features described in FIGS. 1A-21 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 22:
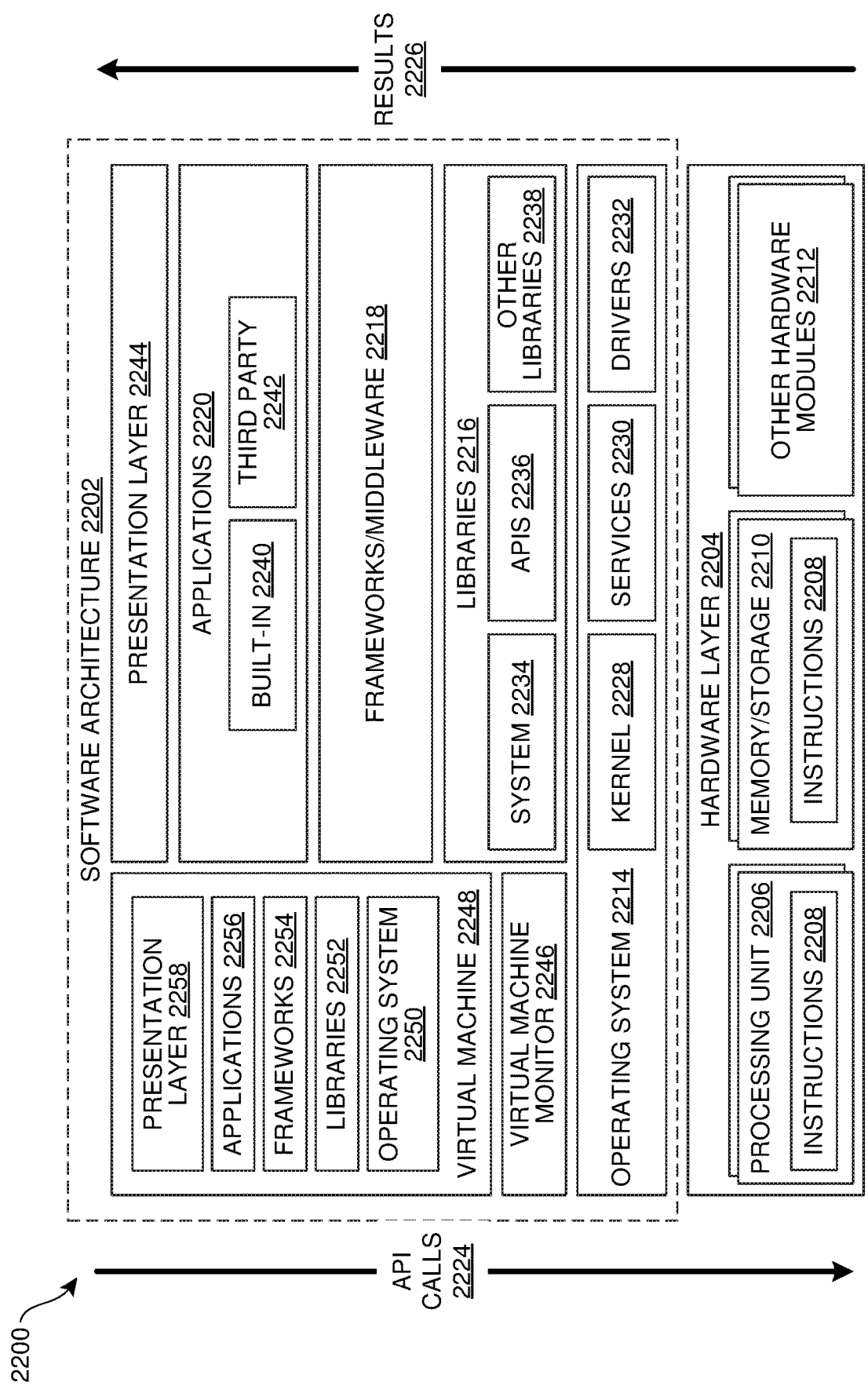
FIG. 22 is a block diagram illustrating an example software architecture, various portions of which may be used in conjunction with various hardware architectures herein described, which may implement any of the features herein described.

FIG. 22 is a block diagram 2200 illustrating an example software architecture 2202, various portions of which may be used in conjunction with various hardware architectures herein described, which may implement any of the above-described features. FIG. 22 is a non-limiting example of a software architecture and it will be appreciated that many other architectures may be implemented to facilitate the functionality described herein. The software architecture 2202 may execute on hardware such as a machine 2300 of FIG. 23 that includes, among other things, processors 2310, memory 2330, and input/output (I/O) components 2350. A representative hardware layer 2204 is illustrated and can represent, for example, the machine 2300 of FIG. 23. The representative hardware layer 2204 includes a processing unit 2206 and associated executable instructions 2208. The executable instructions 2208 represent executable instructions of the software architecture 2202, including implementation of the methods, modules and so forth described herein. The hardware layer 2204 also includes a memory/storage 2210, which also includes the executable instructions 2208 and accompanying data. The hardware layer 2204 may also include other hardware modules 2212. Instructions 2208 held by processing unit 2208 may be portions of instructions 2208 held by the memory/storage 2210.

The example software architecture 2202 may be conceptualized as layers, each providing various functionality. For example, the software architecture 2202 may include layers and components such as an operating system (OS) 2214, libraries 2216, frameworks 2218, applications 2220, and a presentation layer 2244. Operationally, the applications 2220 and/or other components within the layers may invoke API calls 2224 to other layers and receive corresponding results 2226. The layers illustrated are representative in nature and other software architectures may include additional or different layers. For example, some mobile or special purpose operating systems may not provide the frameworks/middleware 2218.

The OS 2214 may manage hardware resources and provide common services. The OS 2214 may include, for example, a kernel 2228, services 2230, and drivers 2232. The kernel 2228 may act as an abstraction layer between the hardware layer 2204 and other software layers. For example, the kernel 2228 may be responsible for memory management, processor management (for example, scheduling), component management, networking, security settings, and so on. The services 2230 may provide other common services for the other software layers. The drivers 2232 may be responsible for controlling or interfacing with the underlying hardware layer 2204. For instance, the drivers 2232 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 2216 may provide a common infrastructure that may be used by the applications 2220 and/or other components and/or layers. The libraries 2216 typically provide functionality for use by other software modules to perform tasks, rather than interacting directly with the OS 2214. The libraries 2216 may include system libraries 2234 (for example, C standard library) that may provide functions such as memory allocation, string manipulation, file operations. In addition, the libraries 2216 may include API libraries 2236 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 2216 may also include a wide variety of other libraries 2238 to provide many functions for applications 2220 and other software modules.

The frameworks 2218 (also sometimes referred to as middleware) provide a higher-level common infrastructure that may be used by the applications 2220 and/or other software modules. For example, the frameworks 2218 may provide various graphic user interface (GUI) functions, high-level resource management, or high-level location services. The frameworks 2218 may provide a broad spectrum of other APIs for applications 2220 and/or other software modules.

The applications 2220 include built-in applications 2240 and/or third-party applications 2242. Examples of built-in applications 2240 may include, but are not limited to, a contacts application, a browser application, a location application, a media application, a messaging application, and/or a game application. Third-party applications 2242 may include any applications developed by an entity other than the vendor of the particular platform. The applications 2220 may use functions available via OS 2214, libraries 2216, frameworks 2218, and presentation layer 2244 to create user interfaces to interact with users.

Some software architectures use virtual machines, as illustrated by a virtual machine 2248. The virtual machine 2248 provides an execution environment where applications/modules can execute as if they were executing on a hardware machine (such as the machine 2300 of FIG. 23, for example). The virtual machine 2248 may be hosted by a host OS (for example, OS 2214) or hypervisor, and may have a virtual machine monitor 2246 which manages the operation of the virtual machine 2248 and interoperation with the host operating system. A software architecture, which may be different from software architecture 2202 outside of the virtual machine, executes within the virtual machine 2248 such as an OS 2250, libraries 2252, frameworks 2254, applications 2256, and/or a presentation layer 2258.

Figure 23:
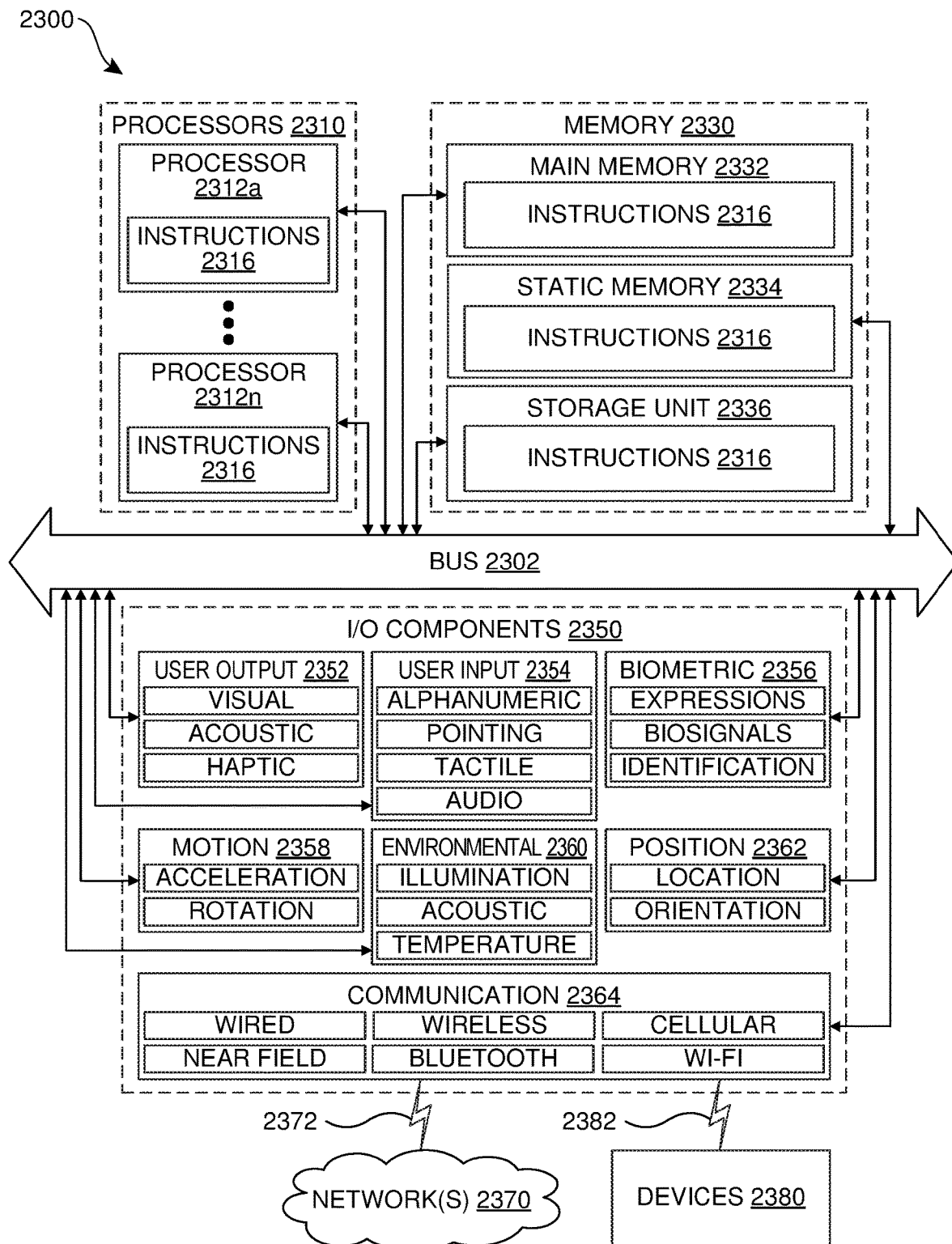
FIG. 23 is a block diagram illustrating components of an example machine configured to read instructions from a machine-readable medium and perform any of the features described herein.

FIG. 23 is a block diagram illustrating components of an example machine 2300 configured to read instructions from a machine-readable medium (for example, a machine-readable storage medium) and perform any of the features described herein. The example machine 2300 is in a form of a computer system, within which instructions 2316 (for example, in the form of software components) for causing the machine 2300 to perform any of the features described herein may be executed. As such, the instructions 2316 may be used to implement modules or components described herein. The instructions 2316 cause unprogrammed and/or unconfigured machine 2300 to operate as a particular machine configured to carry out the described features. The machine 2300 may be configured to operate as a standalone device or may be coupled (for example, networked) to other machines. In a networked deployment, the machine 2300 may operate in the capacity of a server machine or a client machine in a server-client network environment, or as a node in a peer-to-peer or distributed network environment. Machine 2300 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2300 is illustrated, the term "machine" includes a collection of machines that individually or jointly execute the instructions 2316.

The machine 2300 may include processors 2310, memory 2330, and I/O components 2350, which may be communicatively coupled via, for example, a bus 2302. The bus 2302 may include multiple buses coupling various elements of machine 2300 via various bus technologies and protocols. In an example, the processors 2310 (including, for example, a central processing unit (CPU), a graphics processing unit (GPU), a digital signal processor (DSP), an ASIC, or a suitable combination thereof) may include one or more processors 2312a to 2312n that may execute the instructions 2316 and process data. In some examples, one or more processors 2310 may execute instructions provided or identified by one or more other processors 2310. The term "processor" includes a multi-core processor including cores that may execute instructions contemporaneously. Although FIG. 23 shows multiple processors, the machine 2300 may include a single processor with a single core, a single processor with multiple cores (for example, a multi-core processor), multiple processors each with a single core, multiple processors each with multiple cores, or any combination thereof. In some examples, the machine 2300 may include multiple processors distributed among multiple machines.

The memory/storage 2330 may include a main memory 2332, a static memory 2334, or other memory, and a storage unit 2336, both accessible to the processors 2310 such as via the bus 2302. The storage unit 2336 and memory 2332, 2334 store instructions 2316 embodying any one or more of the functions described herein. The memory/storage 2330 may also store temporary, intermediate, and/or long-term data for processors 2310. The instructions 2316 may also reside, completely or partially, within the memory 2332, 2334, within the storage unit 2336, within at least one of the processors 2310 (for example, within a command buffer or cache memory), within memory at least one of I/O components 2350, or any suitable combination thereof, during execution thereof. Accordingly, the memory 2332, 2334, the storage unit 2336, memory in processors 2310, and memory in I/O components 2350 are examples of machine-readable media.

As used herein, "machine-readable medium" refers to a device able to temporarily or permanently store instructions and data that cause machine 2300 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 2316) for execution by a machine 2300 such that the instructions, when executed by one or more processors 2310 of the machine 2300, cause the machine 2300 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 2350 may include a wide variety of hardware components adapted to receive input, provide output, produce output, transmit information, exchange information, capture measurements, and so on. The specific I/O components 2350 included in a particular machine will depend on the type and/or function of the machine. For example, mobile devices such as mobile phones may include a touch input device, whereas a headless server or IoT device may not include such a touch input device. The particular examples of I/O components illustrated in FIG. 23 are in no way limiting, and other types of components may be included in machine 2300. The grouping of I/O components 2350 are merely for simplifying this discussion, and the grouping is in no way limiting. In various examples, the I/O components 2350 may include user output components 2352 and user input components 2354. User output components 2352 may include, for example, display components for displaying information (for example, a liquid crystal display (LCD) or a projector), acoustic components (for example, speakers), haptic components (for example, a vibratory motor or force-feedback device), and/or other signal generators. User input components 2354 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2350 may include biometric components 2356, motion components 2358, environmental components 2360, and/or position components 2362, among a wide array of other physical sensor components. The biometric components 2356 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 2358 may include, for example, acceleration sensors (for example, an accelerometer) and rotation sensors (for example, a gyroscope). The environmental components 2360 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 2362 may include, for example, location sensors (for example, a Global Position System (GPS) receiver), altitude sensors (for example, an air pressure sensor from which altitude may be derived), and/or orientation sensors (for example, magnetometers).

The I/O components 2350 may include communication components 2364, implementing a wide variety of technologies operable to couple the machine 2300 to network(s) 2370 and/or device(s) 2380 via respective communicative couplings 2372 and 2382. The communication components 2364 may include one or more network interface components or other suitable devices to interface with the network(s) 2370. The communication components 2364 may include, for example, components adapted to provide wired communication, wireless communication, cellular communication, Near Field Communication (NFC), Bluetooth communication, Wi-Fi, and/or communication via other modalities. The device(s) 2380 may include other machines or various peripheral devices (for example, coupled via USB).

In some examples, the communication components 2364 may detect identifiers or include components adapted to detect identifiers. For example, the communication components 2364 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 2362, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for calibrating inconsistent camera images, comprising:
   a processor; and
   a memory in communication with the processor, the memory comprising executable instructions that, when executed by the processor, cause the processor to control the data processing system to perform functions of:
      receiving, from a first image camera of a camera array, first image data capturing a scene, the first image camera located at a first position on the camera array and having a first field of view (FOV) directed to the scene;
      receiving, from a second image camera of the camera array, second image data capturing the scene, the second image camera located at a second position on the camera array that is different from the first position and having a second FOV directed to the scene and overlapping the first FOV;
      identifying, from the first and second image data, an image feature in the scene;
      transforming, based on depth data of the scene, a position of the image feature from a first camera space captured by the first image camera to a second camera space captured by the second image camera;
      detecting, based on the transformed position of the image feature, an inconsistency in the first or second image data;
      determining that the inconsistency in one of the first or second image data is caused by deviation of a corresponding image camera from an initial position or orientation, the corresponding image camera being at least one of the first or second image camera; and
      in response to the detected inconsistency, generating correction data for the corresponding image camera to compensate the detected inconsistency.

2. The data processing system of claim 1, wherein:
   the camera array comprises a light field camera array, and
   the first and second image cameras comprise first and second light field cameras, respectively.

3. The data processing system of claim 1, wherein:
   the instructions, when executed by the processor, further cause the processor to control the data processing system to perform a function of detecting an occurrence of a trigger event with respect to the camera array, and
   the received first and second image data captures the scene after the occurrence of the trigger event with respect to the camera array.

4. The data processing system of claim 3, wherein, for detecting the occurrence of the trigger event with respect to the camera array, the instructions, when executed by the processor, further cause the processor to control the data processing system to perform functions of:
   receiving motion data from a motion sensor; and
   determining, based on the motion sensor, that vibration, movement or impact has occurred with respect to the camera array.

5. The system of claim 3, wherein, for detecting the occurrence of the trigger event with respect to the camera array, the instructions, when executed by the processor, further cause the processor to control the data processing system to perform a function of detecting an excessive temperature at the camera array.

6. A method of operating a system for calibrating inconsistent camera images, comprising:
   receiving, from a first image camera of a camera array, first image data capturing a scene, the first image camera located at a first position on the camera array and having a first field of view (FOV) directed to the scene;
   receiving, from a second image camera of the camera array, second image data capturing the scene, the second image camera located at a second position on the camera array that is different from the first position and having a second FOV directed to the scene and overlapping the first FOV;
   identifying, from the first and second image data, an image feature in the scene;
   transforming, based on depth data of the scene, a position of the image feature from a first camera space captured by the first image camera to a second camera space captured by the second image camera;
   detecting, based on the transformed position of the image feature, an inconsistency in the first or second image data;
   determining that the inconsistency in one of the first or second image data is caused by deviation of a corresponding image camera from an initial position or orientation, the corresponding image camera being at least one of the first or second image camera; and in response to the detected inconsistency, generating correction data for the corresponding image camera to compensate the detected inconsistency.

7. The method of claim 6, wherein:

the camera array comprises a light field camera array, and the first and second image cameras comprise first and second light field cameras, respectively.

8. The method of claim 6, further comprising detecting an occurrence of a trigger event with respect to the camera array, wherein the received first and second image data captures the scene after the occurrence of the trigger event with respect to the camera array.

9. The method of claim 8, wherein detecting the occurrence of the trigger event with respect to the camera array comprises:

receiving motion data from a motion sensor; and determining, based on the motion sensor, that vibration, movement or impact has occurred with respect to the camera array.

10. The method of claim 8, wherein detecting the occurrence of the trigger event with respect to the camera array comprises detecting an excessive temperature at the camera array.

11. A non-transitory computer readable medium containing instructions which, when executed by a processor, cause the processor to perform functions of:

receiving, from a first image camera of a camera array, first image data capturing a scene, the first image camera located at a first position on the camera array and having a first field of view (FOV) directed to the scene;

receiving, from a second image camera of the camera array, second image data capturing the scene, the second image camera located at a second position on the camera array that is different from the first position and having a second FOV directed to the scene and overlapping the first FOV;

identifying, from the first and second image data, an image feature in the scene;

transforming, based on depth data of the scene, a position of the image feature from a first camera space captured by the first image camera to a second camera space captured by the second image camera;

detecting, based on the transformed position of the image feature, an inconsistency in the first or second image data;

determining that the inconsistency in one of the first or second image data is caused by deviation of a corresponding image camera from an initial position or orientation, the corresponding image camera being at least one of the first or second image camera; and in response to the detected inconsistency, generating correction data for the corresponding image camera to compensate the detected inconsistency.

12. The non-transitory computer readable medium of claim 11, wherein:

the camera array comprises a light field camera array, and the first and second image cameras comprise first and second light field cameras, respectively.

13. The non-transitory computer readable medium of claim 11, wherein:

the instructions, when executed by the processor, further cause the processor to control a data processing system to perform a function of detecting an occurrence of a trigger event with respect to the camera array, and the received first and second image data captures the scene after the occurrence of the trigger event with respect to the camera array.

14. The non-transitory computer readable medium of claim 13, wherein, for detecting the occurrence of the trigger event with respect to the camera array, the instructions, when executed by the processor, further cause the processor to control the data processing system to perform functions of:

receiving motion data from a motion sensor; and determining, based on the motion sensor, that vibration, movement or impact has occurred with respect to the camera array.

15. The non-transitory computer readable medium of claim 13, wherein, for detecting the occurrence of the trigger event with respect to the camera array, the instructions, when executed by the processor, further cause the processor to control the data processing system to perform a function of detecting an excessive temperature at the camera array.

* * * * *